US010210246B2

(12) United States Patent
Stojanovic et al.

(10) Patent No.: US 10,210,246 B2
(45) Date of Patent: Feb. 19, 2019

(54) TECHNIQUES FOR SIMILARITY ANALYSIS AND DATA ENRICHMENT USING KNOWLEDGE SOURCES

(71) Applicant: Oracle International Corporation, Redwood Shores, CA (US)

(72) Inventors: Alexander Sasha Stojanovic, Los Gatos, CA (US); Mark Kreider, Arvada, CO (US); Michael Malak, Denver, CO (US); Glenn Allen Murray, Boulder, CO (US)

(73) Assignee: Oracle International Corporation, Redwood Shores, CA (US)

( * ) Notice: Subject to any disclaimer, the term of this patent is extended or adjusted under 35 U.S.C. 154(b) by 355 days.

(21) Appl. No.: 14/864,485

(22) Filed: Sep. 24, 2015

(65) Prior Publication Data

US 2016/0092557 A1    Mar. 31, 2016

Related U.S. Application Data

(60) Provisional application No. 62/203,806, filed on Aug. 11, 2015, provisional application No. 62/163,296, (Continued)

(51) Int. Cl.
*G06F 17/30*       (2006.01)
*G06Q 30/02*       (2012.01)

(52) U.S. Cl.
CPC .. *G06F 17/30675* (2013.01); *G06F 17/30303* (2013.01); *G06F 17/30554* (2013.01); (Continued)

(58) Field of Classification Search
CPC ................................................ G06F 17/30598
See application file for complete search history.

(56) References Cited

U.S. PATENT DOCUMENTS 6,047,283 A  *  4/2000  Braun ............... G06F 17/30625
6,556,983 B1     4/2003  Altschuler et al.
(Continued)

FOREIGN PATENT DOCUMENTS

CN    106687952    5/2017
CN    106796595    5/2017
(Continued)

OTHER PUBLICATIONS

Edmonds, "Choosing the Word Most Typical in Context: Using a Lexical Co-occurrence Network", Proceedings of the 35th Annual Meeting of the Association for Computational Linguistics, 1997, pp. 507-509 [retrieved Apr. 17, 2017]. Retrieved from the Internet: <URL: https://arxiv.org/pdf/cs/9811009.pdf>, 3 pages.
(Continued)

*Primary Examiner* — Robert W Beausoliel, Jr.
*Assistant Examiner* — Nirav K Khakhar
(74) *Attorney, Agent, or Firm* — Kilpatrick Townsend & Stockton LLP

(57) ABSTRACT

The present disclosure relates to performing similarity metric analysis and data enrichment using knowledge sources. A data enrichment service can compare an input data set to reference data sets stored in a knowledge source to identify similarly related data. A similarity metric can be calculated corresponding to the semantic similarity of two or more datasets. The similarity metric can be used to identify datasets based on their metadata attributes and data values enabling easier indexing and high performance retrieval of data values. A input data set can labeled with a category based on the data set having the best match with the input data set. The similarity of an input data set with a data set provided by a knowledge source can be used to query a knowledge source to obtain additional information about the
(Continued)

data set. The additional information can be used to provide recommendations to the user.

19 Claims, 27 Drawing Sheets

Related U.S. Application Data filed on May 18, 2015, provisional application No. 62/056,468, filed on Sep. 26, 2014.

(52) U.S. Cl.
CPC .. *G06F 17/30563* (2013.01); *G06F 17/30598* (2013.01); *G06F 17/30705* (2013.01); *G06F 17/30958* (2013.01); *G06Q 30/02* (2013.01)

(56) References Cited

U.S. PATENT DOCUMENTS

| | | | |
|---|---|---|---|
| 6,807,558 B1 | 10/2004 | Hassett et al. | |
| 7,571,177 B2 | 8/2009 | Damle | |
| 8,155,951 B2 | 4/2012 | Jamieson | |
| 8,234,285 B1* | 7/2012 | Cohen | G06F 17/30675 707/749 |
| 8,874,616 B1 | 10/2014 | Coffman et al. | |
| 2002/0107861 A1 | 8/2002 | Clendinning et al. | |
| 2002/0152201 A1* | 10/2002 | Nanavati | G06Q 30/00 |
| 2004/0260695 A1* | 12/2004 | Brill | G06F 17/30867 |
| 2005/0071140 A1* | 3/2005 | Ben-Hur | G06K 9/6218 703/11 |
| 2005/0278307 A1 | 12/2005 | Battagin et al. | |
| 2006/0075021 A1 | 4/2006 | Sugiyama et al. | |
| 2007/0112827 A1 | 5/2007 | Dettinger et al. | |
| 2008/0027929 A1* | 1/2008 | Rice | G06F 17/30979 |
| 2008/0281820 A1 | 11/2008 | Do et al. | |
| 2009/0006460 A1* | 1/2009 | Kleinberg | G06F 19/24 |
| 2010/0131844 A1 | 5/2010 | Wohlert | |
| 2010/0205475 A1 | 8/2010 | Ebrahimi et al. | |
| 2010/0274821 A1* | 10/2010 | Bernstein | G06F 17/30864 707/808 |
| 2011/0106791 A1 | 5/2011 | Maim | |
| 2012/0101975 A1 | 4/2012 | Khosravy | |
| 2012/0117076 A1* | 5/2012 | Austermann | G06F 17/30542 707/741 |
| 2012/0136859 A1 | 5/2012 | Shamsi et al. | |
| 2013/0110792 A1 | 5/2013 | Hudis et al. | |
| 2013/0232452 A1 | 9/2013 | Krajec et al. | |
| 2014/0052688 A1* | 2/2014 | Bansal | G06N 7/02 706/52 |
| 2014/0067728 A1 | 3/2014 | Ogren et al. | |
| 2014/0074829 A1 | 3/2014 | Schmidt | |
| 2014/0115155 A1 | 4/2014 | Bonchi et al. | |
| 2014/0222181 A1 | 8/2014 | Hemenway et al. | |
| 2014/0279865 A1 | 9/2014 | Kumar et al. | |
| 2014/0337331 A1* | 11/2014 | Hassanzadeh | G06F 17/30578 707/726 |
| 2015/0106324 A1 | 4/2015 | Puri et al. | |
| 2015/0370775 A1 | 12/2015 | Bauchot | |
| 2016/0092090 A1 | 3/2016 | Stojanovic et al. | |
| 2016/0092474 A1 | 3/2016 | Stojanovic et al. | |
| 2016/0092475 A1 | 3/2016 | Stojanovic et al. | |
| 2016/0092476 A1 | 3/2016 | Stojanovic et al. | |
| 2016/0188701 A1* | 6/2016 | Fapohunda | G06F 17/30563 707/749 |
| 2016/0286544 A1 | 9/2016 | Ikeda et al. | |

FOREIGN PATENT DOCUMENTS

| | | |
|---|---|---|
| WO | 2016049437 | 3/2016 |
| WO | 2016049460 | 3/2016 |
| WO | 2016049437 A9 | 3/2017 |

OTHER PUBLICATIONS

Sanborn et al., "A Bigram Extension to Word Vector Representation" [retrieved Apr. 17, 2017]. Retrieved from the Internet<URL: http://cs229.stanford.edu/proj2014/Adrian%20Sanborn,%20Jacek%20Skryzalin,%20A%20bigram%20extension%20to%20word%20vector%20representation.pdf>, 2014, 5 pages.

International Application No. PCT/US2015/052190, International Preliminary Report on Patentability dated Apr. 6, 2017, 18 pages.

International Application No. PCT/US2015/052228, International Preliminary Report on Patentability dated Apr. 6, 2017, 8 pages.

International Application No. PCT/US2015/052228, International Search Report and Written Opinion dated Nov. 18, 2015, 11 pages.

Boruvka, "O Jistém Problému Minimálním (On a Certain Minimal Problem)", Práce Moravské přírodovědecké společnosti (Scholarly works, Faculty of Moravian), vol. III, Publication 3, 1 926, pp. 37-58.

Homma et al., "An Artificial Neural Network for Spatiotemporal Bipolar patterns: Application to Phoneme Classification", 1988, pp. 31-40.

Kalchbrenner et al., "A Convolutional Neural Network for Modelling Sentences" [retrieved Feb. 2, 2017], published on Apr. 8, 2014. Retrieved from the Internet: <URL: https://arxiv.org/abs/1404.2188>, 11 pages.

Florek et al., "Sur la Liaison et le Division des Points d'un Ensemble Fini (on Liaison and Points Dividing a Finite Set)", Colloquium Malheinaticae, 2.3-4 (1951): 282-285.

Securing the Hadoop Ecosystem, ATM (Cloudera) & Tucu (Cloudera), Hadoop Summit, Jun. 2013 [retrieved Dec. 23, 2015]. Retrieved from the Internet: <URL: http://www.slideshare.net/Hadoop_Summit/abdelnur-myers-june261120room230av2>, 27 pages.

Gensim: Topic modelling for humans, [retrieved Dec. 29, 2015]. Retrieved from the Internet: <URL: https://radimrehurek.com/gensim/>, 2 pages.

Sqoop User Guide (v1.4.2), [retrieved Dec. 29, 2015]. Retrieved from the Internet: <URL: http://sqoop.apache.org/docs/1.4.2/SqoopUserGuide.html>, 37 pages.

Apache Tika—a content analysis toolkit, Copyright 2015 [retrieved Dec. 29, 2015]. Retrieved from the Internet: <URL: http://tika.apache.org/>, 9 pages.

Commons VFS—Commons Virtual File System, The Apache Software Foundation, Feb. 28, 2014, Copyright 2002-2014 [retrieved Dec. 29, 2015]. Retrieved from the Internet: <URL: http://commons.apache.org/proper/commons-vfs/index.html>, 2 pages.

Apache Hadoop 2.7.1—HDFS Permissions Guide, [retrieved Dec. 29, 2015]. Retrieved from the Internet : <URL: http://hadoop.apache.org/docs/current/hadoop- project-dist/ hadoop-hdfs/HdfsPermissionsGuide.html>, 6 pages.

Launching Spark on YARN—Spark 0.9.0 Documentation, [retrieved Dec. 29, 2015]. Retrieved from the Internet: <URL: http://spark.apache.org/docs/0.9.0/running-on-yarn.html>, 4 pages.

Making sense of word2vec, RaRe Technologies, RaRe Machine Learning Blog, Dec. 23, 2014, Copyright 2015 [Dec. 29, 2015]. Retrieved from the Internet: <URL: http://rare-technologies.com/making-sense-of-word2ved>, 16 pages.

Feature Extraction and Transformation—MLlib—Spark 1.5.2 Documentation, [retrieved Dec. 29, 2015]. Retrieved from the Internet: <URL: http://spark.apache.org/docs/latest/mllib-feature-extraction.html>, 9 pages.

Running Spark on YARN—Spark 1.5.2 Documentation, [retrieved Dec. 29, 2015]. Retrieved from the Internet: <URL: http://spark.apache.org/docs/latest/running-on-yarn.html>, 4 pages.

Apache Hadoop 2.6.0-cdh5.5.1—Service Level Authorization Guide, [retrieved Dec. 29, 2015]. Retrieved from the Internet: <URL: http://archive.cloudera.com/cdh5/cdh/5/hadoop/hadoop-project-dist/hadoop-common/ServiceLevelAuth.html>, 3 pages.

Commons VFS—Supported File Systems, The Apache Software Foundation, Feb. 28, 2014, Copyright 2002-2014 [retrieved Dec. 29, 2015]. Retrieved from the Internet: <URL: http://commons.apache.org/proper/commons-vfs/filesystems.html>, 6 pages.

(56) References Cited

OTHER PUBLICATIONS

Welcome to Apache Flume—Apache Flume, [retrieved Dec. 29, 2015]. Retrieved from the Internet: <URL: http://flume.apache.org/>, 7 pages.

Jaccard index—Wikipedia, the free encyclopedia, Wikipedia Foundation, Inc., [retrieved Dec. 29, 2015]. Retrieved from the Internet: <URL: https://en.wikipedia.org/wiki/Jaccard_index>, 5 pages.

K-means clustering—Wikipedia, the free encyclopedia, Wikipedia Foundation, Inc., [retrieved Dec. 29, 2015]. Retrieved from the Internet: <URL: https://en.wikipedia.org/wiki/K-means_clustering>, 12 pages.

Sorensen—Dice coefficient—Wikipedia, the free encyclopedia, Wikipedia Foundation, Inc., [retrieved Dec. 29, 2015]. Retrieved from the Internet: <URL: https://en.wikipedia.org/wiki/S%C3%B8rensen%E2%80%93Dice_coefficient>, 4 pages.

Suffix tree—Wikipedia, the free encyclopedia, Wikipedia Foundation, Inc., [retrieved Dec. 29, 2015]. Retrieved from the Internet: <URL: http://en.wikipedia.org/wiki/Suffix_tree>, 7 pages.

Trie—Wikipedia, the free encyclopedia, Wikipedia Foundation, Inc., [retrieved Dec. 29, 2015]. Retrieved from the Internet: <URL: http://en.wikipedia.org/wiki/Trie>, 8 pages.

Tversky index—Wikipedia, the free encyclopedia, Wikipedia Foundation, Inc., [retrieved Dec. 29, 2015]. Retrieved from the Internet: <URL: https://en.wikipedia.org/wiki/Tversky_index>, 2 pages.

Yago: A High-Quality Knowledge Base, Max-Planck-Institut für Informatik, [retrieved Dec. 29, 2015]. Retrieved from the Internet: <URL: http://www.mpi-inf.mpg.de/departments/databases-and-information-systems/research/yago-naga/yago//>, 4 pages.

Apache Hadoop 2.4.1—Hadoop Map Reduce Next Generation-2.4.1—Writing YARN Applications, Jun. 21, 2014 [retrieved Dec. 29, 2015]. Retrieved from the Internet: <URL: http://hadoop.apache.org/docs/r2.4.1/hadoop-yarn/hadoop-yarn-site/WritingYarnApplications.html>, 11 pages.

Angell et al., Automatic spelling correction using trigram similarity measure, Information Processing & Management, vol. 19, Issue 4, 1983, pp. 255-261 [retrieved Mar. 30, 2016]. Retrieved from the Internet: <URL: https://www.researchgate.net/publication/222341347_Automatic_spelling_correctio n_using_trigram_similarity_measure>, 3 pages.

Dave, IndexedRDD: Efficeint Fine-Grained Updates for RDD's, http://www.slideshare.net/SparkSummit/ankur-dave, Jun. 15, 2015.

Fu et al., Learning Semantic Hierarchies via Word Embeddings, Proceedings of the 52nd Annual Meeting of the Association for Computational Linguistics, Jun. 23-25, 2014 [retrieved Dec. 29, 2015], pp. 1199-1209. Retrieved from the Internet: <URL:http://ir.hit.edu.cn/~rjfu/ publications/acl2014.pdf>.

Jaccard, P., The Distribution of the Flora in the Alpine Zone, New Phytologist, vol. 11, No. 2, Feb. 29, 1912 [retrieved Dec. 29, 2015]. Retrieved from the Internet: <URL: http://www.researchgate.net/profile/Paul_Jaccard/publication/230302439_The_distribution_of_the_flora_in_the_alpine_zone/links/02e7e51cb76619a0fa000000.pdf>, 15 pages.

Malak, M., 17 Qualities of the Ideal Recommender System, Data Science Association, Aug. 9, 2014 [retrieved Dec. 29, 2015]. Retrieved from the Internet: <URL: http://datascienceassn.org/content/17-qualities-ideal-recommender-system>, 3 pages.

Malak, M., Extending Word2Vec for Performance and Semi-Supervised Learning, Oracle, Jun. 15, 2015 [retrieved Dec. 29, 2015]. Retrieved from the Internet: <URL: http://spark-summit.org/2015/talk/extending-word2vec-for-performance-and-semi-supervised-learning>, 39 pages.

Mikolov et al., Exploiting Similarities among Languages for Machine Translation, Sep. 17, 2013 [retrieved Dec. 29, 2015]. Retrieved from the Internet: <URL:http://arxiv.org/pdf/1309.4168.pdf>, 10 pages.

Ricci, F., Part 15: Knowledge-Based Recommender Systems, [retrieved Dec. 29, 2015]. Retrieved from the Internet: <URL: http://www.ics.uci.edu/~welling/teaching/CS77Bwinter12/presentations/course_Ricci/15-KnowledgeBased.pdf>, 58 pages.

Smetanin, N., Fuzzy string search, Nikita's Blog, Mar. 24, 2011 [retrieved Dec. 29, 2015]. Retrieved from the Internet: <URL: http://ntz-develop.blogspot.com/2011/03/fuzzy-string-search.html>, 13 pages.

Suchanek et al., YAGO: A Core of Semantic Knowledge Unifying WordNet and Wikipedia, WWW 2007, May 8-12, 2007, Banff, Alberta, Canada [retrieved Dec. 29, 2015]. Retrieved from the Internet: <URL: http://www2007.org/papers/paper391.pdf>, 10 pages.

Yang et al., Learning Multi-Relational Semantics Using Neural-Embedding Models, Cornell University Library, Nov. 14, 2014 [retrieved Dec. 29, 2015]. Retrieved from the Internet: <URL: http://arxiv.org/abs/1411.4072>, 5 pages.

Markines et al., Evaluating Similarity Measures for Emergent Semantics of Social Tagging, International World Wide Web Conference 18$^{th}$, Apr. 24, 2009, pp. 641-650.

Islam et al., Text Similarity Using Google Tri-grams, Advances in Artificial Intelligence, Springer Berlin Heidelberg, Berlin, Heidelberg, May 28, 2012, pp. 312-317.

Buscaldi et al., LIPN-CORE: Semantic Text Similarity using n-grams, WordNet, Syntactic Analysis, ESA and Information Retrieval based Features, Second Joint Conference on Lexical and Computational Semantics Proceedings of the Main Conference and the Shared Task, Jun. 13, 2013, pp. 162-168.

Sedding et al., WordNet-based Text Document Clustering, Proceedings of the 3$^{rd}$ Workshop on Robust Methods in Analysis of Natural Language Data, Romand '04, Jan. 1, 2004, pp. 104-113.

International Search Report and Written Opinion dated Dec. 9, 2015 in Int'l Patent Application No. PCT/US2015/052190, 22 pages.

U.S. Appl. No. 14/864,496, filed Sep. 24, 2015.
U.S. Appl. No. 14/864,505, filed Sep. 24, 2015.
U.S. Appl. No. 14/864,513, filed Sep. 24, 2015.
U.S. Appl. No. 14/864,520, filed Sep. 24, 2015.

Ouyang et al., "Sentiment Analysis Using Convolutional Neural Network", IEEE International Conference on Computer and Information Technology; Ubiquitous Computing and Communications; Dependable, Autonomic and Secure Computing; Pervasive Intelligence and Computing, Oct. 26-28, 2015, pp. 2359-2364 [retrieved Jun. 1, 2017]. Retrieved from the Internet: <http://ieeexplore.ieee.org/document/7363395/>, 6 pages.

U.S. Appl. No. 14/864,505, Non-Final Office Action dated Mar. 7, 2018, 17 pages.
U.S. Appl. No. 14/864,513, Non-Final Office Action dated Dec. 14, 2017, 27 pages.
U.S. Appl. No. 14/864,496, Non-Final Office Action dated Nov. 2, 2017, 20 pages.
U.S. Appl. No. 14/864,520, Non-Final Office Action dated Nov. 16, 2017, 23 pages.
U.S. Appl. No. 14/864,496, Final Office Action dated Jul. 3, 2018, 24 pages.
U.S. Appl. No. 14/864,520, Final Office Action dated Jul. 20, 2018, 28 pages.
U.S. Appl. No. 14/864,505, Final Office Action dated Jul. 31, 2018, 22 pages.
European Application No. 15781210.8, Summons to Attend Oral Proceedings dated Jun. 19, 2018, 10 pages.
European Application No. 15781486.4, Office Action dated Jun. 6, 2018, 7 pages.
U.S. Appl. No. 14/864,513, Final Office Action dated Sep. 5, 2018, 28 pages.

\* cited by examiner

Transform Script

Remove 123 columns
Rename Col_0001 to date_time
Rename Col_0003 to date_time_02
Rename Col_0004 to url
Rename Col_0007 to url
Rename Col_0010 to state
Rename Col_0011 to hexid
Rename Col_0019 to ip
Rename Col_0063 to url_02

Recommendations for All

Extract quarter_year from date_time_02
Extract year from date_time_02
Rename Col_0008 to city
Enrich column Col_0008 with city.county
Enrich column Col_0008 with city.state
Enrich column Col_0008 with city.population
Enrich column Col_0008 with city.lat

| date_time_02 | | date | 2012-03-12 09:21:45; 2012-03-07 18:47:25; 2012-03-12 09:35:37; 19:03:37; 2012-03-06 18:59:39; 2012-03-12 09:25:46 2012-03-06 |
|---|---|---|---|
| url | | string | http://www.acme.com/SH55126545/VD55177927; http://www.ac http://www.acme.com/SH55126545/VD55149415; http://www.ad http://www.acme.com/SH55587637/VD55178699; http://www.acm http://www.acme.com/SH55590040/VD55175948; http://www.acr http://www.acme.com/SH55580165/VD55156528; http://www.acr |
| Col_0005 | | string | shoes; clothing; movies; handbags; home&garden; tools; outdoors |
| Col_0006 | | string | WABC; WOI; KLKN; WCIB; WJBF; WFTS; WPVI; KSTP; WLS; KSAT |
| url | | uri | comcast.net; rr.com; qwest.net; verizon.net; 66.231.145; morrisbk wmx.net; windstream.net; 99.126.116.121 |
| Col_0008 | 412 | string | hawthorne; hendersonville; seminole; adel; new york; carperterville |
| Col_0009 | | string | usa |
| state | | string | fl; ne; nc; il; ia; mn; pa; in; ny; tx |
| hexid | 410 | string | D84F55C8-FD75-422A-AB3F-F51A357BA6AC; E733FA17-4501-42B8 8C08-6014DFB65B2D; 7C591A2-9277-4DCE-87C4-EBC26FFC1BC7 B15166CA-CFA1-48B9-A884-3C49292AC5F6; 2A078DC0-0G7E-4C55 DB03-C35C19CD9FEF; D4A080B5-E392-4F73-854C-0FE20AEC3D3B |
| Col_0012 | | string | 25-Sep-89; 15-Sep-88; 26-Mar85; 20-Sep-91; 30-Apr-74, 17-Feb-87; |
| Col_0013 | | string | F; M; U |
| Col_0014 | | number | 2835601809791661455; 2838075983681199491; 2807235772834861 |

Home | Services | Policies | Documentation

500

Transforms — 504

☐ Import ☐ Export View [All ▼]

☒ Split data repeatedly on newline into rows
☒ Split split repeatedly on ';'
☒ Promote row 0 to header
Delete empty rows

Recommendations — 506

☒ Remove column NationalID
☒ Remove punctuation NationalID

☐ Apply All ☐ Clear All

Clickstream — 508

☐ Undo ☐ Redo ☐ Reset ☐ Refresh

| Column | Type | Sample Values |
|---|---|---|
| ip | NUM | ********* ********* ********* |
| id | ABC | Mozilla/5.0 (Windows NT 6.1); WOW64; rv:10.0.2 |
| unknown1 | ABC |  |
| date_time | DATE | 2012-03-14 20:48:56; 2012-03-14 20:50:13; 2012-03-14 20:59:15; 2012- |
| url | ABC | http://www.acme.com/SH55826371/VD55820B2 |
| category | ABC | accessories; computers; books; clothing; home&garden; movies; automo |
| local_broadcaster | ABC | WPLG; KXLY; WTEN; WKRT |
| major_broadcaster | ABC | ABC; KGO; LKMBC; WABC |
| unknown2 | ABC | swbell.net; sbcflobal.net; comcast.net; cox.net; ameritech.neoxr.com |
| city | ABC | corsicana; oklahoma; city; west; hartford; lehi; san diego; topeka |
| state | ABC | oklahoma; new york; new jersey; california; texas; florida |
| category | ABC | accessories; computers; books; clothing; home&garden; movies; automo |
| local_broadcaster | ABC | WPLG; KXLY; WTEN; WKRT |
| major_broadcaster | ABC | ABC; KGO; LKMBC; WABC |
| unknown2 | ABC | swbell.net; sbcflobal.net; comcast.net; cox.net; ameritech.neoxr.com |
| city | ABC | corsicana; oklahoma; city; west; hartford; lehi; san diego; topeka |
| state | ABC | oklahoma; new york; new jersey; california; texas; florida |

Page [2] of 24 (1-8 of 24 items)    |< < 1 [2] 3 > >|

☐ Clear All

Profile Results — 502

Total Rows: 448,039
Total Columns: 65
Columns Identified: 63
Privacy Alerts: 0

Show more...

*FIG. 5A*

| Character Offset | Character | Partial Matches |
|---|---|---|
| Initial state | n/a | (1, ROOT) |
| 1 | c | (1, c) (2, ROOT) |
| 2 | a | (1, a) (3, ROOT) |
| 3 | c | (3, c) (4, ROOT) |
| 4 | a | (3, a) (5, ROOT) |
| 5 | t | (3, t) (5, t) (6, ROOT) |
| 6 | c | (3, c) (6, c) (7, ROOT) |
| 7 | h | (3, h) (8, ROOT) |

FIG. 7

Matching Domains for City
1002

| Domain | Frequency | Pop | Match | Unique | Size | Select | Score |
|---|---|---|---|---|---|---|---|
| | 1004 | 1006 | 1008 | 1010 | 1012 | 1014 | 1016 |
| City | 14661 | 15000 | 97.74% | 3352 | 5077990 | 0.07% | 57 |
| populated_place | 10790 | 15000 | 91.95% | 3170 | 4994175 | 0.07% | 48 |
| seat_of_a_second_order_administrative_division | 8568 | 15000 | 57.12% | 1160 | 34707 | 3.4% | 39 |
| Geographical_Spot | 9281 | 15000 | 61.85% | 1626 | 2285843 | 0.07% | 31 |
| name_last | 4985 | 15000 | 33.1% | 1032 | 58050 | 2% | 21 |
| farm | 5587 | 15000 | 37.25% | 713 | 331820 | 0.2% | 19 |
| Park_or_Area | 4862 | 15000 | 32.41% | 607 | 385013 | 0.21% | 17 |
| section_of_populated_place | 4500 | 15000 | 25% | 628 | 66016 | 0.66% | 16 |
| area | 3553 | 15000 | 24.95% | 599 | 74046 | 0.81% | 14 |
| Political_Region | 4210 | 15000 | 26.07% | 656 | 428617 | 0.14% | 14 |

Close

*FIG. 10*

TECHNIQUES FOR SIMILARITY ANALYSIS AND DATA ENRICHMENT USING KNOWLEDGE SOURCES

CROSS-REFERENCE TO RELATED APPLICATIONS

The present application is a non-provisional application of and claims the benefit and priority of the following applications:
1) U.S. Provisional Application No. 62/056,468, filed on Sep. 26, 2014 and titled "METHOD FOR SEMANTIC ENTITY EXTRACTION BASED ON GRAPH MATCHING WITH AN EXTERNAL KNOWLEDGE-BASE AND SIMILARITY RANKING OF DATASET METADATA FOR SEMANTIC INDEXING, SEARCH, AND RETRIEVAL"; and
2) U.S. Provisional Application No. 62/163,296, filed May 18, 2015 and titled "CATEGORY LABELING"; and
3) U.S. Provisional Application No. 62/203,806, filed Aug. 11, 2015 and titled "SIMILARITY METRIC ANALYSIS AND KNOWLEDGE SCORING SYSTEM".

The present application is related to the following applications:
1) U.S. Provisional Application No. 62/056,471, filed Sep. 26, 2014 and titled "DECLARATIVE LANGUAGE AND VISUALIZATION SYSTEM FOR RECOMMENDED DATA TRANSFORMATIONS AND REPAIRS"; and
2) U.S. Provisional Application No. 62/056,474, filed on Sep. 26, 2014 and titled "DYNAMIC VISUAL PROFILING AND VISUALIZATION OF HIGH VOLUME DATASETS AND REAL-TIME SMART SAMPLING AND STATISTICAL PROFILING OF EXTREMELY LARGE DATASETS"; and
3) U.S. Provisional Application No. 62/056,475, filed Sep. 26, 2014 and titled "AUTOMATED ENTITY CORRELATION AND CLASSIFICATION ACROSS HETEROGENEOUS DATASETS"; and
4) U.S. Provisional Application No. 62/056,476, filed Sep. 26, 2014 and titled DECLARATIVE EXTERNAL DATA SOURCE IMPORTATION, EXPORTATION, AND METADATA REFLECTION UTILIZING HTTP AND HDFS PROTOCOLS".

The entire contents of the above-identified patent applications are incorporated herein by reference for all purposes.

BACKGROUND

The present disclosure relates generally to data preparation and analysis. More particularly, techniques are disclosed for performing similarity metric analysis and data enrichment using knowledge sources.

Before "big data" systems can analyze data to provide useful results, the data needs to be added to the big data system and formatted such that it can be analyzed. This data onboarding presents a challenge for current cloud and "big data" systems. Typically, data being added to a big data system is noisy (e.g., the data is formatted incorrectly, erroneous, outdated, includes duplicates, etc.). When the data is analyzed (e.g., for reporting, predictive modeling, etc.) the poor signal to noise ratio of the data means the results are not useful. As a result, current solutions require substantial manual processes to clean and curate the data and/or the analyzed results. However, these manual processes cannot scale. As the amount of data being added and analyzed increases, the manual processes become impossible to implement.

Big data systems may be implemented to analyze data to identify other similarly related data. Processing volumes of data becomes a challenge. Even further, the structure, or lack thereof, of the data that is analyzed may pose greater challenges for determining the content and relationship of the data.

Machine learning may be implemented to analyze the data. For example, unsupervised machine learning may be implemented using a data analysis tool (e.g., Word2Vec) to determine similarities amongst data; however, unsupervised machine learning may not be able to provide information indicating a group or category associated with closely related data. Thus, unsupervised learning may be unable to determine a genus or category of a set of species (e.g., terms) that are closely related. On the other hand, supervised machine learning based on a curated knowledge source (e.g., YAGO, from the Max Planck Institute for Informatics) may provide better results for determining a group or a category for data. Supervised learning may provide inconsistent and/or incomplete results. Data provided by a curated knowledge source may be sparse and the quality may depend on the curator. Categories identified based on use of supervised learning may not provide the correct categorization of similarly related data. Multiple knowledge sources may implement different categorization, such that multiple sources can be difficult to merge. Analyzing data to determine similarities and relationships may become more burdensome due to misspellings of terms in the data that is analyzed. Similar data may not be easily identified when the data contains misspellings.

Certain embodiments of the present invention address these and other challenges.

BRIEF SUMMARY

The present disclosure relates generally to data preparation and analysis. More particularly, techniques are disclosed for performing similarity metric analysis and data enrichment using knowledge sources.

The present disclosure relates generally to a data enrichment service that extracts, repairs, and enriches datasets, resulting in more precise entity resolution and correlation for purposes of subsequent indexing and clustering. The data enrichment service can include a visual recommendation engine and language for performing large-scale data preparation, repair, and enrichment of heterogeneous datasets. This enables the user to select and see how the recommended enrichments (e.g., transformations and repairs) will affect the user's data and make adjustments as needed. The data enrichment service can receive feedback from users through a user interface and can filter recommendations based on the user feedback. In some embodiments, the data enrichment service can analyze data sets to identify patterns in the data.

In some embodiments, the data enrichment service can compare an input data set to reference data sets stored in a knowledge source to identify similarly related data. Matching can be performed between the input data and the reference data set(s) without supervised training (e.g., machine learning) and extraction precision can be improved over time via adaptive feedback from an end user. In some embodiments, a similarity metric can be calculated corresponding to the semantic similarity of two or more datasets. The similarity metric can be used to identify datasets based on their metadata attributes and data values enabling easier indexing and high performance retrieval of data values.

As discussed above, processing volumes of data becomes a challenge, especially depending on the structure, or lack thereof, of the data that is analyzed. Due to misspellings and differences in curation of reference data sets that lead to errors in categorization, identifying similar or related data becomes difficult. The techniques described herein provide a more refined similarity metric, which can improve automated identification of closely related data sets having semantic similarity to the input data set. By identifying more similarly related data sets, an input data set may be enriched with data from the related data sets. The enrichment of input data sets enables a user to understand and manage large volumes of data that may otherwise be difficult to manage. For example, a user can determine whether certain data sets related to a particular topic and if so, whether there is related data on the topic. In some embodiments, the reference data sets may be updated to reflect the relationship with input data based on the similarity metric. The reference data sets may thus be enriched for subsequent use in determining a similarity with other input data sets.

In some embodiments, the data enrichment service can render a graphical interface that displays the similarity metric for each of multiple reference data sets that are compared to an input data set. The graphical interface may enable a user to choose a transformation that is based one of the reference data sets for which the similarity metric is shown. The similarity metric, thus enables a user to selectively choose reference data to enrich a data set from a data source.

In some embodiments, the techniques disclosed herein provide ways to present a user with classifications of data received from a data source. The techniques provide advantages over unsupervised machine learning that may not be able to determine a genus or category of a set of species (e.g., terms) that are closely related. The techniques further provide more consistent and complete classification of data by apply unsupervised machine learning techniques in combination with merging multiple sources for supervised machine learning. Such techniques can account for different levels of curation and misspellings or miscategorization of terms.

In some embodiments, the data enrichment service can determine similarity metrics by comparing the terms in an input data set to terms in a data set from a knowledge source. A similarity metric may be calculated using various techniques disclosed herein. The similarity metric may be represented as a score. An input data set may be compared to multiple data sets, each of which may be associated with a category (e.g., a domain). The similarity metric may be computed for the comparison of each data set to the input data set. As such, the similarity metric may indicate a degree of match, such that a greater degree of match may be identified based on a value of the similarity metric (e.g., the greatest similarity indicated by the highest value). A similarity metric determined using one or more of the techniques disclosed herein may provide a greater degree of certainty for a matching between the input the data set and a data set provided by a knowledge source.

The data enrichment service may implement several different techniques to determine the similarity of an input data set to one or more data sets. A input data set can be associated with or labeled with a category (e.g., domain) associated with the data set having the best match (e.g., a highest degree of similarity) with the input data set. As such, the input data set can be modified, or enriched with a category name that enables a user to better identify the input data set. In at least one embodiment, the data enrichment service may combine unsupervised learning techniques with supervised learning techniques to more accurately label categories of input data. The similarity of an input data set with a data set provided by a knowledge source can be used to query a knowledge source to obtain additional information about the data set. The additional information can be used to provide recommendations to the user.

In some embodiments, a computing system may be implemented for performing a similarity metric analysis on data in comparison to data sets provided by a knowledge source. The computing system may implement a data enrichment service. The computing system may be configured to implement methods and operations described herein. The system may include a plurality of input data sources and a plurality of data targets. The system may include a cloud computing infrastructure system comprising one or more processors communicatively coupled to the plurality of input data sources and communicatively coupled to the plurality of data targets, over at least one communication network. The cloud computing infrastructure system may include a memory coupled to the one or more processors, the memory storing instructions to provide a data enrichment service, where the instructions, when executed by the one or more processors, cause the one or more processors to perform one or more methods or operations described herein. Yet other embodiments relate to systems and machine-readable tangible storage media, which employ or store instructions for methods and operations described herein.

In at least one embodiment, a method includes receiving an input data set from one or more input data sources. The input data set may be formatted into one or more columns of data. The method may include comparing the input data set to one or more reference data sets obtained from a reference source. The reference source may be a knowledge source provided by a knowledge service. The input data set may be compared to the one or more reference data sets using one or more of graph matching or semantic similarity matching. The method may include computing a similarity metric for each of the one or more reference data sets, the similarity metric indicating a measure of similarity of each of the one or more reference data sets in comparison to the input data set. The method may include identifying a match between the input data set and the one or more reference data sets based on the similarity metric. In some embodiments, the method may include: generating a graphical interface that indicates the similarity metric computed for each of the one or more reference data sets and that indicates the match identified between the input data set and the one or more reference data sets; and rendering, using the graphical interface, a graphical visualization that indicates the similarity metric computed for each of the one or more reference data sets and that indicates the match identified between the input data set and the one or more reference data sets. In some embodiments, the method may include: storing the input data set with matching information that indicates the similarity metric computed for each of the one or more reference data sets and that indicates the match identified between the input data set and the one or more reference data sets; identifying a category label for the input data set based on identifying the match between the input data set and the one or more reference data sets; and storing the input data set in association with the category label.

In some embodiments, the one or more reference data sets include terms associated with a domain. The similarity metric may be a matching score computed for each of the one or more reference data sets. The matching score may be computed using one or more values including a first value indicating a metric about the reference data set and a second value indicating a metric based on comparing the input data set to the reference data set. The graphical visualization may be rendered to indicate the one or more values used to compute the matching score. The one or more values may include a frequency value of terms matching between the input data set and the data set, a population value of the data set, unique matching value that indicates the number of different terms matching between the input data set and the data set, a domain value indicating the number of terms in the data set, and a curation level indicating a degree of curation of the data set.

In some embodiments, the method may further include: generating an augmentation list based on augmentation data obtained from an aggregation service; and augmenting the input data set based on the augmentation list. The input data may be compared to the one or more reference data sets is augmented based on the augmentation list. The method may further include generating an indexed trigram table based on the one or more reference data sets. The method may include, for each word in the input data set after augmentation: creating trigrams for the word; comparing each of the trigrams to the indexed trigram table; identifying a word in the indexed trigram table associated with a trigram that matches a first trigram in the trigrams; and storing the word in a trigram augmented data set. The method may include comparing the trigram augmented data set to the one or more reference data sets and determining a match between the trigram augmented data set and the one or more reference data sets based on the comparing. Identifying the match between the input data set and the one or more reference data sets may be performed using the match between the trigram augmented data set and the one or more reference data sets based on the comparing.

In some embodiments, the method may include generating a data structure that represents at least a portion of the one or more reference data sets. Each node in the data structure represents a different character in one or more strings extracted from the one or more reference datasets. The input data set may be compared to the one or more reference data sets by traversing the data structure. The similarity metric may be computed as a value based on cardinality of an intersection of the one or more reference data sets in comparison to the input data set. The value may be normalized by the cardinality. The value may be reduced by a first factor based on a size of the one or more reference data sets, and the value may be reduced by a second factor based on a type of the one or more reference data sets.

In some embodiments, the similarity metric may be computed for each reference data set of the one or more reference data sets by determining a cosine similarity between the input data set and the reference data set. The similarity metric may be computed using one or more of a Jaccard Index, a Tversky Index, or a Dice-Sorensen Index. Identifying the match may include determining a reference data of the one or more reference data sets having a highest measure of similarity based on the similarity metric computed for each of the one or more reference data sets.

The foregoing, together with other features and embodiments will become more apparent upon referring to the following specification, claims, and accompanying drawings.

BRIEF DESCRIPTION OF THE DRAWINGS

FIGS. 4A-4D depict examples of a user interface that provides interactive data enrichment, in accordance with an embodiment of the present invention.

FIGS. 5A-5D depict examples of various user interfaces that provide visualizations of datasets, in accordance with an embodiment of the present invention.

FIG. 7 depicts an example state table, in accordance with an embodiment of the present invention.

FIG. 10 depicts examples of a graphical interface that displays knowledge scoring for different knowledge domains, in accordance with an embodiment of the present invention.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

The present disclosure relates generally to a data enrichment service that extracts, repairs, and enriches datasets, resulting in more precise entity resolution and correlation for purposes of subsequent indexing and clustering. In some embodiments, the data enrichment service includes an extensible semantic pipeline, which processes the data in a number of stages, from ingestion of the data to analysis of the data, to publishing of the data-to-data targets.

In certain embodiments of the present invention, prior to loading data into a data warehouse (or other data target) the data is processed through a pipeline (also referred to herein as a semantic pipeline) which includes various processing stages. In some embodiments, the pipeline can include an ingest stage, prepare stage, profile stage, transform stage, and publish stage. During processing, the data can be analyzed, prepared, and enriched. The resulting data can then be published (e.g., provided to a downstream process) into one or more data targets (such as local storage systems, cloud-based storage services, web services, data warehouses, etc.) where various data analytics can be performed on the data. Because of the repairs and enrichments made to the data, the resulting analyses produce useful results. Additionally, because the data onboarding process is automated, it can be scaled to process very large data sets that cannot be manually processed due to volume.

In some embodiments, data can be analyzed to extract entities from the data, and based on the extracted entities, the data can be repaired. For example, misspellings, address errors, and other common mistakes present a complex problem to big data systems. For small quantities of data, such errors can be manually identified and corrected. However, in very large data sets (e.g., billions of nodes or records) such manual processing is not possible. In certain embodiments of the present invention, the data enrichment service can analyze data using a knowledge service. Based on the contents of the knowledge service, entities in the data can be identified. For example, an entity can be an address, a business name, a location, a person name, an identification number, etc.

Figure 1:
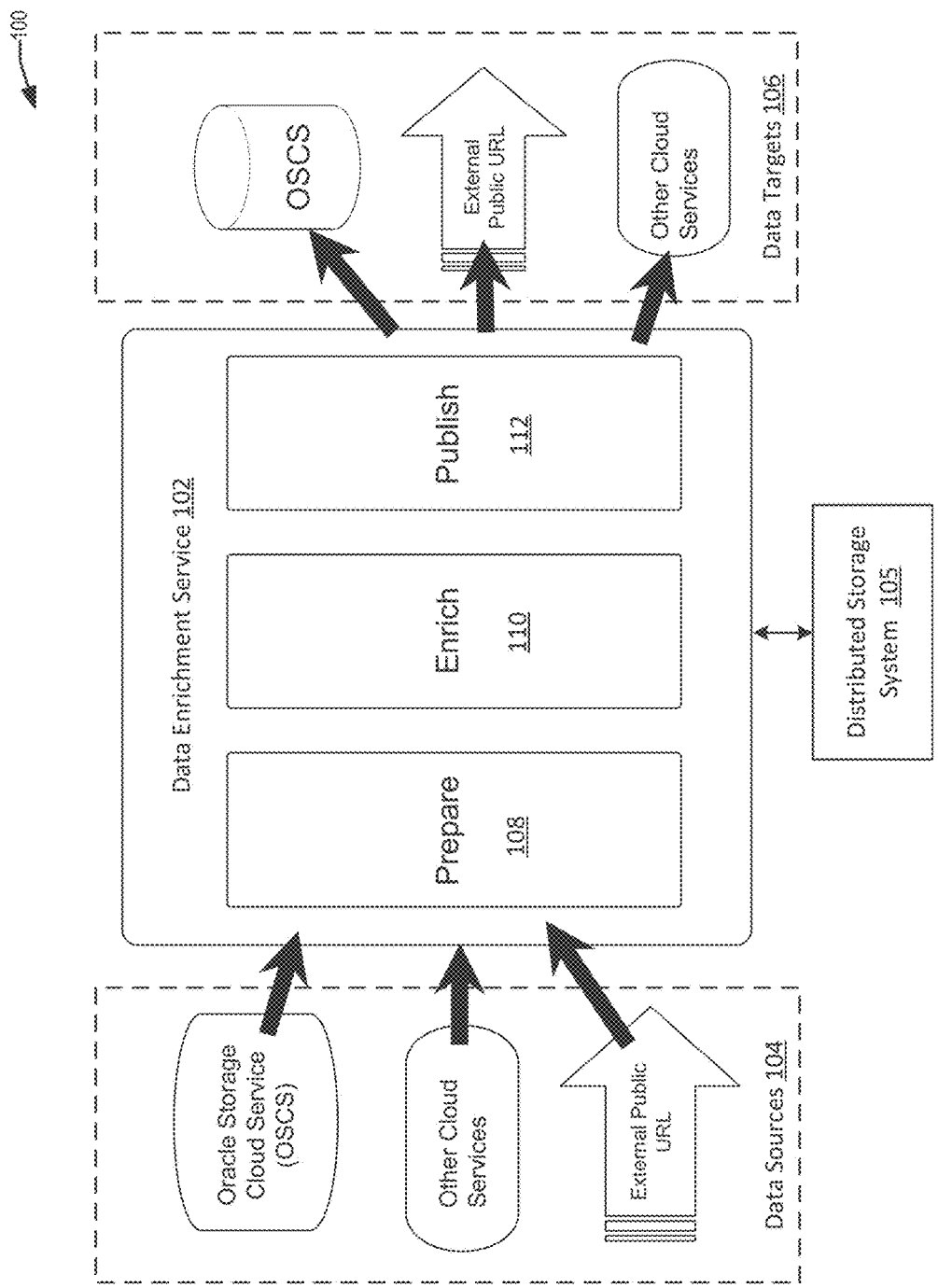
FIG. 1 depicts a simplified high-level diagram of a data enrichment system, in accordance with an embodiment of the present invention.

FIG. 1 depicts a simplified high-level diagram 100 of a data enrichment service, in accordance with an embodiment of the present invention. As shown in FIG. 1, a cloud-based data enrichment service 102 can receive data from various data sources 104. In some embodiments, a client can submit a data enrichment request to data enrichment service 102 which identifies one or more of the data sources 104 (or portions thereof, e.g., particular tables, datasets, etc.). The data enrichment service 102 may then request data to be processed from the identified data sources 104. In some embodiments, the data sources may be sampled, and the sampled data analyzed for enrichment, making large data sets more manageable. The identified data can be received and added to a distributed storage system (such as a Hadoop Distributed Storage (HDFS) system) accessible to the data enrichment service. The data may be processed semantically by a number of processing stages (described herein as a pipeline or semantic pipeline). These processing stages can include preparation stages 108, enrichment stages 110, and publishing stages 112. In some embodiments, data can be processed in one or more batches by the data enrichment services. In some embodiments, a streaming pipeline can be provided that processes data as it is received.

In some embodiments, a prepare stage 108 can include various processing sub-stages. This may include automatically detecting a data source format and performing content extraction and/or repair. Once the data source format is identified, the data source can be automatically normalized into a format that can be processed by the data enrichment service. In some embodiments, once a data source has been prepared, it can be processed by an enrich stage 110. In some embodiments, inbound data sources can be loaded into a distributed storage system 105 accessible to the data enrichment service (such as an HDFS system communicatively coupled to the data enrichment service). The distributed storage system 105 provides a temporary storage space for ingested data files, which can then also provide storage of intermediate processing files, and for temporary storage of results prior to publication. In some embodiments, enhanced or enriched results can also be stored in the distributed storage system. In some embodiments, metadata captured during enrichment associated with the ingested data source can be stored in the distributed storage system 105. System level metadata (e.g., that indicates the location of data sources, results, processing history, user sessions, execution history, and configurations, etc.) can be stored in the distributed storage system or in a separate repository accessible to the data enrichment service.

In certain embodiments, the enrichment process 110 can analyze the data using a semantic bus (also referred to herein as a pipeline or semantic pipeline) and one or more natural language (NL) processors that plug into the bus. The NL processors can automatically identify data source columns, determine the type of data in a particular column, name the column if no schema exists on input, and/or provide metadata describing the columns and/or data source. In some embodiments, the NL processors can identify and extract entities (e.g., people, places, things, etc.) from column text. NL processors can also identify and/or establish relationships within data sources and between data sources. As described further below, based on the extracted entities, the data can be repaired (e.g., to correct typographical or formatting errors) and/or enriched (e.g., to include additional related information to the extracted entities).

In some embodiments, a publish stage 112 can provide data source metadata captured during enrichment and any data source enrichments or repairs to one or more visualization systems for analysis (e.g., display recommended data transformations, enrichments, and/or other modifications to a user). The publishing sub-system can deliver the processed data to one or more data targets. A data target may correspond to a place where the processed data can be sent. The place may be, for example, a location in memory, a computing system, a database, or a system that provides a service. For example, a data target may include Oracle Storage Cloud Service (OSCS), URLs, third party storage services, web services, and other cloud services such as Oracle Business Intelligence (BI), Database as a Service, and Database Schema as a Service. In some embodiments, a syndication engine provides customers with a set of APIs to browse, select, and subscribe to results. Once subscribed and when new results are produced, the results data can be provided as a direct feed either to external web service endpoints or as bulk file downloads.

Figure 2:
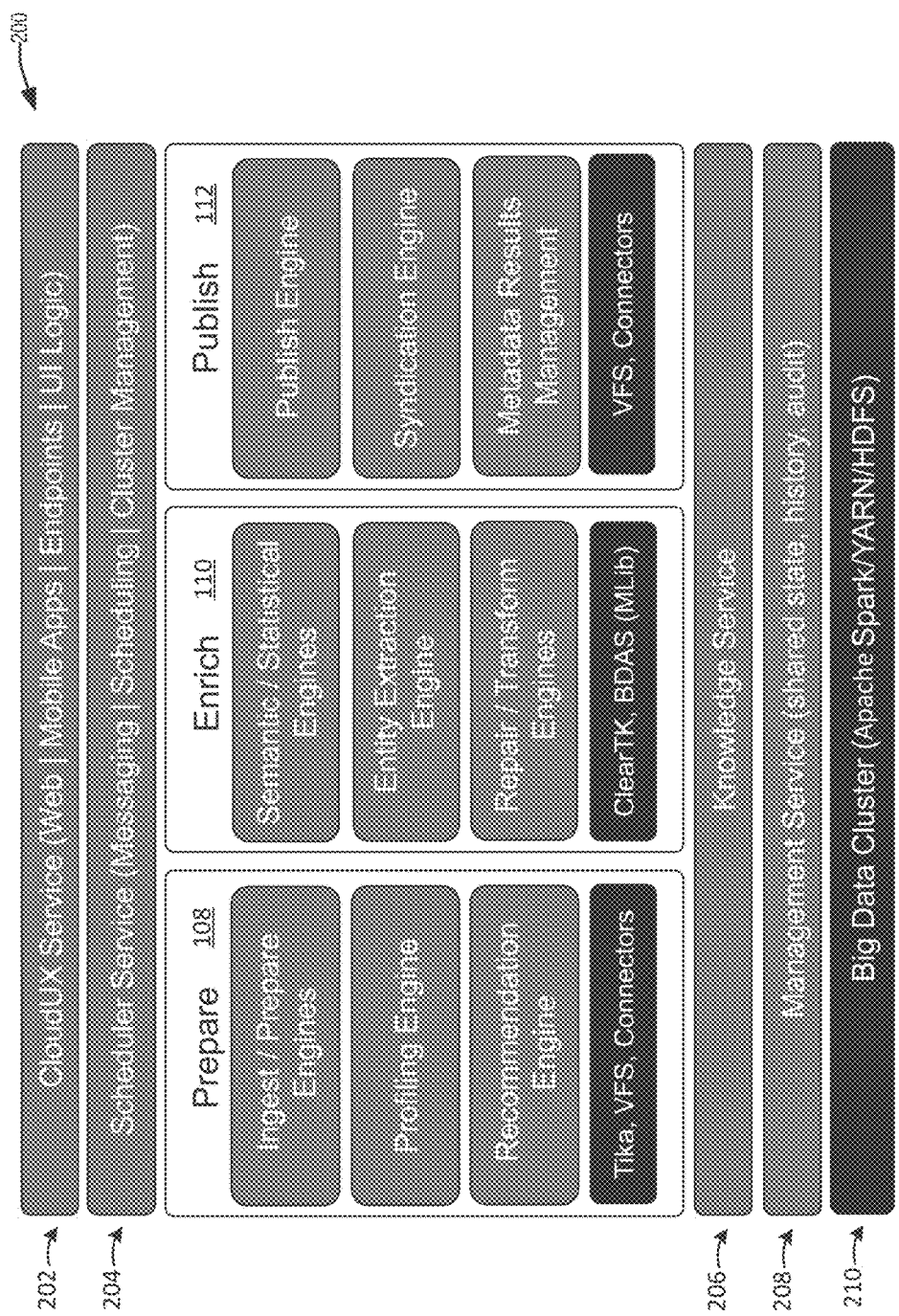
FIG. 2 depicts a simplified block diagram of a technology stack, in accordance with an embodiment of the present invention.

FIG. 2 depicts a simplified block diagram 200 of a technology stack, in accordance with an embodiment of the present invention. In some embodiments, the data enrichment service can be implemented using the logical technology stack shown in FIG. 2. The technology stack can include a user interface/experience (UX) layer 202 that provides access to the data enrichment service through one or more client devices (e.g., using a thin client, thick client, web browser, or other application executing on the client devices). A scheduler service 204 can manage requests/responses received through the UX layer and can manage the underlying infrastructure on which the data enrichment service executes.

In some embodiments, the processing stages described above with respect to FIG. 1, can include a number of processing engines. For example, the prepare processing stage 108 can include ingest/prepare engines, a profiling engine and a recommendation engine. As data is ingested during prepare processing, the data (or samples thereof) can be stored in a distributed data storage system 210 (such as a "big data" cluster). The enrich processing stage 110 can include semantic/statistical engines, an entity extraction engine, and repair/transform engines. As described further below, the enrich processing stage 110 can utilize information obtained from knowledge service 206 during the enrichment process. Enrichment actions (e.g., the addition and/or transformation of data) can be performed on the data stored in the distributed storage system 210. Transformation of data may include modification to add missing data or data to enrich the data. Transformation of data may include modifying errors in the data or repairing the data. The publish processing stage 112 can include a publish engine, a syndication engine, and a metadata results manager. In some embodiments, various open source technologies can be used to implement some functionality within the various processing stages and/or processing engines. For example, file format detection can use Apache Tika.

In some embodiments, a management service 208 can monitor changes made to the data during enrichment processing 110. The monitored changes can include tracking which users accessed the data, which data transformations were performed, and other data. This can enable the data enrichment service to roll back enrichment actions.

Technology stack 200 can be implemented in an environment such as a cluster 210 for big data operations ("Big Data Cluster"). Cluster 210 can be implemented using Apache Spark, which provides a set of libraries for implementing a distributed computing framework compatible with a distributed file system (DFS) such as HDFS. Apache Spark can send requests for map, reduce, filter, sort, or Sample cluster processing jobs to effective resource managers like YARN. In some embodiments, cluster 210 can be implemented using a distributed file system offering such as one offered by Cloudera®. The DFS, such as one offered by Cloudera®, may include HDFS and Yarn.

Figure 3:
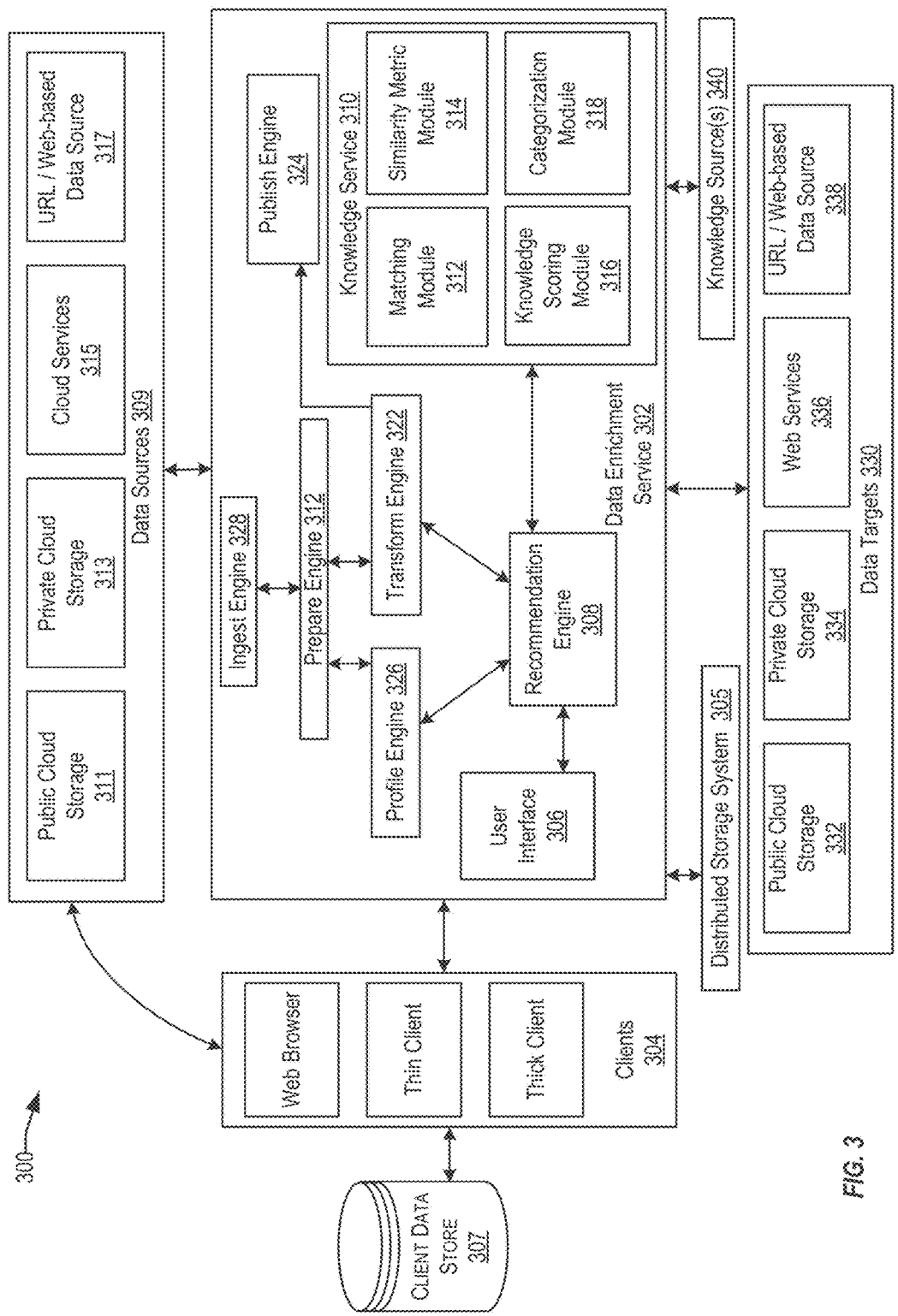
FIG. 3 depicts a simplified block diagram of a data enrichment system, in accordance with an embodiment of the present invention.

FIG. 3 depicts a simplified block diagram of an interactive visualization system, in accordance with an embodiment of the present invention. As shown in FIG. 3, a data enrichment service 302 can receive data enrichment requests from one or more clients 304. Data enrichment system 300 may implement a data enrichment service 302. Data enrichment service 302 can receive data enrichment requests from one or more clients 304. Data enrichment service 302 may comprise one or more computers and/or servers. Data enrichment service 302 may be a module that is comprised of several subsystems and/or modules, including some, which may not be shown. Data enrichment service 302 may have more or fewer subsystems and/or modules than shown in the figure, may combine two or more subsystems and/or modules, or may have a different configuration or arrangement of subsystems and/or modules. In some embodiments, data enrichment service 302 may include user interface 306, ingest engine 328, recommendation engine 308, knowledge service 310, profile engine 326, transform engine 322, a prepare engine 312, and publish engine 324. The elements implementing data enrichment service 302 may operate to implement a semantic processing pipeline as described above.

Data enrichment system 300 may include a semantic processing pipeline, in accordance with an embodiment of the present invention. All or part of the semantic processing pipeline may be implemented by data enrichment service 102. When a data source is added, the data source and/or the data stored thereon can be processed through a pipeline prior to loading the data source. The pipeline can include one or more processing engines that are configured to process the data and/or data source before publishing the processed data to one or more data targets. The processing engines can include an ingest engine that extracts raw data from the new data source and provides the raw data to a prepare engine.

The prepare engine can identify a format associated with the raw data and can convert the raw data into a format (e.g., normalize the raw data) that can be processed by the data enrichment service 302. A profile engine can extract and/or generate metadata associated with the normalized data and a transform engine can transform (e.g., repair and/or enrich) the normalized data based on the metadata. The resulting enriched data can be provided to the publish engine to be sent to one or more data targets. Each processing engine is described further below.

In some embodiments, data enrichment service 302 may be provided by a computing infrastructure system (e.g., a cloud computing infrastructure system). The computing infrastructure system may be implemented in a cloud computing environment having one or more computing systems. The computing infrastructure system may be communicatively coupled, over one or more communication networks, to one or more data sources or one or more data targets such as those described herein.

The clients 304 can include various client devices (such as desktop computers, laptop computers, tablet computers, mobile devices, etc.). Each client device can include one or more client applications 304 through which the data enrichment service 302 can be accessed. For example, a browser application, a thin client (e.g., a mobile app), and/or a thick client can execute on the client device and enable the user to interact with the data enrichment service 302. The embodiment depicted in FIG. 3 is merely an example and is not intended to unduly limit the claimed embodiments of the present invention. One of ordinary skill in the art would recognize many variations, alternatives, and modifications. For example, there may be more or fewer client devices than those shown in the figures.

The client devices 304 may be of various different types, including, but not limited to personal computers, desktops, mobile or handheld devices such as a laptop, a mobile phone, a tablet, etc., and other types of devices. A communication network facilitates communications between client devices 304 and data enrichment service 302. The communication network can be of various types and can include one or more communication networks. Examples of communication network 106 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, the communication network may include any communication network or infrastructure that facilitates communications between clients and data enrichment service 302.

A user can interact with the data enrichment service 302 through user interface 306. Clients 304 can render a graphical user interface to display the user's data, recommendations for transforming the user's data, and to send and/or receive instructions ("transformation instructions") to the data enrichment service 302 through user interface 306. The user interfaces disclosed herein, such as those references in FIGS. 4A-4D, 5A-5D, and 10, may be rendered by data enrichment service 302 or via clients 304. For example, a user interface may be generated by user interface 306, and rendered by data enrichment service 302 at any one of clients 304. A user interface may be provided by data enrichment system 302 via network as part of a service (e.g., a cloud service) or a network-accessible application. In at least one example, an operator of a data enrichment service 302 may operate one of clients 304 to access and interact with any user interfaces disclosed herein. The user can send instructions to user interface 306 to add data sources (e.g., provide data source access and/or location information, etc.).

Data enrichment service 302 may ingest data using ingest engine 328. Ingest engine 328 can serve as an initial processing engine when a data source is added. The ingest engine 328 can facilitate safe, secure, and reliable uploading of user data from one or more data sources 309 into data enrichment service 302. In some embodiments, ingestion engine 328 can extract data from the one or more data sources 309 and store it in a distributed storage system 305 in data enrichment service 302. Data ingested from one or more data sources 309 and/or one or more clients 304 can be processed as described above with respect to FIGS. 1-2 and stored in a distributed storage system 305. Data enrichment service 302 can receive data from a client data store 307 and/or from one or more data sources 309. The distributed storage system 305 can serve as temporary storage for the uploaded data during the remaining processing stages of the pipeline, prior to the data being published to one or more data targets 330. Once an upload is complete, the prepare engine 312 can be invoked to normalize the uploaded data set.

The received data may include structured data, unstructured data, or a combination thereof. Structure data may be based on data structures including, without limitation, an array, a record, a relational database table, a hash table, a linked list, or other types of data structures. As described above, the data sources can include a public cloud storage service 311, a private cloud storage service 313, various other cloud services 315, a URL or web-based data source 317, or any other accessible data source. A data enrichment request from the client 304 can identify a data source and/or particular data (tables, columns, files, or any other structured or unstructured data available through data sources 309 or client data store 307). Data enrichment service 302 may then access the identified data source to obtain the particular data specified in the data enrichment request. Data sources can be identified by address (e.g., URL), by storage provider name, or other identifier. In some embodiments, access to a data source may be controlled by an access management service. The client 304 may display a request to the user to input a credential (e.g., username and password) and/or to authorize the data enrichment service 302 to access the data source.

In some embodiments, data uploaded from the one or more data sources 309 can be modified into various different formats. The prepare engine 312 can convert the uploaded data into a common, normalized format, for processing by data enrichment service 302. Normalizing may be performed by routines and/or techniques implemented using instructions or code, such as Apache Tika distributed by Apache®. The normalized format provides a normalized view of data obtained from the data source. In some embodiments, the prepare engine 312 can read a number of different file types. Prepare engine 312 can normalize the data into a character separated form (e.g., tab separated values, comma separated values, etc.) or as a JavaScript Object Notation (JSON) document for hierarchical data. In some embodiments, various file formats can be recognized and normalized. For example, standard file formats such as Microsoft Excel® formats (e.g., XLS or XLSX), Microsoft Word® formats (e.g., DOC or DOCX), and portable document format (PDF), and hierarchical formats like JSON and extended markup language (XML), can be supported. In some embodiments, various binary encoded file formats and serialized object data can also be read and decoded. In some embodiments, data can be provided to the pipeline in Unicode format (UTF-8) encoding. Prepare engine 312 can perform context extraction and conversion to the file types expected by data enrichment service 302, and can extract document level metadata from the data source.

Normalizing a data set mat include converting raw data in a data set into a format that is processable by the data enrichment service 302, in particular profile engine 326. In one example, normalizing the data set to create a normalized data set includes modifying the data set having one format to an adjusted format as a normalized data set, the adjusted format being different from the format. A data set may be normalized by identifying one or more columns of data in the data set, and modifying a format of the data corresponding to the columns to the same format. For example, data having different formatted dates in a data set may be normalized by changing the formats to a common format for the dates that can be processed by profile engine 326. Data may be normalized by being modified or converted from a non-tabular format to a tabular format, having one or more columns of data.

Once the data has been normalized, the normalized data can be passed to profile engine 326. The profile engine 326 can perform a column by column analysis of normalized data to identify the types of data stored in the columns and information about how the data is stored in the columns. In this disclosure, although profile engine 326 is described in many instances as performing operations on data, the data processed by profile engine 326 has been normalized by prepare engine 312. In some embodiments, the data processed by profile engine 326 may include data that is not normalized for being in a format (e.g., a normalized format) processable by profile engine 326. The output, or results, of profile engine 326 may be metadata (e.g., source profile) indicating profile information about the data from a source. The metadata may indicate one or more patterns about the data and/or a classification of the data. As further described below, the metadata may include statistical information based on analysis of the data. For example, profile engine 326 can output a number of metrics and pattern information about each identified column, and can identify schema information in the form of names and types of the columns to match the data.

The metadata generated by profile engine 326 may be used by other elements of data enrichment service, e.g., recommendation engine 308 and transformation engine 322, to perform operations as described herein for data enrichment service 302. In some embodiments, the profile engine 326 can provide metadata to a recommendation engine 308.

Recommendation engine 308 can identify repair, transform, and data enrichment recommendations for the data processed by profile engine 326. The metadata generated by profile engine 326 can be used to determine recommendations for data based on the statistical analysis and/or classifications indicated by the metadata. In some embodiments, recommendations can be provided to the user through a user interface or other web service. Recommendations can be tailored for business users, such that the recommendations describe at a high level what data repairs or enrichments are available, how those recommendations compare to past user activity, and/or how unknown items can be classified based on existing knowledge or patterns. Knowledge service 310 can access one or more knowledge graphs or other knowledge sources 340. The knowledge sources can include publicly available information published by web sites, web services, curated knowledge stores, and other sources. Recommendation engine 308 can request (e.g., query) knowledge service 310 for data that can be recommended to a user for the data obtained for a source.

In some embodiments, transform engine 322 can present the user with the sampled data for each column, or sample rows from the input dataset through user interface 306. Through user interface 306, data enrichment service 302 may present a user with recommended transformations. The transformations may be associated with transformation instructions, which may include code and/or function calls to perform transformation actions. The transformation instructions may be invoked by a user based on selection at user interface 306, such as by selecting a recommendation for transformation or by receiving input indicating an operation (e.g., an operator command). In one example, transformation instructions include a transformation instruction to rename at least one column of data based on the entity information. A further transformation instruction can be received to rename the at least one column of data to a default name. A default name may include a name that is pre-determined. A default name may be any name that is pre-defined when a name for a column of data cannot be determined or is not defined. The transformation instructions can include a transformation instruction to reformat at least one column of data based on the entity information, and a transformation instruction to obfuscate at least one column of data based on the entity information. In some embodiments, the transformation instructions can include an enrichment instruction to add one or more columns of data obtained from the knowledge service based on the entity information.

Through user interface 306, a user can perform transform actions, and the transform engine 322 can apply them to the data obtained from a data source and display the results. This gives the user immediate feedback that can be used to visualize and verify the effects of the transform engine 322 configuration. In some embodiments, the transform engine 322 can receive pattern and/or metadata information (e.g., column names and types) from profile engine 326 and recommendation engine 308, which provides recommended transform actions. In some embodiments, transform engine 322 can provide a user event model that orchestrates and tracks changes to the data to facilitate undo, redo, delete, and edit events. The model can capture dependencies between actions so that the current configuration is kept consistent. For example, if a column is removed, then recommended transform actions provided by the recommendation engine 308 for that column can also be removed. Similarly, if a transform action results in inserting new columns and that action is deleted, then any actions performed on the new columns are also deleted.

As described above, during processing the received data can be analyzed and a recommendation engine 308 can present one or more recommended transforms to be made to the data, including enrichment, repair, and other transforms. A recommended transform for enriching data may be comprised of a set of transforms, each transform of which is a single transform action, or an atomic transformation, performed on the data. A transform may be performed on data that was previously transformed by another transform in the set. The set of transforms may be performed in parallel or in a particular order, such that the data resulting after performing the set of transforms is enriched. The set of transforms may be performed according to a transform specification. The transform specification may include transformation instructions that indicate how and when to perform each of the set of transforms on the data produced by profile engine 326 and the recommendation for enriching the data determined by recommendation engine 308. Examples of the atomic transformation may include, without limitation, transforms to headers, conversions, deletions, splits, joins, and repairs. The data that is transformed according to the set of transforms may undergo a series of changes, each of which results in intermediate data the data is enriched. The data generated for intermediate steps for the set of transforms may be stored in a format such as an Resilient Distributed Dataset (RDD), text, a data record format, a file format, any other format, or a combination thereof.

In some embodiments, the data generated as a result of the operations performed by any elements of data enrichment service 302 may be stored in an intermediary data format including, but not limited to, RDD, text, a document format, any other type of format, or a combination thereof. The data stored in the intermediary format may be used to further perform operations for data enrichment service 302.

The following tables illustrate examples of transformations. Table 1 shows an outline of types of transforms actions.

TABLE 1

| Transform Types | Function Parameter(s) | Description | Examples |
| --- | --- | --- | --- |
| Update | String => String | Update column values | Obfuscate, date format, |
| Split | String => Array[String] | Split a column's values into new columns | Regex split, delimiter split |
| Filter | String => Boolean | Filter rows based on a single column's values | White list filtering, date range filtering |
| Multi-column Filter | Array[String] => Boolean | Filter rows based on multiple column values | NER false positives filtering |
| Edit Columns | Array[String] => Array[String] | Edit the existing columns | Reorder, remove, swap columns |
| Extract | (String, String) => Array[Array[String]] | Extract values from a column into a new RDD | NER with results extracted to a new table |
| Insert | String => Array[String] | Insert new columns | Insert timestamp |
| Insert 1:M | String => Array[Array[String]] | Insert new columns in a one-to-many way | Insert NER results |

Table 2 shows transform actions that do not fit within the category types shown with reference to Table 1.

TABLE 2

| Transform Actions | Description |
|---|---|
| Rename column | Rename a column |
| Sample | Replace the current RDD with a sample of it |
| Join | Performs a left-outer-join between two RDDs |
| Export | Export an RDD as columnar data to e.g. HDFS |

Table 3 below shows examples of types of transform examples. Specifically Table 3 shows examples of transform actions and describes the type of transformations corresponding to those actions. For example, a transform action may include filtering data based on detecting the presence of words from a white list in data. If a user wants to track communications (e.g., tweets) containing "Android" or "iPhone", a transform action could be added with those two words comprising the provided white list. This is just one example of the way by which data could be enriched for a user.

TABLE 3

| Transform Actions | Description | Input | Output | R1 |
|---|---|---|---|---|
| Obfuscate | Obfuscate sensitive information such as e.g. credit card numbers, ID's, or birth dates | 123-45-6789 | ###-##-#### | Y |
| Date Reformat | Reformat a column containing a date | 1330978536 2012-03-12 14:13:49 | March 05, 2012 03/12/12 02:13:49 PM | Y |
| Rename Column | Rename a column | tagged_0001 text_label_0005 | user_agent call_letters | Y |
| NER | Perform named entity recognition and insert values (see next section) | PopBooth turns your iPhone or iPad into a photo booth, prints and all | Type: Product Text: PopBooth, iPhone, iPad | Y |
| Search/ Replace | Perform search and replace on a column's values | Search: Mozilla Replace: Godzilla Value: Mozilla 5.0 | Value: Godzilla 5.0 | Y |
| Change case | Change the case to lower, upper, or proper | Case: Proper Value: eden prairie | Value: Eden Prairie | Y |
| White list filter | Filter rows based on the presence of words from a white list in a text-valued column | List: Android, iPhone Value: I heart my iPhone | Keep all rows whose values contain "Android" or "iPhone" | Y |

The recommendation engine 308 can use information from a knowledge service 310, knowledge source 340 to generate recommendations for transform engine 322 and to instruct transform engine 322 to generate transform scripts that will transform the data. Transform scripts may include programs, code, or instructions that may be executable by one or more processing units to transform received data. As such, the recommendation engine 308 can serve as an intermediary between the user interface 306 and the knowledge service 310.

As discussed above, profile engine 326 can analyze data from a data source to determine whether any patterns exist, and if so, whether a pattern can be classified. Once data obtained from a data source is normalized, the data may be parsed to identify one or more attributes or fields in the structure of the data. Patterns may be identified using a collection of regular expressions, each having a label ("tag") and being defined by a category. The data may be compared to different types of patterns to identify a pattern. Examples of pattern types that can be identified include, without limitation, integers, decimals, dates or date/time strings, URLs, domain addresses, IP addresses, email addresses, version numbers, locale identifiers, UUIDs and other hexidecimal identifiers, social security numbers, US box numbers, typical US street address patterns, zipcodes, US phone numbers, suite numbers, credit card numbers, proper names, personal information, and credit card vendors.

In some embodiments, profile engine 326 may identify patterns in data based on a set of regular expressions defined by semantic constraints or syntax constraints constraints. A regular expression may be used to determine the shape and/or structure of data. Profile engine 326 may implement operations or routines (e.g., invoke an API for routines that perform processing for regular expressions) to determine patterns in data based on one or more regular expressions. For example, a regular expression for a pattern may be applied to data based on syntax constraints to determine whether the pattern is identifiable in the data.

Profile engine 326 may perform parsing operations using one or more regular expressions to identify patterns in data processed by profile engine 326. Regular expressions may be ordered according to a hierarchy. Patterns may be identified based on order of complexity of the regular expressions. Multiple patterns may match data that is being analyzed; the patterns having the greater complexity will be selected. As described further below, profile engine 326 may perform statistical analysis to disambiguate between patterns based on the application of regular expressions that are applied to determine those patterns.

In some embodiments, data that is unstructured may be processed to analyze metadata-describing attributes in the data. The metadata itself may indicate information about the data. The metadata may be compared to identify similarities and/or to determine a type of the information. The information identified based on the data may be compared to know types of data (e.g., business information, personal identification information, or address information) to identify the data that corresponds to a pattern.

In accordance with an embodiment, the profile engine 326 may perform statistical analysis to disambiguate the patterns and/or the text in data. Profile engine 326 may generate metadata including statistical information based on the statistical analysis. When patterns are identified, profile engine 326 may determine statistical information (e.g., a pattern metric) about each different pattern to disambiguate between the patterns. The statistical information may include a standard deviation for different patterns that are recognized. The metadata including the statistical information can be provided to other components of data enrichment service 302, such as recommendation engine 308. For example, the metadata may be provided to recommendation engine 308 to enable recommendation engine 308 to determine recommendations for enrichment of the data based on the identified the pattern(s). Recommendation engine 308 can use the patterns to query a knowledge service 310 to obtain additional information about the patterns. Knowledge service 310 can include or have access to one or more knowledge sources 340. A knowledge sources can include publicly available information published by web sites, web services, curated knowledge stores, and other sources.

Profile engine 326 may perform the statistical analysis to disambiguate between patterns identified in the data. For example, data analyzed by profile engine 326, may be evaluated to compute a pattern metric (e.g., a statistical frequency of different patterns in the data) for each of the different patterns identified in the data. Each of the set of pattern metrics is computed for a different pattern of the patterns that are identified. Profile engine 326 may determine a difference amongst the pattern metrics computed for the different patterns. One of the identified patterns may be selected based on the difference. For example, one pattern may be disambiguated from another pattern based on a frequency of the patterns in the data. In another example, where the data consists of dates having multiple different formats, each corresponding to a different pattern, profile engine 326 may convert the dates to a standard format in addition to normalization and may then determine a standard deviation for each format from different patterns. In this example, profile engine 326 may statistically disambiguate between the formats in the data as having the format with the lowest standard deviation. The pattern corresponding to the format of the data having the lowest standard deviation may be selected as the best pattern for the data.

Profile engine 326 may determine a classification of a pattern that it identifies. Profile engine 326 may communicate with knowledge service 310 to determine whether the identified pattern can be classified within a knowledge domain. Knowledge service 310 may determine one or more possible domains associated with the data based on techniques described herein such as matching techniques and similarity analysis. Knowledge service 310 may provide profile engine 326 with a classification of one or more domains possibly similar to data identified with a pattern. Knowledge service 310 may provide, for each of the domains identified by knowledge service 310, a similarity metric indicating a degree of similarity to the domain. The techniques disclosed herein for similarity metric analysis and scoring can be applied by recommendation engine 308 to determine a classification of data processed by profile engine 326. The metadata generated by profile engine 326 may include information about the knowledge domain, if any are applicable, and a metric indicating a degree of similarity with the data analyzed by profile engine 326.

Profile engine 326 may perform statistical analysis to disambiguate text identified in data, regardless of whether patterns are identified in the data. The text may be part of a pattern, and the analysis of the text may be used to further identify a pattern, if any can be identified. Profile engine 326 may request knowledge service 310 to perform domain analysis on text to determine whether the text can be classified into one or more domains. Knowledge service 310 may operate to provide information about one or more domains that are applicable to the text being analyzed. Analysis performed by knowledge service 310 to determine a domain may be performed using techniques described herein, such as similarity analysis used to determine a domain for data.

In some embodiments, profile engine 326 may identify text data in a data set. The text data may correspond to each entity identified in the set of entities. A classification may be determined for each entity that is identified. Profile engine 326 may request knowledge service to identify a classification for the entity. Upon determining a set of classifications for a set of entities (e.g., entities in a column), profile engine 326 may compute a set of metrics ("classification metrics") to disambiguate between the set of classifications. Each of the set of metrics may be computed for a different one of the set of classifications. Profile engine 326 may statistically disambiguate the set of metrics by comparing them to each other to determine which classification most closely represents the set of entities. A classification of the set of entities may be chosen based on the classification that represents the set of entities.

Using the knowledge sources 340, knowledge service 310 can match, in context, the patterns identified by profile engine 326. Knowledge service 310 may compare the identified patterns in the data or the data if in text to entity information for different entities stored by a knowledge source. The entity information may be obtained from one or more knowledge sources 340 using knowledge service 310. Examples of known entity may include social security numbers, telephone numbers, address, proper names, or other personal information. The data may be compared to entity information for different entities to determine if there is a match with one or more entities based on the identified pattern. For example, the knowledge service 310 can match the pattern "XXX-XX-XXXX" to the format of U.S. social security numbers. Furthermore, the knowledge service 310 can determine that social security numbers are protected or sensitive information, the disclosure of which is linked to various penalties.

In some embodiments, profile engine 326 can perform statistical analysis to disambiguate between multiple classifications identified for data processed by profile engine 326. For example, when text is classified with multiple domains, profile engine 326 can process the data to statistically determine the appropriate classification determined by knowledge service 310. The statistical analysis of the classification can be included in the metadata generated by profile engine 326.

In addition to pattern identification, profile engine 326 can analyze data statistically. The profile engine 326 can characterize the content of large quantities of data, and can provide global statistics about the data and a per-column analysis of the data's content: e.g., its values, patterns, types, syntax, semantics, and its statistical properties. For example, numeric data can be analyzed statistically, including, e.g., N, mean, maximum, minimum, standard deviation, skewness, kurtosis, and/or a 20-bin histogram if N is greater than 100 and unique values is greater than K. Content may be classified for subsequent analysis.

In one example, global statistics may include, without restriction, the number of rows, the number of columns, the number of raw and populated columns and how they varies, distinct and duplicate rows, header information, the number of columns classified by type or subtype, and the number of columns with security or other alerts. Column-specific statistics may include populated rows (e.g., K-most frequent, K-least frequent unique values, unique patterns, and (where applicable) types), frequency distributions, text metrics (e.g., minimum, maximum, mean values of: text length, token count, punctuation, pattern-based tokens, and various useful derived text properties), token metrics, data type and subtype, statistical analysis of numeric columns, L-most/least probable simple or compound terms or n-grams found in columns with mostly unstructured data, and reference knowledge categories matched by this naive lexicon, date/time pattern discovery and formatting, reference data matches, and imputed column heading label.

The resulting profile can be used to classify content for subsequent analyses, to suggest, directly or indirectly, transformations of the data, to identify relationships among data sources, and to validate newly acquired data before applying a set of transformations designed based on the profile of previously acquired data.

The metadata produced by profile engine 326 can be provided to the recommendation engine 308 to generate one or more transform recommendations. The entities that match an identified pattern of the data can be used to enrich the data with those entities identified by classification determined using knowledge service 310. In some embodiments, the data to the identified patterns (e.g., city and state) may be provided to knowledge service 310 to obtain, from a knowledge source 340, entities that match the identified patterns. For example, knowledge service 310 may be invoked calling a routine (e.g., getCities( ) and getStates( )) corresponding to the identified patterns to receive entity information. The information received from knowledge service 310 may include a list (e.g., canonical list) of entities that have properly spelled information (e.g., properly spelled cities and states) for the entities. Entity information corresponding to matching entities obtained from knowledge service 310 can be used to enrich data, e.g., normalize the data, repair the data, and/or augment the data.

In some embodiments, the recommendation engine 308 can generate transform recommendations based on the matched patterns received from the knowledge service 310. For example, for the data including social security numbers, the recommendation engine can recommend a transform that obfuscates the entries (e.g., truncating, randomizing, or deleting, all or a portion of the entries). Other examples of transformation may include, reformatting data (e.g., reformatting a date in data), renaming data, enriching data (e.g., inserting values or associating categories with data), searching and replacing data (e.g., correcting spelling of data), change case of letter (e.g., changing a case from upper to lower case), and filter based on black list or white list terms. In some embodiments, recommendations can be tailored for particular users, such that the recommendations describe at a high level what data repairs or enrichments are available. For example, an obfuscation recommendation may indicate that the first five digits of the entries will be deleted. In some embodiments, the recommendations can be generated based on past user activity (e.g., provide a recommended transform that was previously used when sensitive data was identified)

Transform engine 322 can generate transform scripts based on the recommendations provided by recommendation engine 308 (e.g., a script to obfuscate the social security numbers). A transform script may perform an operation to transform data. In some embodiments, a transform script may implement a linear transformation of data. A linear transformation may be implemented through use of an API (e.g., Spark API). The transform actions may be performed by operations invoked using the API. A transform script may be configured based on transform operations defined using the API. The operations may be performed based on the recommendations.

In some embodiments, the transform engine 322 can automatically generate transform scripts to repair data at the data source. Repairs may include automatically renaming columns, replacing strings or patterns within a column, modifying text case, reformatting data, etc. For example, the transform engine 322 can generate a transformation script to transform a column of dates based on a recommendation from recommendation engine 308 to modify, or convert, the formats of the dates in the column. The recommendation may be selected from multiple recommendations to enrich or modify the data from a data source that is processed by profile engine 326. The recommendation engine 308 may determine the recommendation based on metadata, or profile, provided by the profile engine 326. The metadata may indicate a column of dates identified for different formats (e.g., MM/DD/YYYY, DD-MM-YY, etc.). The transform script generated by transform engine 322 can, for example, split and/or join columns based on suggestions from the recommendation engine 308. The transform engine 322 may also remove columns based on the data source profiles received from profile engine 326 (e.g., to remove empty columns, or columns that include information that is not desired by the user).

A transform script may be defined using a syntax that describes operations with respect to one or more algorithms (e.g., Spark Operator Trees). As such, the syntax may describe operator-tree transduction/reduction. A transform script may be generated based on a chosen recommendation or requested by a user interactively through a graphical user interface. Examples of recommended transformations are described with reference to FIGS. 4A, 4B, 4C, and 4D. Based on the transform operations specified by a user through the graphical user interface, the transform engine 322 performs transform operations according to those operations. The transform operations may be recommended to the user to enrich a data set.

As described further below, the clients 304 can display recommendations describing or otherwise indicating each recommended transform. When a user selects a transform script to be run, the selected transform script can be run on all or more of the data from the data source in addition to the data analyzed to determine the recommended transform(s). The resulting transformed data can then be published to one or more data targets 330 by publish engine 324. In some embodiments, the data targets can be different data stores than the data sources. In some embodiments, the data targets can be the same data stores as the data sources. Data targets 330 can include a public cloud storage service 332, a private cloud storage service 334, various other cloud services 336, a URL or web-based data target 338, or any other accessible data target.

In some embodiments, recommendation engine 308 can query knowledge service 310 for additional data related to the identified platform. For example, where the data includes a column of city names, related data (e.g., location, state, population, country, etc.) can be identified and a recommendation to enrich the dataset with the related data can be presented. Examples of presenting recommendations and transforming data through a user interface are shown below with respect to FIGS. 4A-4D.

Knowledge service 310 can include a matching module 312, a similarity metric module 314, a knowledge scoring module 316, and a categorization module 318. As described further below, matching module 312 can implement a matching method to compare the data to reference data available through knowledge service 310. Knowledge service 310 can include or have access to one or more knowledge sources 340. The knowledge sources can include publicly available information published by web sites, web services, curated knowledge stores, and other sources. Matching module 312 may implement one or more matching methods, such as those described in this disclosure. Matching module 312 may implement data structures for storing states related to the matching method(s) which are applied.

Similarity metric module 314 can implement a method to determine the semantic similarity between two or more datasets. This may also be used to match the user's data to reference data available through the knowledge service 330.

Similarity metric module 314 may perform similarity metric analysis as described in this disclosure including the descriptions with reference to FIGS. 6-15.

Categorization module 318 can perform operations to implement automated data analyses. In some embodiments, categorization module 318 can use an unsupervised machine learning tool, such as Word2Vec, to analyze an input data set. Word2Vec can receive a text input (e.g., a text corpus from a large data source) and generate a vector representation of each input word. The resulting model may then be used to identify how closely related are an arbitrary input set of words. For example, a Word2Vec model built using a large text corpus (e.g., a news aggregator, or other data source) can be utilized to determine corresponding numeric vector for each input word. When these vectors are analyzed, it may be determined that the vectors are "close" (in the Euclidean sense) within a vector space. Although this can identify that input words are related (e.g., identifying input words that are clustered closely together within a vector space), Word2Vec may not be usable to identify a descriptive label for the words (e.g., "tire manufacturers"). Categorization module 318 may implement operations to categorize the related words using a curated knowledge source 340 (e.g., YAGO, from the Max Planck Institute for Informatics). Using information from a knowledge source 340, categorization module 318 can add additional, related data to the input data set.

In some embodiments, categorization module 318 may implement operations to perform trigram modeling to further refine categorization of related terms. Trigram modeling can be used to compare sets of words for category identification. The input data set can be augmented with the related terms.

Using the input data set, which may include added data, matching module 312 can implement matching methods (e.g., a graph matching method) to compare the words from the augmented data set to categories of data from knowledge source 340. Similarity metric module 314 can implement a method to determine the semantic similarity between the augmented data set and each category in knowledge source 340 to identify a name for the category. The name of the category may be chosen based on a highest similarity metric. The similarity metric may computed based on the number of terms in the data set that match a category name. The category may be chosen based on the highest number of terms matching based on the similarity metric. Techniques and operations performed for similarity analysis and categorization are further described in this disclosure including the descriptions with reference to FIGS. 6-15.

In some embodiments, categorization module 318 can augment an input data set and use information from a knowledge source 340 to add additional, related data to the input data set. For example, a data analysis tool such as Word2Vec can be used to identify semantically similar words to those included in the input data set from a knowledge source, such as a text corpus from a news aggregation service. In some embodiments, categorization module 318 can implement trigram modeling to preprocess data obtained from a knowledge source 340 (such as YAGO) to generate an indexed table of words by category. Categorization module 318 can then create trigrams for each word in the augmented data set and match the word to a word from the indexed knowledge source 340.

Using the augmented data set (or the trigram matched augmented data set), categorization module 318 can request matching module 312 to compare the words from the augmented data set to categories of data from knowledge source 340. For example, each category of data in the knowledge source 340 can be represented as a tree structure, with the root node representing the category, and each leaf node representing a different word belonging to that category. Similarity metric module 314 can implement a method (e.g., Jaccard index, or other similarity metric) to determine the semantic similarity between the augmented data set and each category in knowledge source 510. The name of the category that matches the augmented data set (e.g., having a highest similarity metric) can then be applied as a label to the input data set.

In some embodiments, similarity metric module 314 can determine the similarity of two data sets A and B, by determining the ratio of the size of the intersection of the data sets to the size of the union of the data sets. For example, a similarity metric may be computed based on the ratio of 1) the size of the intersection of an data set (e.g., an augmented data set) and a category and 2) the size of their union. The similarity metric may be computed for comparison of a data set and a category as indicated above. As such, a "best match" may be determined based on comparing the similarity metrics. The data set used for the comparison may be enriched by being augmented with a label corresponding to the category for which the best match is determined using the similarity metric.

As described above, other similarity metrics may be used in addition, or as an alternative, to the Jaccard index. One of ordinary skill in the art would recognize that any similarity metric may be used with the above described techniques. Some examples of alternative similarity metrics include, but are not limited to: the Dice-Sørensen index; the Tversky index; the Tanimoto metric; and the cosine similarity metric.

In some embodiments, categorization module 318 may utilize a data analysis tool, such as Word2Vec, to compute a refined metric (e.g., score) that indicates a degree of match between data from a knowledge source 340 and an input data, which may be augmented with data from a knowledge source. The score ("knowledge score") may provide greater knowledge about the degree of similarity between an input data set and a category to which a comparison is made. The knowledge score may enable data enrichment service 302 to choose a category name that bests represents the input data.

In the techniques described above, categorization module 318 may count the number of matches of terms in the input data set to a candidate category (e.g., genus) name in a knowledge source 340. The result of the comparison may yield a value that represents a whole integer. As such the value, although indicative of the degree of match between terms, may not indicate a degree of match between an input data set and different terms in a knowledge source.

Categorization module 318 may utilize Word2Vec to determine a similarity of a comparison of each term (e.g., a term for a genus) in a knowledge source and the terms of input data (e.g., species). Using Word2Vec, categorization module 318 can compute a similarity metric (e.g., cosine similarity or distance) between an input data set and one or more terms obtained from a knowledge source. The cosine similarity may be computed as the cosine angle between a data set of terms (e.g., a domain or genus) obtained from a knowledge source and an input data set of terms. The cosine similarity metric may be computed in a manner similar to the Tanimoto metric. The following equation represents an example of the cosine similarity metric:

$$\frac{X \cdot Y}{|X||Y|}$$

By computing a similarity metric based on a cosine similarity, each term in the input data set may be considered as a faction of a whole-value integer, such as a value indicating a percentage of similarity between the term and candidate category. For example, computing a similarity metric between a tire manufacturer and a surname might result in a similarity metric of 0.3, while the similarity metric between a tire manufacturer and a company name might results in a similarity metric of be 0.5. Non-whole integer values representing similarity metrics can be close compared to provide greater accuracy for a closely matching category name. The closely matching category name may be chosen as the most applicable category name based on the similarity metric closest to a value of 1. In the example, above, based on the similarity metric, company name is more likely the correct category. As such, categorization module 318 can associated "company" instead of "surname" with a user-supplied column of data containing tire manufactures.

Knowledge scoring module 316 can determine information about knowledge groups (e.g., domains or categories). Information about knowledge groups can be presented in a graphical user interface, such as the example shown in FIG. 10. Information about knowledge domains may include a metric (e.g., a knowledge score) indicating a measure of similarity between a knowledge domain and an input data set of terms. Input data may be compared to data from a knowledge source 340. An input data set may correspond to a column of data of a data set specified by a user. The knowledge score may indicate a measure of similarity between an input data set and one or more terms provided by a knowledge source, each term corresponding to a knowledge domain. The column of data may include terms that potentially belong to knowledge domain.

In at least one embodiment, a knowledge scoring module 316 may determine a more accurate matching score. The score may correspond to a value computing using a scoring formula. The scoring formula may determine a semantic similarity between two data sets, e.g., the input data set and terms in a domain (e.g., a candidate category) obtained from a knowledge source. The domain for which the matching score indicates the best match (e.g., the highest matching score), may be chosen as the domain having the greatest similarity with the input data set. As such, the terms in the input data set may be associated with the domain name as a the category.

The scoring formula may be applied to an input data set and a domain (e.g., a category of terms obtained from a knowledge source) to determine a score that indicates a measure of a match between the input data and the domain. The domain may have one or more terms, which collectively define the domain. The score may be used to determine the domain to which an input data set is most similar. The input data set may be associated with a term descriptive of the domain to which the input data set is most similar.

The scoring formula may be defined based on one or more factors related to the domains which are compared to the input data set. The factors for the scoring formula may include, without restriction, a frequency value (e.g., a frequency of terms matching between the input data set and a term in a domain), a population value (e.g., the number of terms in the input data set), a unique matching value (e.g., the number of different terms matching between the input data set and a domain), a domain value (e.g., the number of terms in the domain), and a curation level indicating a constant value between a range of values (e.g., 0.0-100.00) indicating the degree to which the domain is curated. In at least one embodiment, the scoring formula may be defined as a function score(f, p, u, n, c), where the scoring formula is computed by an equation: $(1+c/100)*(f/p)*(\log(u+1)/\log(n+1))$, "f" representing the frequency value, "c" representing the curation level, "p" representing the population value, "u" representing the unique matching value, and "n" representing the domain value.

Computation of the scoring formula may be described further with reference to FIG. 10. In a scaled-down example, a input data set (e.g., column of data from a table) may be defined as having 100 short text values, and the knowledge source may be defined by domains including a city domain (e.g., "city") having 1,000 terms, each corresponding to a city, and a last name domain (e.g. "last_name") having 800 terms, each corresponding to a last name. The input data set may have 80 rows (e.g., each row corresponding to a term) that match 60 terms (e.g., cities) in the city domain, and the input data set may have 65 rows that match 55 terms (e.g., last names) in the last name domain. The city domain may be defined at a curation level of 10, and last name domain may be defined at a curation level of 0 (e.g., uncurated). Applying the scoring formula based on the values in this example, a knowledge score of 0.5236209875770231 (e.g., a score of 52 out of 100 or 52%) is computed for a city domain according to score (80, 100, 60, 1000, 10). A knowledge score of 0.39134505184782975 (e.g., a score of 39 out of 100 or 39%) is computed for a last name domain according to score (65, 100, 55, 800, 0). In this scaled-down example, the input data set have a better match, being closely similar to the city domain rather than the last name domain based on the knowledge scoring. Following this example, FIG. 10 illustrates an example of different domains having terms compared to an input data set, and a score ("Matching") computed using the scoring formula.

In some embodiments, the scoring formula may be defined based on more or fewer factors than those described above. The formula may be adjusted or modified to produce a score that is more representative of a match.

In addition to pattern identification and matching, profile engine 326 can analyze the data statistically. The profile engine 326 can characterize the content of large quantities of data, and can provide global statistics about the data and a per-column analysis of the data's content: e.g., its values, patterns, types, syntax, semantics, and its statistical properties. For example, numeric data can be analyzed statistically, including, e.g., N, mean, maximum, minimum, standard deviation, skewness, kurtosis, and/or a 20-bin histogram if N is greater than 100 and unique values is greater than K. Content may be classified for subsequent analysis. In some embodiments, profile engine 326 can analyze the data one or more NL processors, which can automatically identify data source columns, determine the type of data in a particular column, name the column if no schema exists on input, and/or provide metadata describing the columns and/or data source. In some embodiments, the NL processors can identify and extract entities (e.g., people, places, things, etc.) from column text. NL processors can also identify and/or establish relationships within data sources and between data sources.

In one example, global statistics may include, without restriction, the number of rows, the number of columns, the number of raw and populated columns and how they varies, distinct and duplicate rows, header information, the number of columns classified by type or subtype, and the number of columns with security or other alerts. Column-specific statistics may include populated rows (e.g., K-most frequent, K-least frequent unique values, unique patterns, and (where applicable) types), frequency distributions, text metrics (e.g., minimum, maximum, mean values of: text length, token count, punctuation, pattern-based tokens, and various useful derived text properties), token metrics, data type and subtype, statistical analysis of numeric columns, L-most/least probable simple or compound terms or n-grams found in columns with mostly unstructured data, and reference knowledge categories matched by this naive lexicon, date/time pattern discovery and formatting, reference data matches, and imputed column heading label.

The resulting profile can be used to classify content for subsequent analyses, to suggest, directly or indirectly, transformations of the data, to identify relationships among data sources, and to validate newly acquired data before applying a set of transformations designed based on the profile of previously acquired data.

In some embodiments, user interface 306 can generate one or more graphical visualizations based on metadata provided by profile engine 326. As explained above, the data provided by profile engine 326 may include statistical information indicating metrics about data that has been processed by profile engine 326. Examples of graphical visualizations of metrics of profiled data are shown in FIGS. 5A-5D. A graphical visualization can include a graphical dashboard (e.g., a visualization dashboard). The graphical dashboard may indicate a plurality of metrics, each of the plurality of metrics indicating a real time metric of the data relative to a time that the data is profiled. A graphical visualization may be displayed in a user interface. For example, the graphical visualization that is generated may be sent to a client device to cause the client device to display the graphical visualization in a user interface at the client device. In some embodiments, a graphical visualization may provide profiling results.

Additionally, the structural analyses by the profile engine 326 enable the recommendation engine to better focus its queries to knowledge service 310, improving processing speed and reducing load on system resources. For example, this information can be used to limit the scope of knowledge being queried so that the knowledge service 310 does not attempt to match a column of numerical data to place names.

Figure 4A:
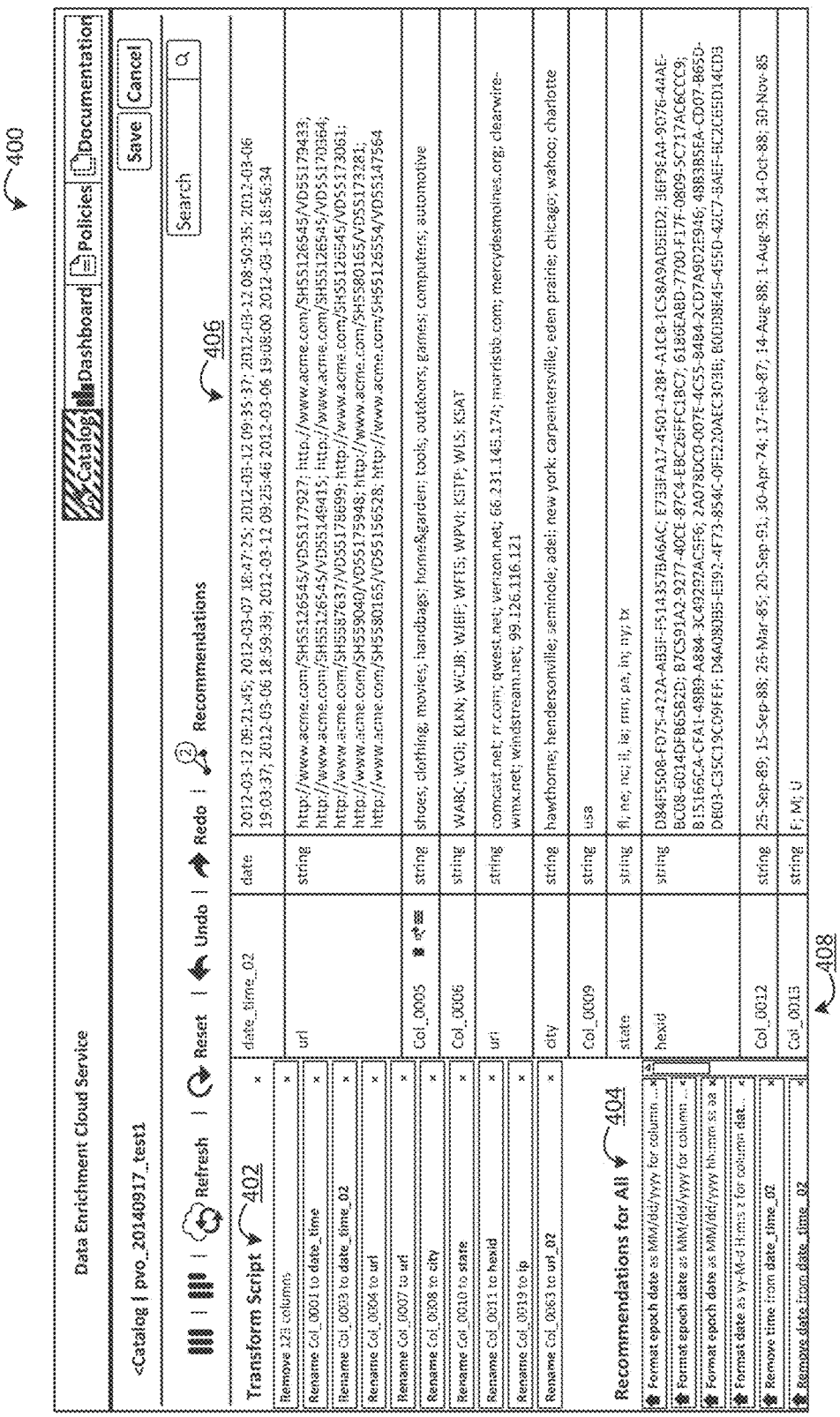

FIGS. 4A-4D depict examples of a user interface that provides interactive data enrichment, in accordance with an embodiment of the present invention. As shown in FIG. 4A, an example interactive user interface 400 can display transform scripts 402, recommended transforms 404, and at least a portion of the data 406 being analyzed/transformed. Transform scripts listed in panel 402 can include indicate transforms that have been applied to the data and are visible in panel 406. Each transform script 402 can be written in a simple declarative language intelligible to a business user. Transform scripts listed in panel 402 may be automatically applied to the data and reflected in the portion of the data 406 displayed in the interactive user interface 400. For example, the transform scripts listed in patent 402 include renaming columns to be descriptive of their content. Columns 408 shown in interactive user interface 400 have been renamed according to the transform scripts 402 (e.g., column 0003 is now named date_time_02, column 0007 is no named "url", etc.). Recommended transforms 404, however, have not been automatically applied to the user's data.

As shown in FIG. 4B, a user can view recommendations in recommendation panel 404 and based on the recommendation, identify the data to be changed. For example, recommendation 410 includes a recommendation to rename "Col_0008 to city". Because the recommendation is written such that a business user can understand it (instead of in, e.g., code or pseudo code) the corresponding data 412 can be readily identified by the user. As shown in FIG. 4B, data 412 includes a column of strings (represented as a row in user interface 400). The profile engine 326 can analyze the data to determine that it includes strings of two or fewer words (or tokens). This pattern can be provided to recommendation engine 308 which can query knowledge service 310. In this case, knowledge service 310 has matched the data pattern to city names and recommendation 408 was generated to rename the column accordingly.

In some embodiments, transforms listed in panel 404 may have been applied at the direction of the user (e.g., in response to an instruction to apply the transform) or may have been applied automatically. For example, in some embodiments, knowledge service 310 can provide a confidence score for a given pattern match. A threshold can be set in recommendation engine 308 such that matches having a confidence score greater than the threshold are applied automatically.

Figure 4C:
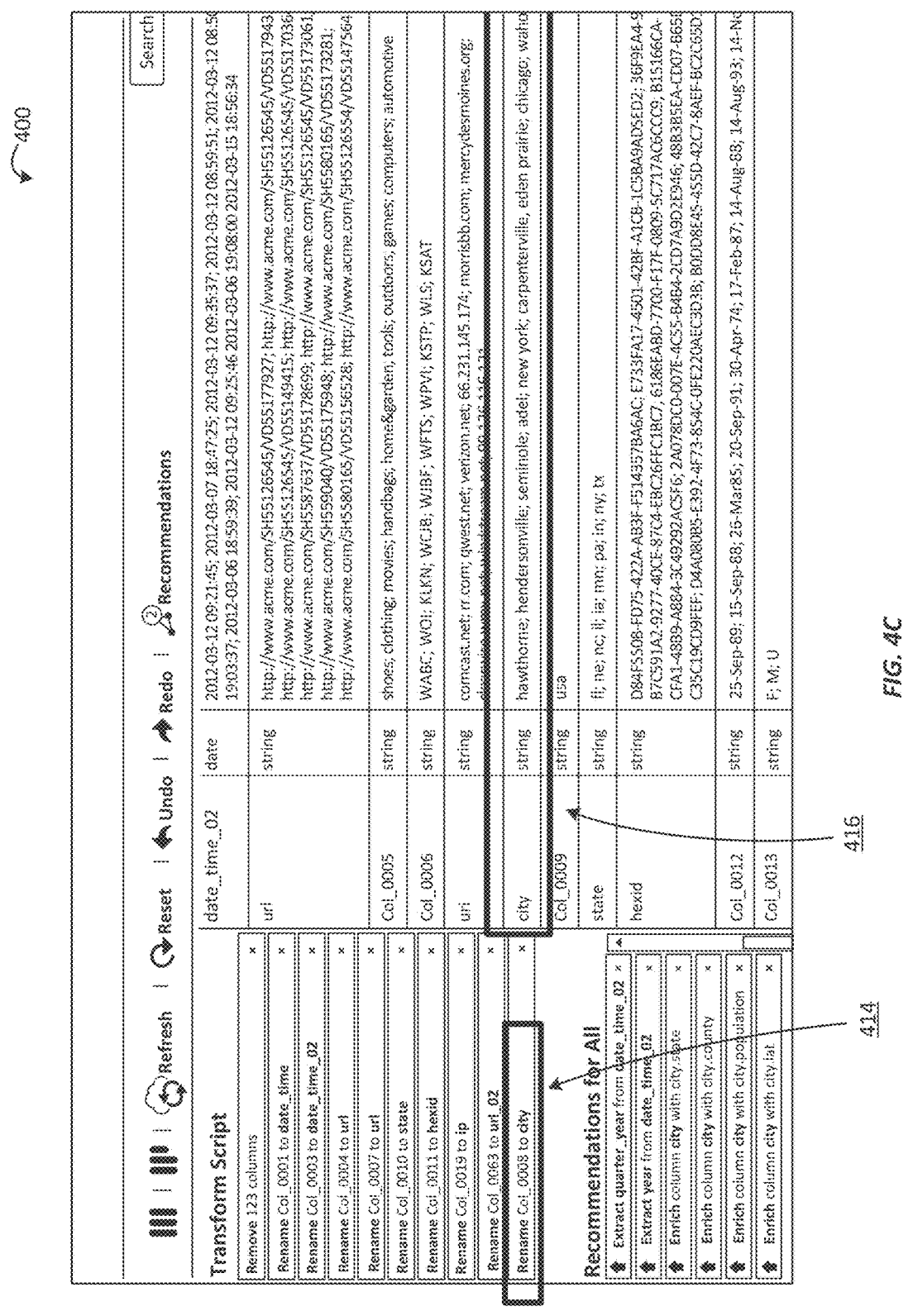

To accept the recommendation, the user can select an accept icon 414 (in this example an up arrow icon) associated with the recommendation. As shown in FIG. 4C, this moves the accepted recommendation 414 to transform scripts panel 402 and automatically applies the transform to the corresponding data 416. For example, in the embodiment shown in FIG. 4C, Col_0008 has now been renamed to "city" in accordance with the selected transform.

Figure 4D:
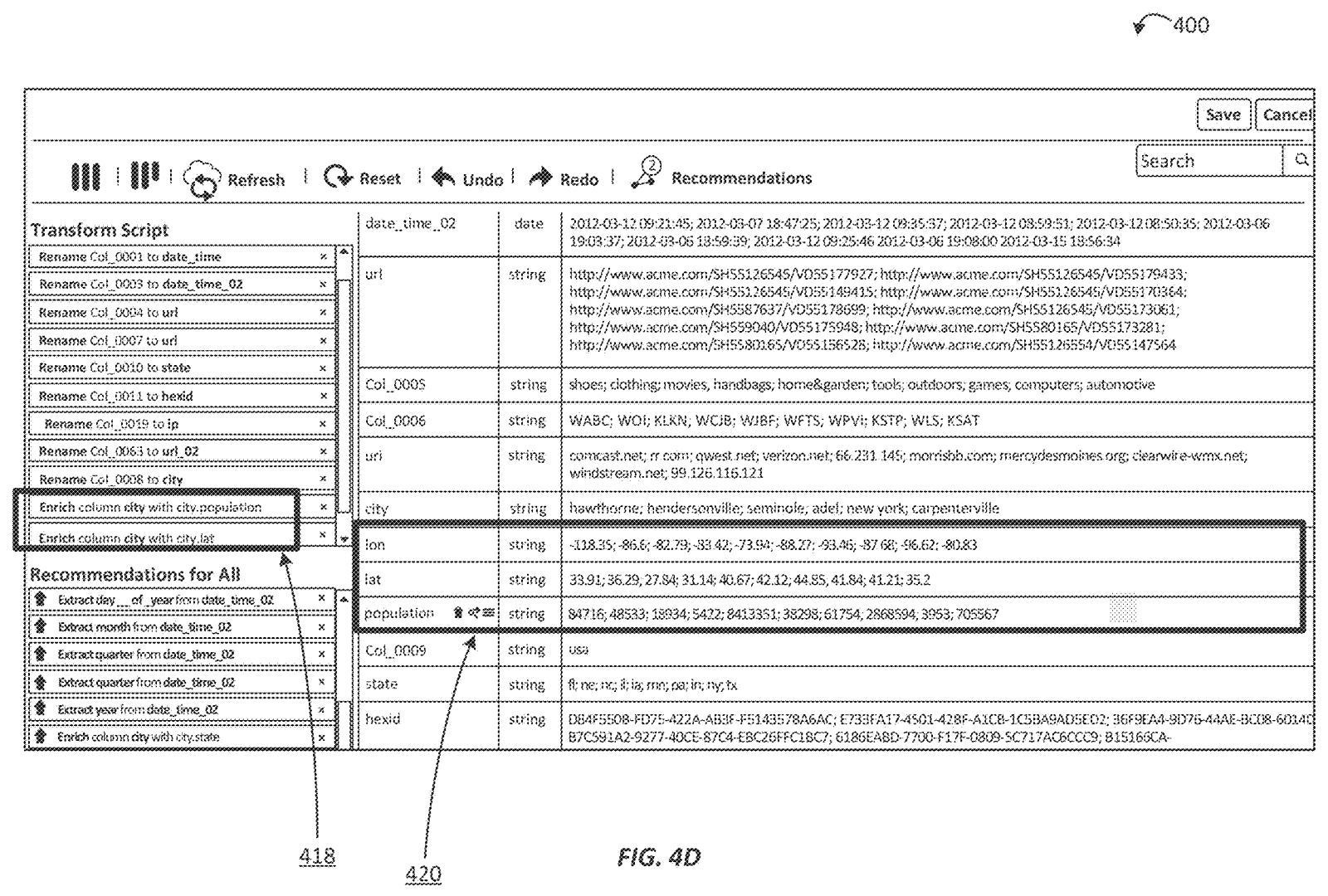

In some embodiments, data enrichment service 302 can recommend additional columns of data to be added to a data source. As shown in FIG. 4D, continuing with the city example, transforms 418 have been accepted to enrich the data with new columns including city population, and city location detail including longitude and latitude. When selected, the user's data set is enriched to include this additional information 420. The data set now includes information that was not previously available to the user in a comprehensive and automated fashion. The user's data set can now be used to produce a nationwide map of locations and population zones associated with other data in the dataset (for example, this may be associated with a company's web site transactions).

FIGS. 5A-5D depict examples of various user interfaces that provide visualizations of datasets, in accordance with an embodiment of the present invention.

FIG. 5A depicts an example of a user interface that provides visualizations of datasets, in accordance with an embodiment of the present invention. As shown in FIG. 5A, an example interactive user interface 500 can display a profile summary 502 ("Profile Results"), transform scripts 504, recommended transforms 506, and at least a portion of the data 508 being analyzed/transformed. Transforms listed in panel 504 can include transforms that have been applied to the data and are visible in panel 508.

Profile summary 502 can include global statistics (e.g., total rows and columns) as well as column-specific statistics. The column-specific statistics can be generated from analysis of data processed by data enrichment service 302. In some embodiments, the column-specific statistics can be generated based on column information determined by analysis of data process by data enrichment service 302.

Profile summary 502 may include a map (e.g., "a heat map") of the United States, where different areas of the United States are shown in different colors, based on statistics identified from the data being analyzed 508. The statistics may indicate how frequently those locations are identified as being associated with the data. In one illustrative example, data may represent purchase transactions at an online retailer, where each transaction can be associated with a location (e.g., based on shipping/billing addresses, or based on recorded IP addresses). Profile summary 502 may indicate locations of transactions based on processing of the data representing the purchase transactions. In some embodiments, visualizations can be modified based on user input to assist the user in searching the data and finding useful correlations. These features are described further below.

Figure 5B:
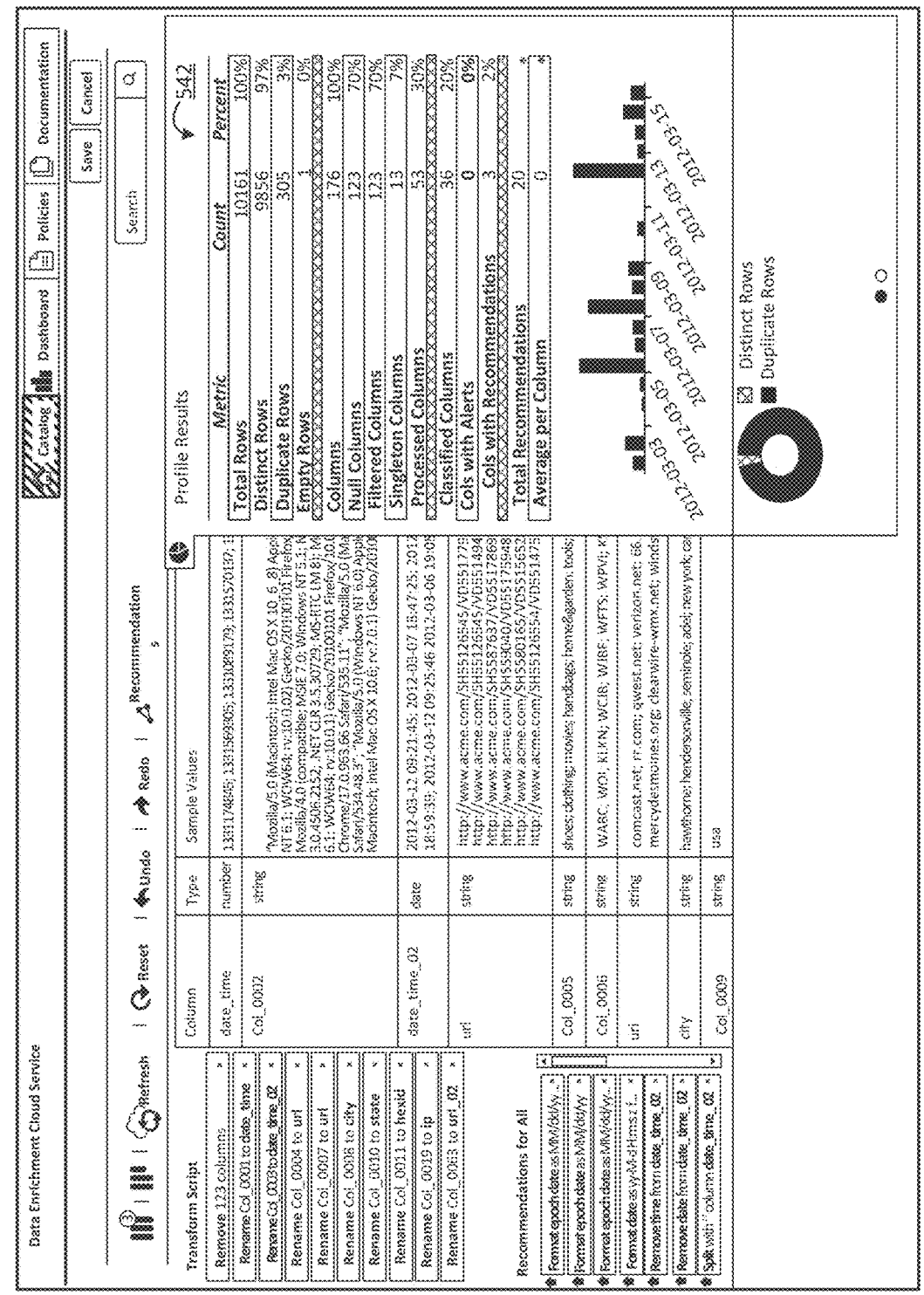
Figure 5C:
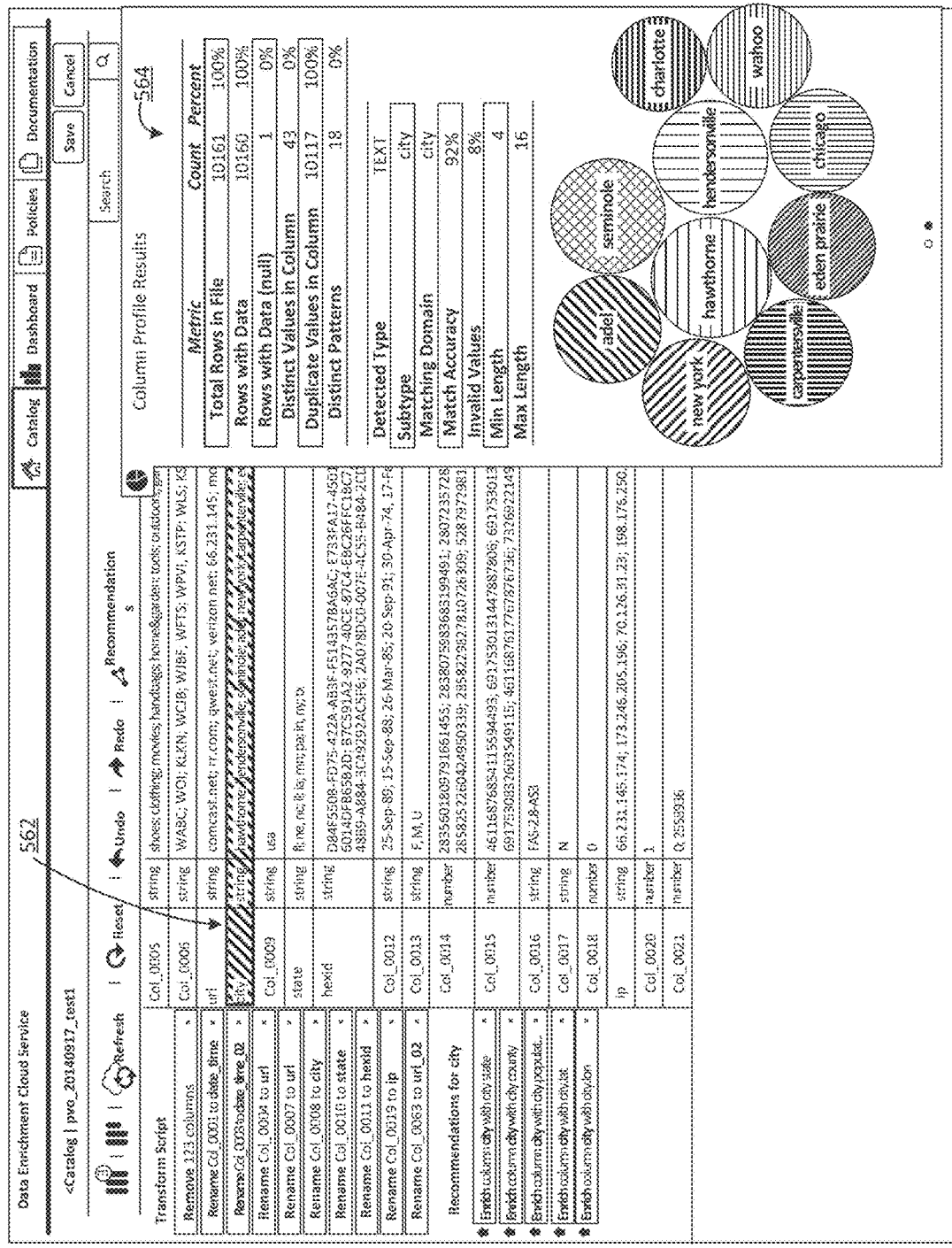
Figure 5D:
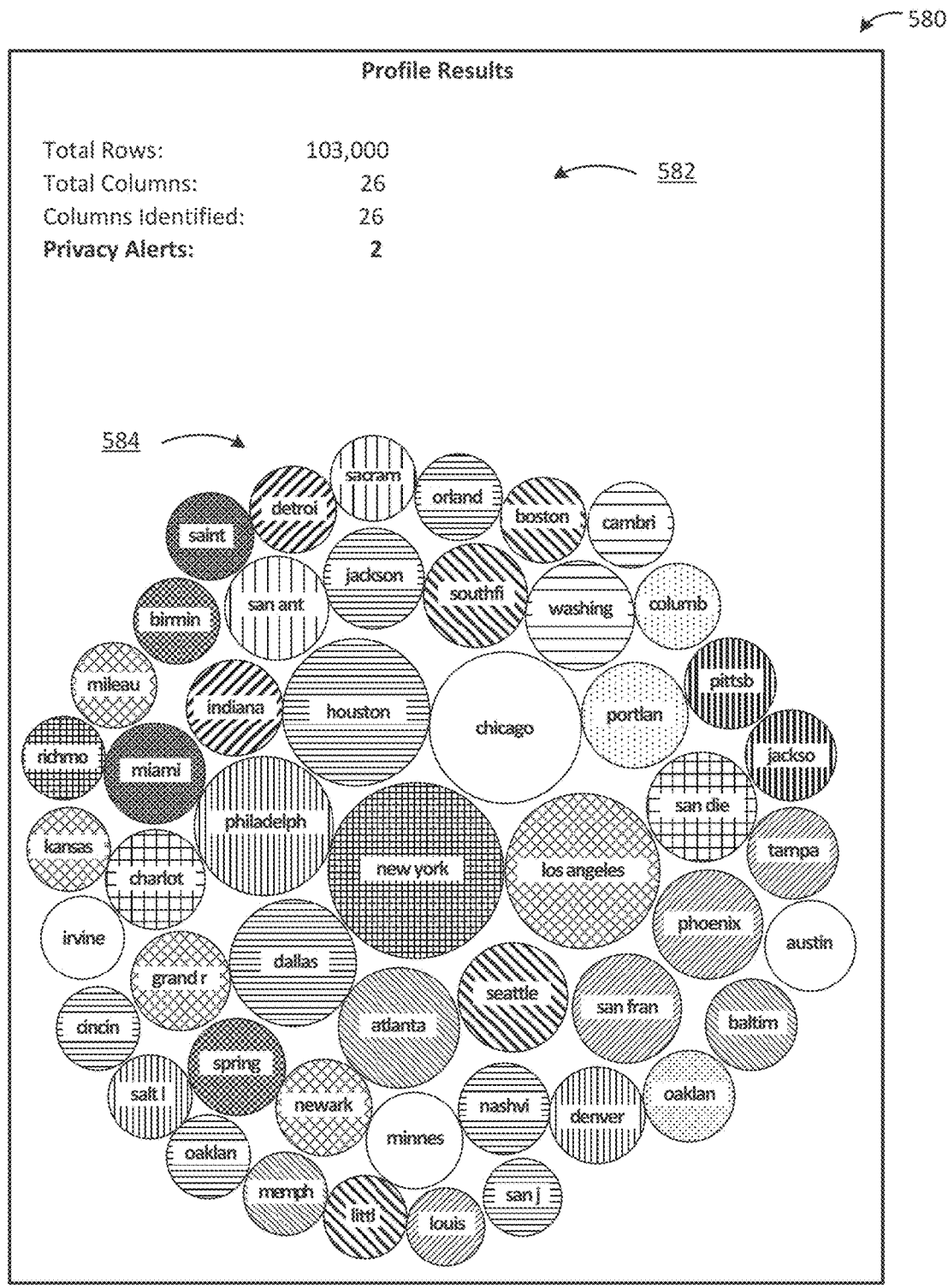

FIGS. 5B, 5C, and 5D show examples of results of interactive data enrichment for data sets. FIG. 5B shows a user interface 540 that can include a profile metric panel 542. Panel 542 can show a summary of metrics associated with the selected data source. In some embodiments, as shown in FIG. 5C, a profile metric panel 560 can include metrics for a particular column 562, instead of an entire data set. For example, the user can select the particular column on the user's client device and the corresponding column profile 564 can be displayed. In this example, the profiler indicates a 92% match of column_0008 with known cities in the knowledge source. A high probability in some embodiments can cause the transform engine to automatically label col_0008 to "city".

FIG. 5D shows a profile metric panel 580 that includes global metrics 582 (e.g., metrics related to an entire dataset), and column-specific visualizations 584. The column specific visualizations 584 can be selected by a user and/or used to navigate the data (e.g., by clicking, dragging, swiping, etc.). The examples described above represent simplified transforms to small data sets. Similar and more complex processing can also be applied automatically to large data sets comprising billions of records.

Figure 6:
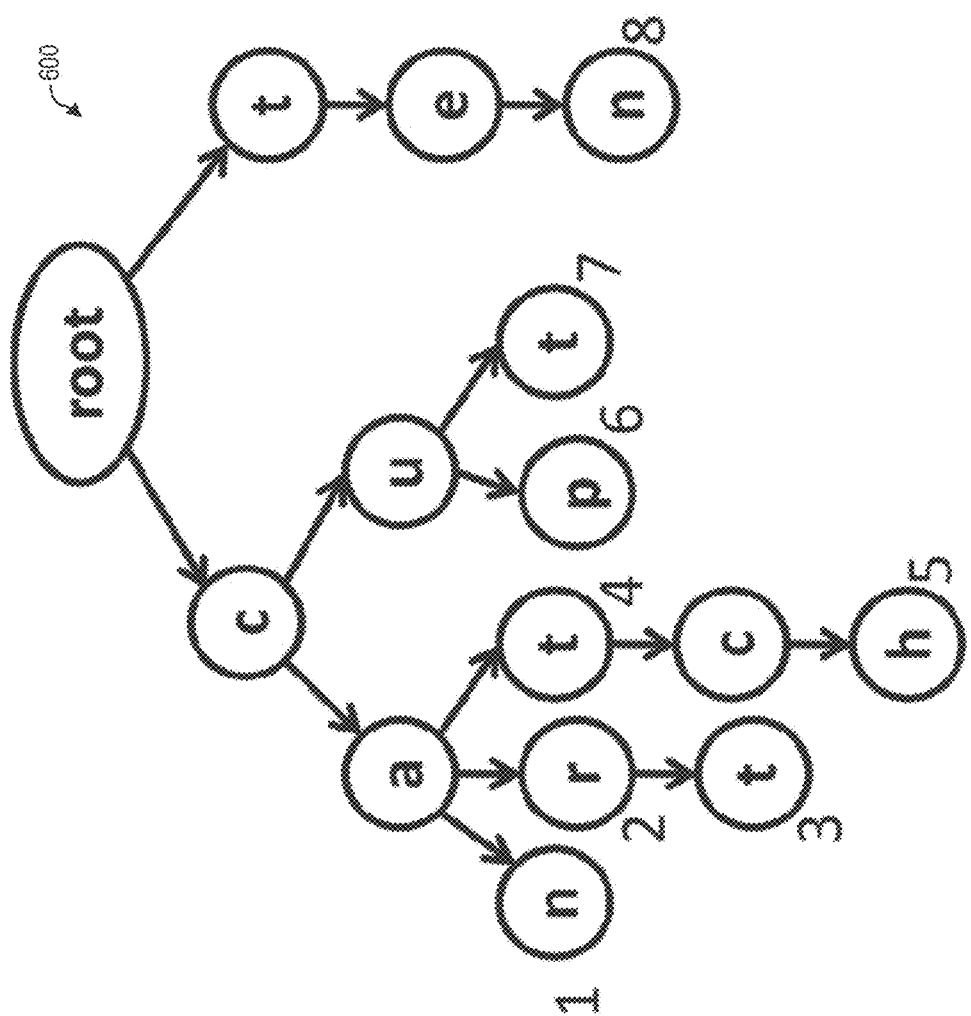
FIG. 6 depicts an example graph, in accordance with an embodiment of the present invention.

FIG. 6 depicts an example graph, in accordance with an embodiment of the present invention. In some embodiments, it can be useful to identify literal strings in textual data. A literal string can be a string that can be treated at "face value" because it has no embedded syntax (such as in a regular expression). When a literal string is searched for in a dataset, exact string matching is performed. Literal string matching can be performed by representing one or more literal strings in a single data structure. This data structure can be used in combination with a graph matching method which performs a single pass over an input string to simultaneously find all matching literal strings in the input string. This improves matching efficiency due to the fact that only a single pass through the text is required to find all of the literal strings.

In some embodiments, a graph matching method can be implemented as a variant of the Aho-Corasick algorithm. The graph matching method works by storing literal strings in a trie-like data structure and repeatedly traversing the tree looking for all possible matches for the characters seen thus far in the input text. The data structure can be a tree whose nodes are characters in the string literals. The first letter of every literal string can be a child of a root node. The second letter of every literal string can be a child of the node corresponding to the first letter. FIG. 6 shows a tree for the following words: can(1), car(2), cart(3), cat(4), catch(5), cup(6), cut(7), and ten(8). The node where each word ends is marked with the corresponding number for the word.

In some embodiments, the graph matching method can keep track of a list of partial matches. A partial match can include a pointer to a node in the tree and a character offset corresponding to where in the input string the partial match was introduced. The graph matching method can be initialized with a single partial match corresponding to the root node for the character at offset 1. When the first character is read, the root node is examined for a child with the given character. If such a child node exists, then the node for the partial match is advanced to the child node. Before the next character is read a new partial match corresponding to the root node and the character at offset 2 is added to the list of partial matches. It then proceeds to iterate over every character. For each character, every partial match in the list is evaluated at the current character. The partial match is retained if the node of the partial match has a child corresponding to the current character otherwise it must be removed. If a partial match is kept, then the node is advanced to the child node corresponding to the current character. In some embodiments, if the node of a partial match corresponds to the end of a word (as indicated by the numbers in FIG. 6), then a completed match is created which can be added to the list of returned values. Before advancing to the next character a new partial match can be created corresponding to the root node and the character offset of the next character.

FIG. 7 depicts an example state table, in accordance with an embodiment of the present invention. For the purposes of illustration, table 700 depicts states of the graph matching method when the input string "cacatch" is examined. The following table shows the internal state stored by the method at each character in the input string after the partial matches have been evaluated. As shown in FIG. 7, the graph matching method can identify "cat" (word 4) from character 2 through 4 and the word "catch" (word 5) from 2 to 6. Partial matches are represented as pairs including a character offset and a node in the tree given by a letter. In some embodiments, the character offset can act as an identifier for the partial match (e.g., while the node is updated, the character offset can remain constant) and there is only one partial match introduced at each character offset.

In some embodiments, for every character a new partial match can be introduced. Because the root node of tree 600 has two children (for 'c' and 't'), the newly created partial matches are advanced when the characters 'c' and 't' are found as shown in lines 1, 3, 5, and 6. At line 3, the partial match "(1, a)" is not advanced because there is no child with the letter 'c' for the 'a'. In contrast, the partial match "(3, a)" is advanced to "(3, t)" in line 5 because the node 'a' has a child node with the letter 't'. At this point, the partial match "(3, t)" is not a complete match for the word 'cat' as indicated by the number 4 at the 't' node. Therefore, a match from 3 to 5 for the word 'cat' is found.

Figure 8:
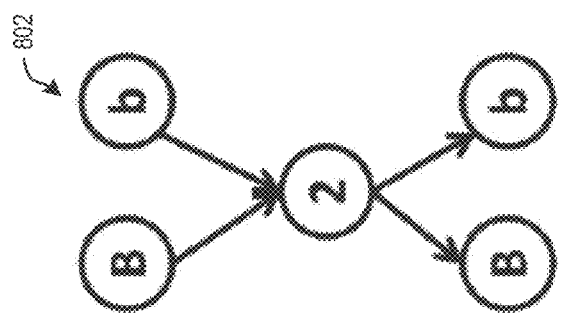
FIG. 8 depicts examples of case insensitive graphs, in accordance with an embodiment of the present invention.
Figure 8:
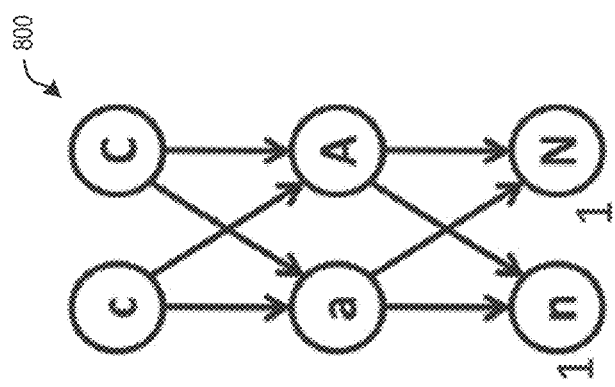

FIG. 8 depicts examples of case insensitive graphs, in accordance with an embodiment of the present invention. In some embodiments, case insensitive matching can be performed on a second case insensitive tree. A tree such as the one in FIG. 7 can be made case insensitive by converting it into a lattice that includes both the upper case and lower case version of each letter such that both "cases" of the letter point to both of the "cases" of the next letter. Tree 800 shows a case insensitive tree/lattice for the word "can". As shown in FIG. 8, there is a path through the tree for every case combination of the word "can" (e.g. "Can", "CAn", "CaN", "caN", etc.)

However, case sensitive and case insensitive entries cannot reside in the same tree, because case insensitive entries have a destructive effect on the case sensitivity of case sensitive entries. Additionally, when performing case insensitive matching not all characters have a lower and upper case. Therefore, the tree does not necessarily include pairs of parallel characters. As an example, tree 802 shows agree structure for the word "b2b" added to the tree in a case insensitive manner.

In some embodiment, case insensitive matching can be supported by adding a second case-insensitive tree which includes literal strings added for case insensitive matching. Graph matching can then be performs as described above, except that for every character two partial matches are added to the list of partial matches corresponding to the root nodes of each of the two trees.

Figure 9:
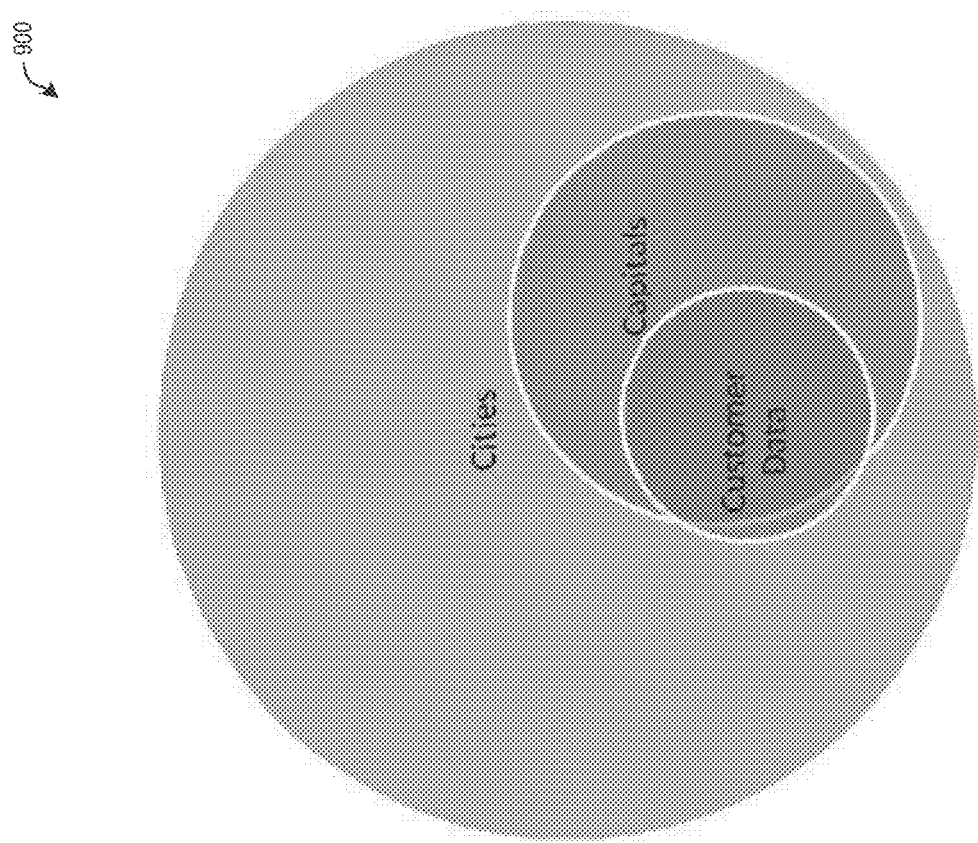
FIG. 9 depicts a diagram indicating the similarity of data sets, in accordance with an embodiment of the present invention.

FIG. 9 depicts a diagram indicating the similarity of data sets, in accordance with an embodiment of the present invention. Embodiments of the present invention can semantically analyze datasets and determine the semantic similarity between the datasets. The semantic similarity between data sets can be expressed as a semantic metric. For example, given a customer list of items C and a reference list R, the "semantic similarity" between C and R can be computed using a number of known functions, such as the Jaccard index, the Sorensen-Dice index (also referred to as the Sorensen index or Dice's coefficient), and the Tversky index. However, existing methods fail to properly match close data sets. For example, as shown in FIG. 9, all state capitals are cities, however not all cities are state capitals. Therefore, given a dataset C which includes a list of 50 cities, 49 of which are state capitals and one is a non-capital city, C should be matched to "a list of cities" rather than "a list of capitals." Prior art methods, such as the Jaccard index and the Dice coefficient treat data sets symmetrically, that is these methods do not differentiate between customer data and reference data. This may result in situations where not all customer data is matched to reference data.

In some embodiments, a method for determining a similarity metric can use a natural logarithm to account for varying sizes of the reference datasets. As a result, if a customer list has 100 items, then a reference list of 1000 items that matches all of the customer list items is twice as good (and not ten times as good) as a reference list of 10,000 items that matches all customer items. A formula describing the method for determining the similarity metric is shown below:

$$\frac{|R \cap C|}{|C|} - \alpha \frac{\ln(1 + |R - C|)}{1 + \ln(1 + |R - C|)} - \beta \begin{cases} 0, & R \text{ is curated} \\ 1, & R \text{ is uncurated} \end{cases}$$

where R is the reference data set, C is the customer data set, and $\alpha$ and $\beta$ are adjustable coefficients. In some embodiments, by default $\alpha=0.1$ and $\beta=0.1$.

This method improves similarity matching by negatively weighting certain undesired dataset characteristics. For example, as the reference set increases in size, the $\alpha$ term increases, reducing the similarity metric. Additionally, for curated reference data sets (generally assumed to be high value data sets) the $\beta$ term is 0. However, for uncurated data sets the $\beta$ term is 1, greatly reducing the similarity metric.

In some embodiments, a vertex rank can be incorporated into the method. As a result, the method no longer results in a normalized similarity metric. The similarity metric is, therefore, multiplied by the negative weights, as shown below:

$$\left( \sum_{x \in R \cap C} x_{vertex\_rank} \right) \left( 1 - \alpha \frac{\ln(1 + |R - C|)}{1 + \ln(1 + |R - C|)} \right) \left( 1 - \beta \begin{cases} 0, & R \text{ is curated} \\ 1, & R \text{ is uncurated} \end{cases} \right)$$

FIG. 10 depicts examples of a graphical interface 1000 that displays knowledge scoring for different knowledge domains, in accordance with an embodiment of the present invention. As introduced above, graphical interface 1000 can display a graphical visualization of data about matching domains displayed by data enrichment service 302. Graphical interface 1000 illustrates data that provides the user with statistics based on the scoring formula for different knowledge domains. Knowledge domains may include a plurality of terms that relate to a particular category (e.g., a domain), such as those identified in column 1002 ("Domain"). Each of the domains 1002 may include a plurality of terms and may be defined by a knowledge source. The knowledge source may be curated to maintain terms associated with each of the domains 1002. Graphical interface 1000 illustrates various values that define the domains 1002 and a matching score 1016 ("score") determined using the scoring formula for each of the domains. Each of the domains 1002 may have values, such as a frequency value 1004 (e.g., a frequency of terms matching between the input data set and a term in a domain), a population value 1006 (e.g., the number of terms in the input data set), a matching value 1008 (e.g., indicating a percentage of the terms matching the domain calculated based on frequency value 1004 divided by the population), a unique matching value 1010 (e.g., the number of different terms matching between the input data set and a domain), a size 1012 (e.g., a domain count indicating the number of terms in the domain), and a selection value (e.g., indicating the percentage of terms selected for the domain). Although not shown, graphical interface 1000 may show a curation level indicating a constant value between a range of values (e.g., 0.0-100.00) indicating the degree to which the domain is curated. Based on one or more of the values for a domain, score 1016 may be computed using the function for determining similarity such as the score(f, p, u, n, c) described above. In addition to the values for the domain, the score may provide a refined measurement, which enables a user to make a better assessment as to a domain that best matches an input data set. The closest matching domain may be used to name or associate data about the domain with the input data set.

In some embodiments, such as those described with reference to FIGS. 11-18, may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to FIGS. 11-18, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some embodiments, the processes depicted in flowcharts herein can be implemented by a computing system of a data enrichment service, e.g., data enrichment service 302. The particular series of processing steps in this disclosure are not intended to be limiting. Other sequences of steps may also be performed according to alternative embodiments. For example, alternative embodiments of the present invention may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In an aspect of some embodiments, each process in FIGS. 11-18 can be performed by one or more processing units. A processing unit may include one or more processors, including single core or multicore processors, one or more cores of processors, or combinations thereof. In some embodiments, a processing unit can include one or more special purpose co-processors such as graphics processors, digital signal processors (DSPs), or the like. In some embodiments, some or all of processing units can be implemented using customized circuits, such as application specific integrated circuits (ASICs), or field programmable gate arrays (FPGAs).

Figure 11:
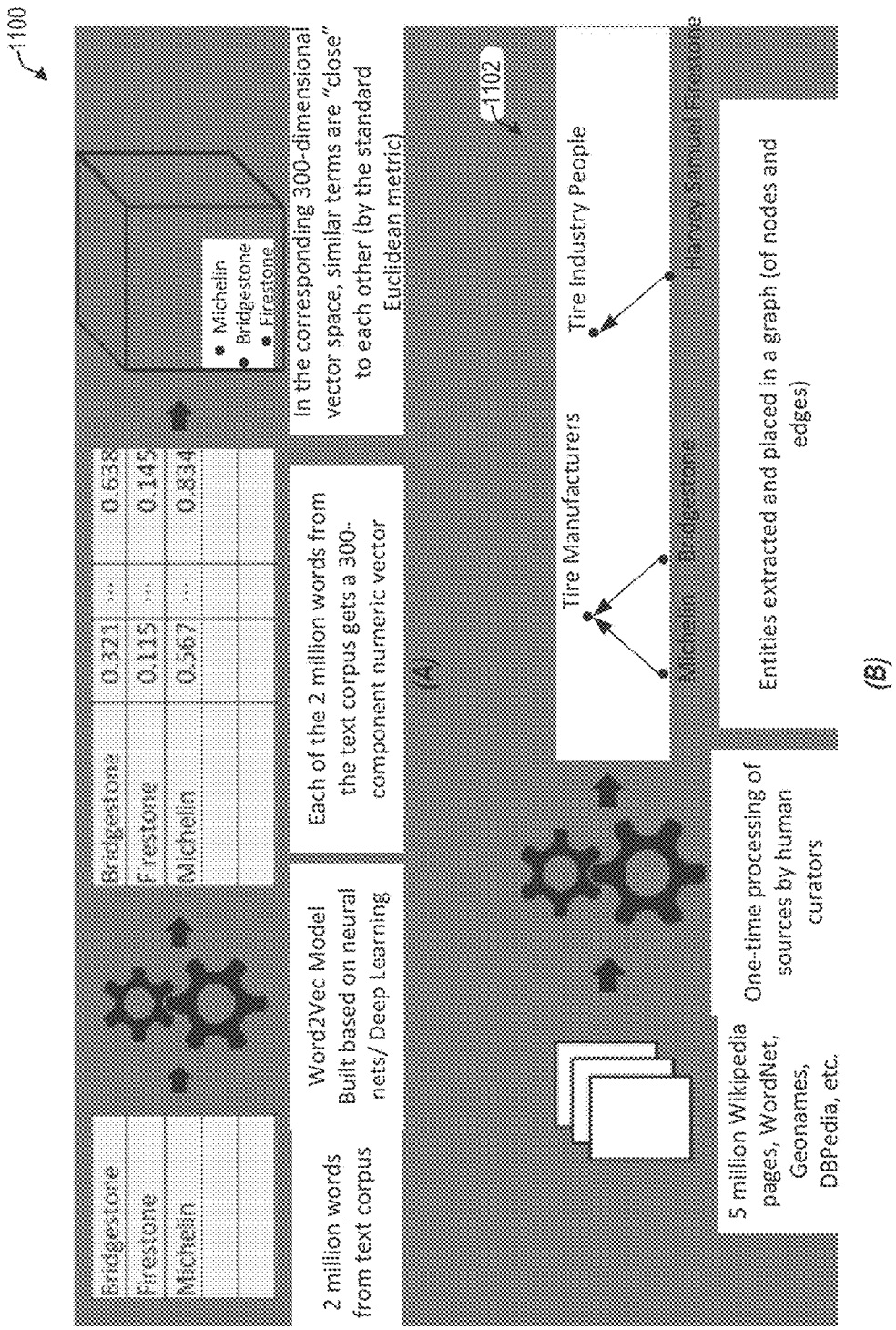
FIG. 11 depicts examples of automated data analyses, in accordance with an embodiment of the present invention.

FIG. 11 depicts examples of automated data analyses. As shown at 1100, an unsupervised machine learning technique, such as Word2Vec, can be used to analyze an input data set. Word2Vec can receive a text input (e.g., a text corpus from a large data source) and generate a vector representation of each input word. The resulting model may then be used to identify how closely related are an arbitrary input set of words. For example, K-Means clustering (or other vector analysis) can be used to analyze vectors corresponding to the set of input words, and determine how similar those input words are, based on how "close" the corresponding vectors are within a vector space.

As shown at 1100, an input set of words can include "Bridgestone", "Firestone", and "Michelin". Using the Word2Vec model built using a large text corpus (e.g., a news aggregator, or other data source); a corresponding numeric vector can be identified for each input word. When these vectors are analyzed, it may be determined that the vectors are "close" (in the Euclidean sense) within a vector space. As shown in FIG. 11, the three input words are clustered closely together within the vector space. Although this can identify that these input words are related, Word2Vec cannot be used to identify a descriptive label for the words (e.g., "tire manufacturers").

At 1102, a method of categorization using a curated data source is shown. A curated data source (such as YAGO, from the Max Planck Institute for Informatics) can provide an ontology (e.g., a formal naming and definition of the types, properties, and interrelationships of the entities that exist for a particular domain). Using the curated data source, entities in an input data set may be identified through graph matching. This enables a genus label (e.g., category) to be identified for an input data set that includes a variety of species (e.g., words). However, as shown at 1102, the genus labels may be incomplete or inaccurate (e.g., different curators may categorize species differently). In the example shown at 302, such inaccuracies may result in the same set of input words being matched to different genera (e.g., Bridgestone and Michelin being matched to the genus for Tire manufactures, and Firestone being matched to tire industry people). Although this provides a method of identifying a genus for an input of species data, the accuracy of the genera identified are limited based on the accuracy and completeness of the curated data source.

Figure 12:
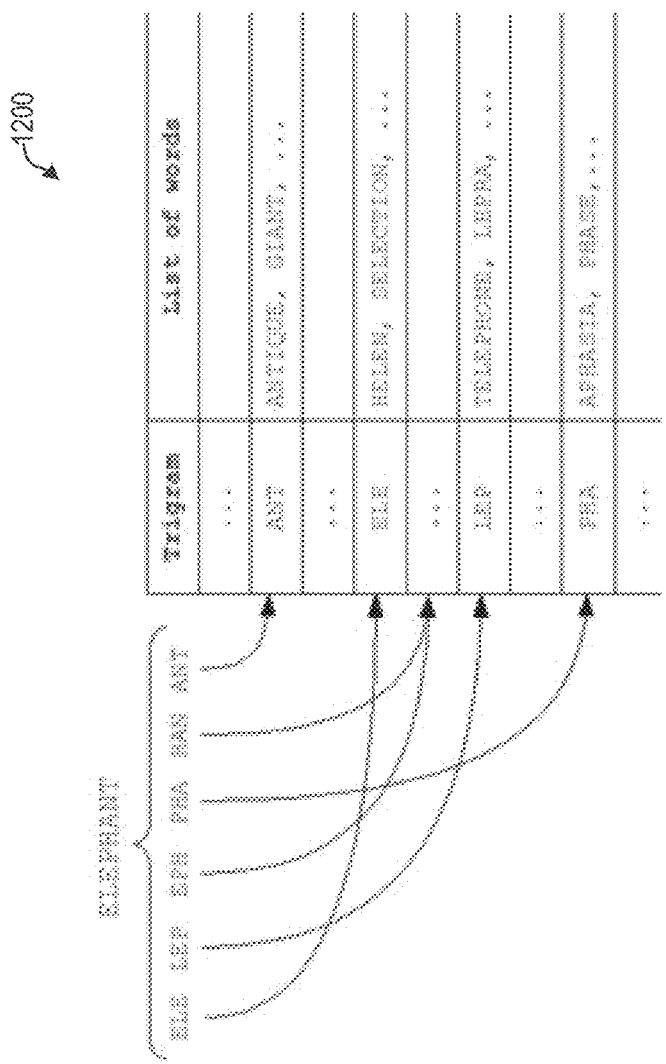
FIG. 12 depicts an example of trigram modeling, in accordance with an embodiment of the present invention.

FIG. 12 depicts an example of trigram modeling 1200. Traditionally, trigrams have been used to perform automatic spelling correction. As shown in FIG. 12, each input word can be broken into trigrams, and a table can be constructed which is indexed by trigram and includes words that include that trigram (e.g., the trigram "ANT" is associated with "antique", "giant", etc.). When used in automatic spelling correction, a dictionary can be used as a data source, and the trigrams can be used to identify a word which is most similar to an input misspelling. For example, a similarity metric can indicate the similarity between the number of trigrams shared between an input word that is misspelled, and a word from the data source (e.g., dictionary).

In accordance with an embodiment, trigram modeling can be used to compare sets of words for category identification. As described further below with respect to FIG. 13, trigrams can be used to make an indexed table (similar to a database index) of a data source (such as the curated YAGO data source). In the indexed table, each trigram can be a primary key associated with multiple words that include that trigram. Different columns of the table can correspond to different categories associated with the words that include the trigram. When an input data set is received, each word in the data set can be divided into trigrams and compared to the indexed table to identify matching words. The matching words can then be compared to the data source to identify a best match for a category. Determining a statistical match for trigram modeling may be implemented using techniques described in U.S. patent application Ser. No. 13/596,844 (Philip Ogren et al.) entitled "Scalable string matching as a component for unsupervised learning in semantic metamodel development."

Figure 13:
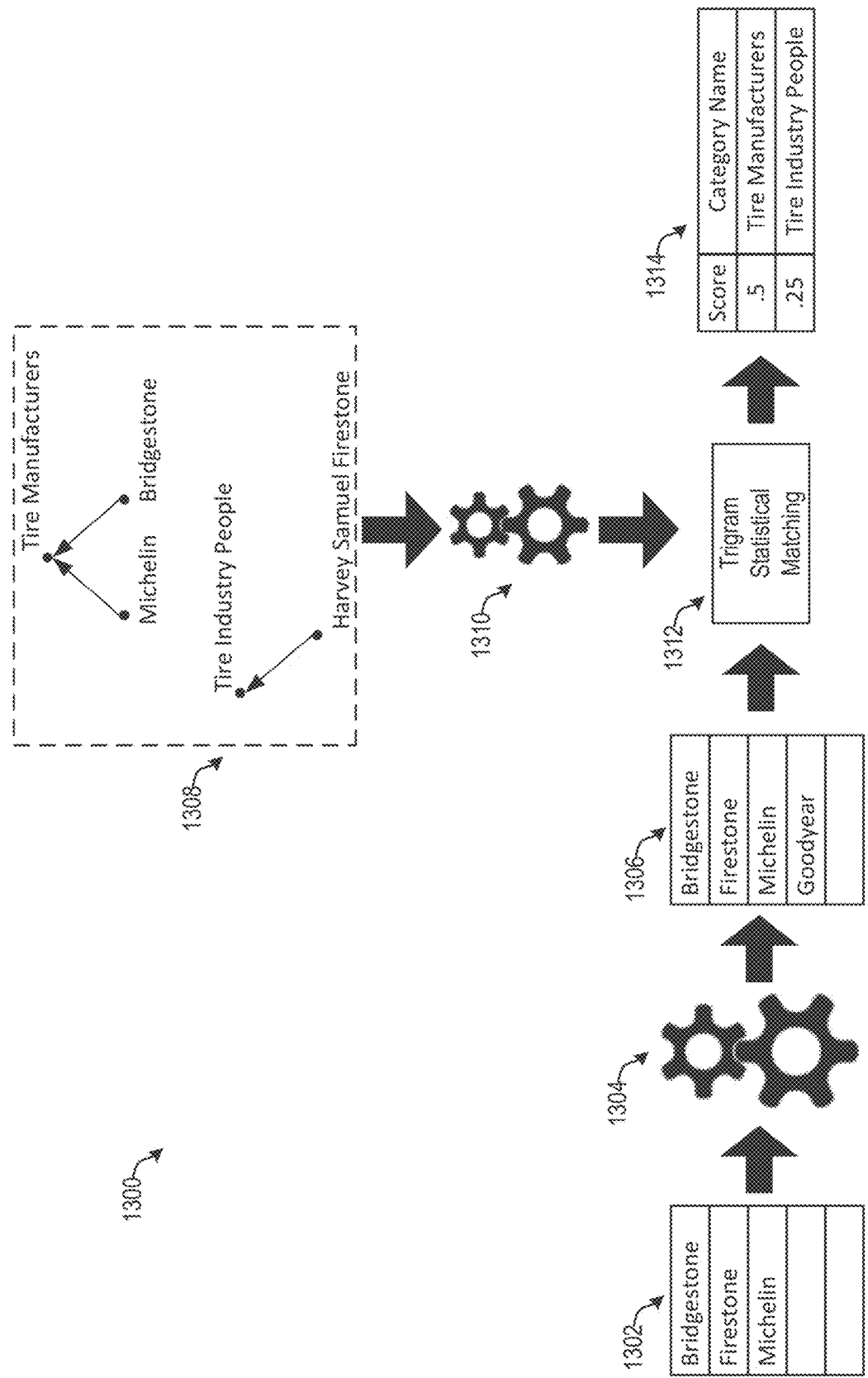
FIG. 13 depicts an example of category labeling, in accordance with an embodiment of the present invention.

FIG. 13 depicts an example of category labeling 1300, in accordance with an embodiment of the present invention. As shown in FIG. 13, an input data set 1302 can be received. The input data set 1302 can include, e.g., a column of text strings. In this example, the input data set 1302 includes the strings "Bridgestone", "Firestone", and "Michelin". At 1304, a data analysis tool (e.g., Word2Vec) can be used to identify similar data to the input data set. In some embodiments, the data analysis tool can preprocess a data source, such data obtained from a news aggregation service, to create a word augmentation list. The input data set 1302 may then be compared to the word augmentation list to identify similar words. For example, using Word2Vec, a vector can be identified for each string included in the input data set 1302. Using a vector analysis method (e.g., K-means clustering), other words from the word augmentation list that are "close" to the words in the input data set can be identified. An augmented data set 1306 is generated that includes similar words from the word augmentation list. As shown in FIG. 13, this includes adding the word "Goodyear" to the input data set 1302 to create the augmented data set 1306.

In some embodiments, the augmented data set 1306 can then be compared to a knowledge source 1308 to identify a category that matches the augmented data set. As shown in FIG. 13, a knowledge source 1308 can include data organized by category. In some embodiments, each category can be represented as a root node, and each root node can have one or more leaf nodes that represent data belonging to that category. For example, knowledge source 1308 includes at least two categories "tire manufacturers" and "tire industry people". Each category includes data belonging to that category (Michelin and Bridgestone belonging to tire manufacturers, and Harvey Samuel Firestone belonging to tire industry people.

In accordance with an embodiment, the augmented data set can be compared to the knowledge source categories using a similarity metric, such as the Jaccard index. The similarity metric can compare one list against another, and assign a value that indicates the similarity of the $$J(A, B) = \frac{|A \cap B|}{|A \cup B|}.$$

two data sets. The similarity metric enables a "best fit" category to be identified even where the knowledge source 1308 is incomplete or incorrect.

In some embodiments, the similarity metric may be calculated based on the Tanimoto metric, which is calculated a numeric vector generalization of the Jaccard index for Boolean vectors: Following equation represents the Tanimoto metric:

$$\frac{X \cdot Y}{|X|^2 + |Y|^2 - X \cdot Y}$$

The dot represents the vector dot product.

As shown above, the Jaccard index can determine the similarity of two data sets A and B, by determining the ratio of the size of the intersection of the data sets to the size of the union of the data sets. As shown at 1314, the size of the intersection of the augmented data set 1306 and the category "tire manufacturers" is 2 (Michelin and Bridgestone) and the size of the union is 4, resulting in a similarity metric of 0.5. The size of the intersection of the augmented data set 1306 and the category tire industry people is 1 (Firestone) and the size of the union is 4, resulting in a similarity metric of 0.25. As such, the "best match" is "tire manufacturers" and the data enrichment service can enrich the input data set by labeling the column "tire manufacturers".

As described above, other similarity metrics may be used in addition, or as an alternative, to the Jaccard index. One of ordinary skill in the art would recognize that any similarity metric may be used with the above described techniques. Some examples of alternative similarity metrics include, but are not limited to: the Dice-Sørensen index; the Tversky index; the Tanimoto metric; and the cosine similarity metric.

Embodiments of the present invention are generally described with reference to "big data" systems and services. This is for clarity of explanation and is not limiting. One of ordinary skill in the art would recognize that embodiments of the present invention may be implemented with other systems and services outside of the "big data" context.

In some embodiments, a trigram statistical analysis 1312 may be applied to the augmented data set 1306. A trigram modeling module can pre-process 1310 knowledge source 1308 into an indexed table with a primary key being the trigram and each column including at least one word from the knowledge source. Different columns for the same trigram can correspond to different categories within knowledge source 1308. For each word in the augmented data set 1306, trigrams can be created and compared to the indexed trigram table. This comparison can result in a list of associated words from the knowledge source 1308, and the closest match from the list of associated words can be added to a trigram-matched data set. This trigram-matched data set may then be compared to the categories of the knowledge source 1308, as described above, to identify the closest matching category. The matching category can then be used to label the input data set 1302, when it is published to one or more downstream data targets.

In some embodiments, the table of indexed trigrams generated from the knowledge source 1308, can include a primary index column with the trigram (sorted alphabetically) and a second column having a list of each category and sub-category having the same trigram at its leaf node.

Figure 14:
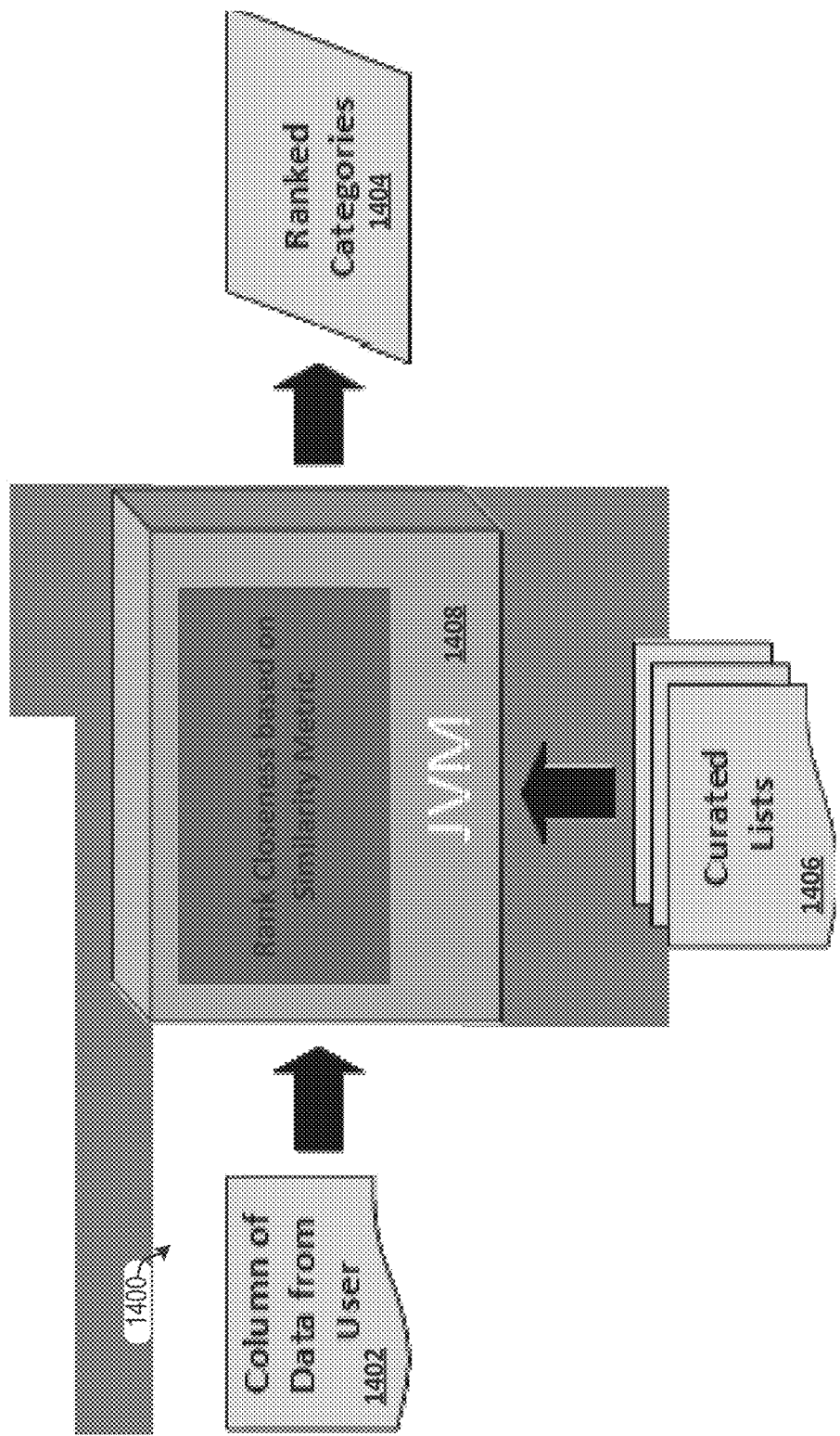
FIGS. 14-16 depict similarity analysis to determine ranked categories, in accordance with an embodiment of the present invention.
Figure 15:
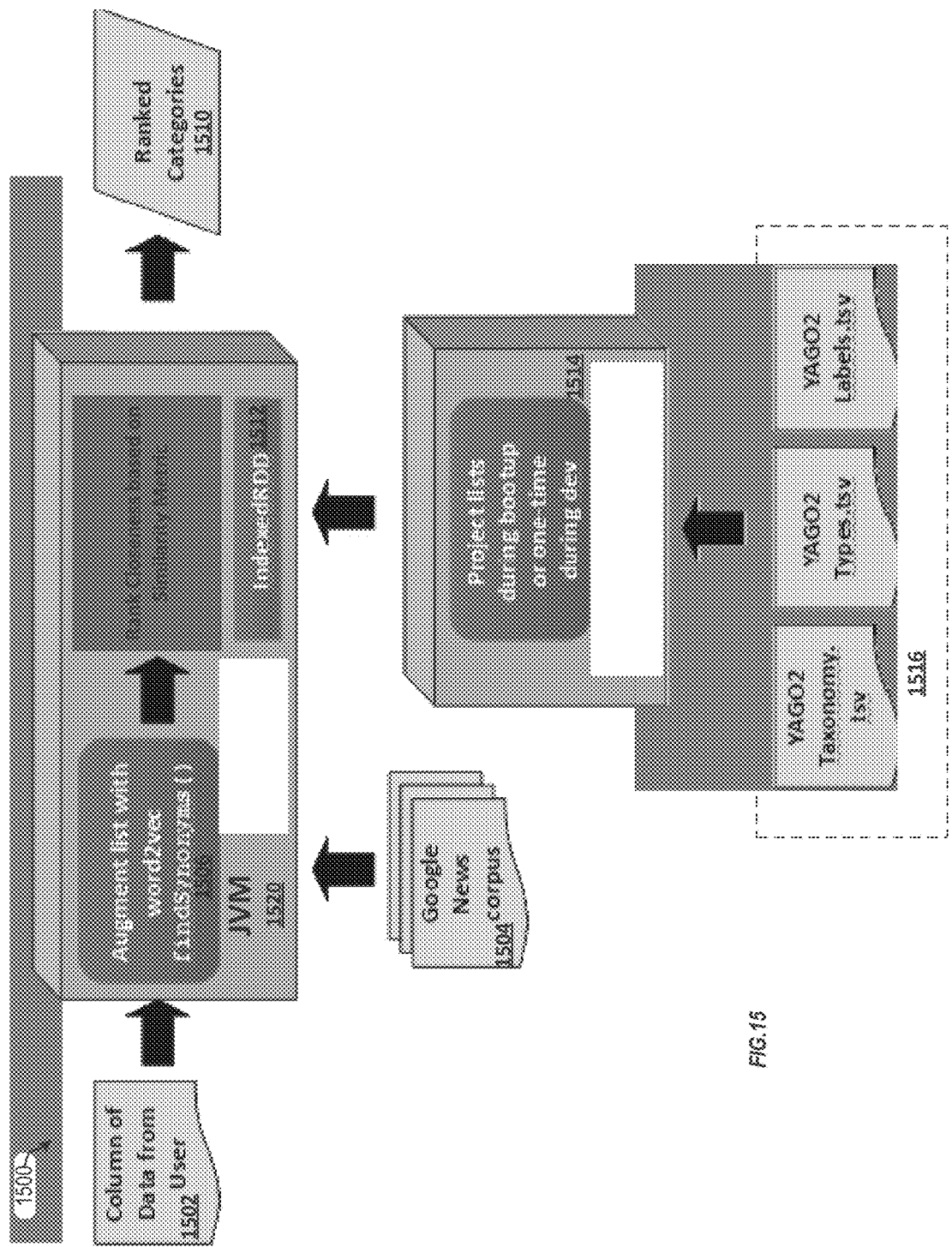
Figure 16:
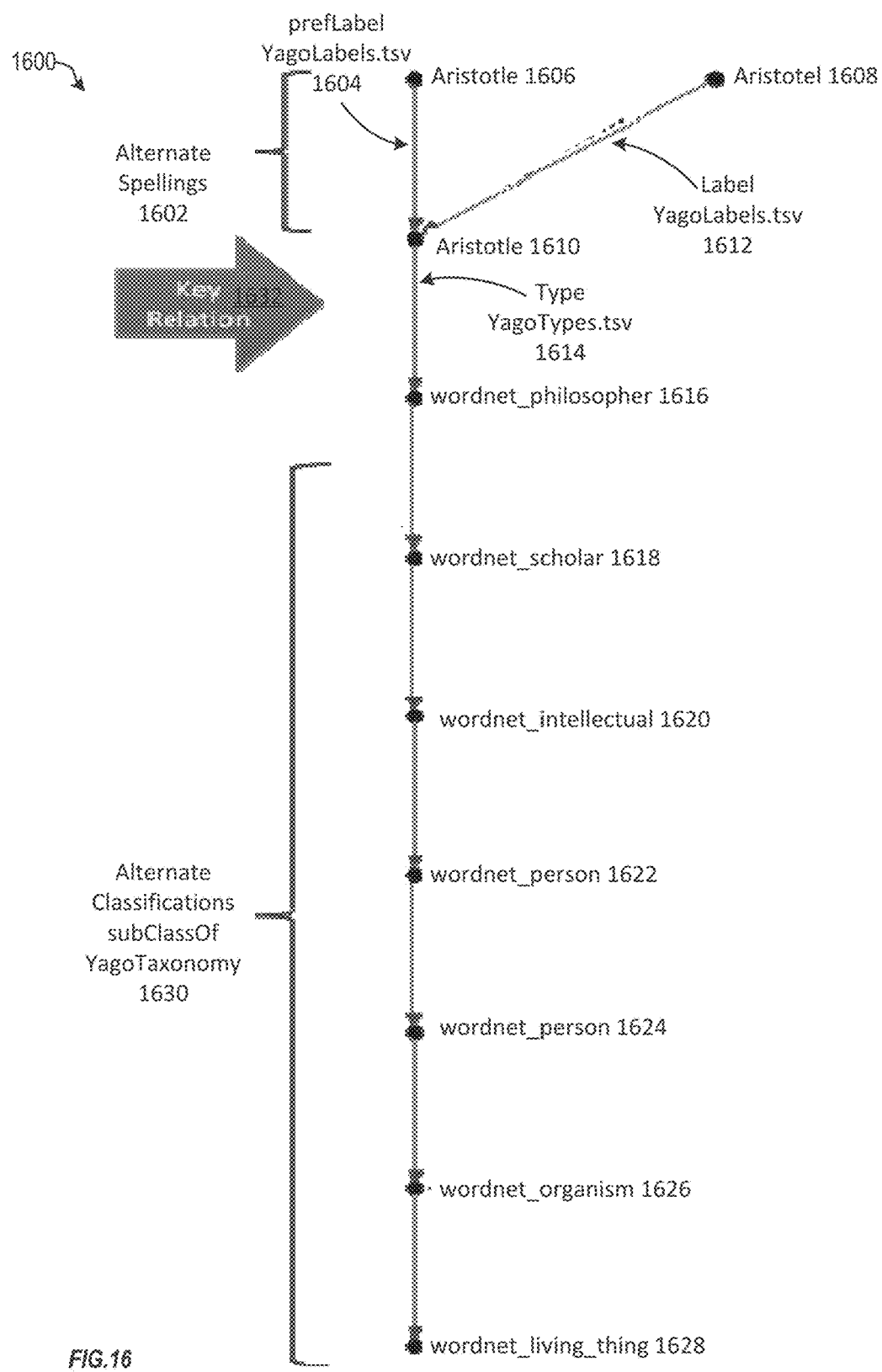

FIGS. 14-16 depict similarity analysis to determine ranked categories, in accordance with an embodiment of the present invention. FIG. 14 depicts a system 1400 for automated data analysis. System 1400 enables discovery of categories and associated rankings for those categories for an input data set 1402 of terms. The automated data analysis may be implemented to categorize data 1402 using curated data obtained from a knowledge source.

As shown, an input data set (e.g., data 1402) can be obtained from an input source provided by a user. Data 1402 may be formatted into one or more columns depending on the source. A data enrichment service 1408 may be implemented using a virtual computing environment, such as a Java® virtual machine (JVM). Data enrichment service 1408 may accept as input, data 1402. Data enrichment service 1402 may obtain curated data 1406 (e.g., curated lists) from a curated data source (such as YAGO, from the Max Planck Institute for Informatics). Curated data 1406 can provide an ontology (e.g., a formal naming and definition of the types, properties, and interrelationships of the entities that exist for a particular domain). Examples of curated data may include geonames indicating zipcodes with different geographic locations.

Using the curated data source, data enrichment service 1408 may can semantically analyze data 1402 to determine a similarity, or closeness, to curated data 1406. The semantic similarity between data sets can be expressed as a similarity metric (e.g., a value). For example, given an input data set and a curated list, the similarity between the input data set and the curated list can be computed using a number of comparison functions, such as the Tversky metric. Based on the similarity metric determined by the comparison, a rank of closeness can be determined based on comparison of data 1402 to curated data 1406. Based on a comparison, categories 1404 in curated data 1406 may be determined and ranked based on the similarity metric. The ranked categories 1404 can be assessed to identity the highest ranking category, which can be associated with the data 1402.

In yet another embodiment, FIG. 15 depicts another example of a system 1500 for automated data analysis. System 1500 enables discovery of categories and associated rankings for those categories for an input data set 1502 of terms. System 1500 may be implemented upon determining that the categories identified by similarity analysis described with reference to FIG. 14 are not close, such that they are not deemed to be good matches.

With reference to FIG. 15, data 1502 received from a user may be formatted into one or more columns depending on the source. A data enrichment service 1520 may be implemented using a virtual computing environment, such as a Java® virtual machine (JVM). The automated data analysis may be implemented to categorize data 1502 using curated data obtained from a knowledge source. System 1500 may be implemented using an aggregation service to augment data 1502 before performing similarity analysis. Data 1502 may be augmented with augmentation data obtained from a source (e.g., an aggregation service) different from the data source from which the input data was received. For example, an input data set may be augmented with data from a knowledge source, such as a text corpus from a news aggregation service (e.g., Google® News corpus), different from a source of the reference data set(s). For example, a data analysis tool such as Word2Vec can be used to identify semantically similar words (e.g., synonyms) to those included in data set from a knowledge source. The data obtained from a knowledge source can be preprocessed to generate a word augmentation list. An input data set may then be compared to the word augmentation list to identify similar words. For example, using Word2Vec, a vector can be identified for each string included in data 1502. Using a vector analysis method (e.g., K-means clustering), other words from the word augmentation list that are "close" to the words in the input data set can be identified. An augmented data set can be generated that includes similar words from the word augmentation list. The input data set can be augmented with the augmented data set. The input data set with having the augmented data may be used for the remainder of the process depicted in FIG. 15.

After augmentation of data 1502, data enrichment service 1502 can semantically analyze data 1502 to determine a similarity, or closeness, to data obtained from a knowledge source 1516. In some embodiments, knowledge source 1516 may provide data from a curated data source. The curated data may include curated categories and types in one or more files. The types may include a taxonomy of terms to better identify a category for data 1502. In some embodiments, an intermediary system 1514 may be implemented to generate curated lists from knowledge source 1516. System 15 may be used only in an off-line mode, either as a one-time operation during development to generate the curated lists, or upon system initialization it would project the tables "from scratch" (from data obtained from knowledge source 1516) every time.

The curated data may be stored in a distributed storage system (e.g., HDFS). In some embodiments, the curated data may be stored in an indexed RDD 1512.

The curated data may be compared to data 1502, which has been augmented, to determine a semantic similarity between the data. The semantic similarity between data sets can be expressed as a similarity metric (e.g., a value). For example, given an input data set and a curated list, the similarity between the input data set and the curated list can be computed using a number of comparison functions, such as the Tversky metric. Based on the similarity metric determined by the comparison, a rank of closeness can be determined based on comparison of data 1502 to curated data. The rank of closeness can be used to identify categories for data 1502. The categories may be ranked 1510 to identity the highest ranking category, which can be associated with the data 1502.

FIG. 16 depicts a process 1600 of comparing an input data set to a set of classifications of curated data obtained from a knowledge source, such as Yago. The set of classifications may include alternative spellings and alternative classifications 1630. The set of classifications may be arranged in a hierarchy with subclasses within a super category 1628 (e.g., living thing). For example, a living thing category 1628 may have a subclass of organism 1626 that has a subclass of person(s) 1622, 1624, which has a subclass of a type of person (e.g., intellectual), which has a subclass of training/ profession 1618 (e.g., scholar), which has a subclass of philosopher 1616. The set of classifications may be may be used to perform a comparison with an input data set for similarity analysis. The alternative spellings can be weighted preferentially during the matching with an input data set as described, for example, with reference to FIGS. 14 and 15. The broader categories or classifications can be used to determining weighting for comparison with input data sets.

In the example shown in FIG. 16, a key relation 1632 may be identified by using one 1614 of the classifications 1630. Classifications 1614 may include a preferred spelling of terms 1604 such as Aristotle 1606 and misspellings 1602 such as Aristotel 1608. Misspellings, e.g., Aristotel 1608, may be mapped to a label 1612 corresponding to a correct spelling 1610 (e.g., Atistotle) of a term, e.g., Aristotle 1606.

Figure 17:
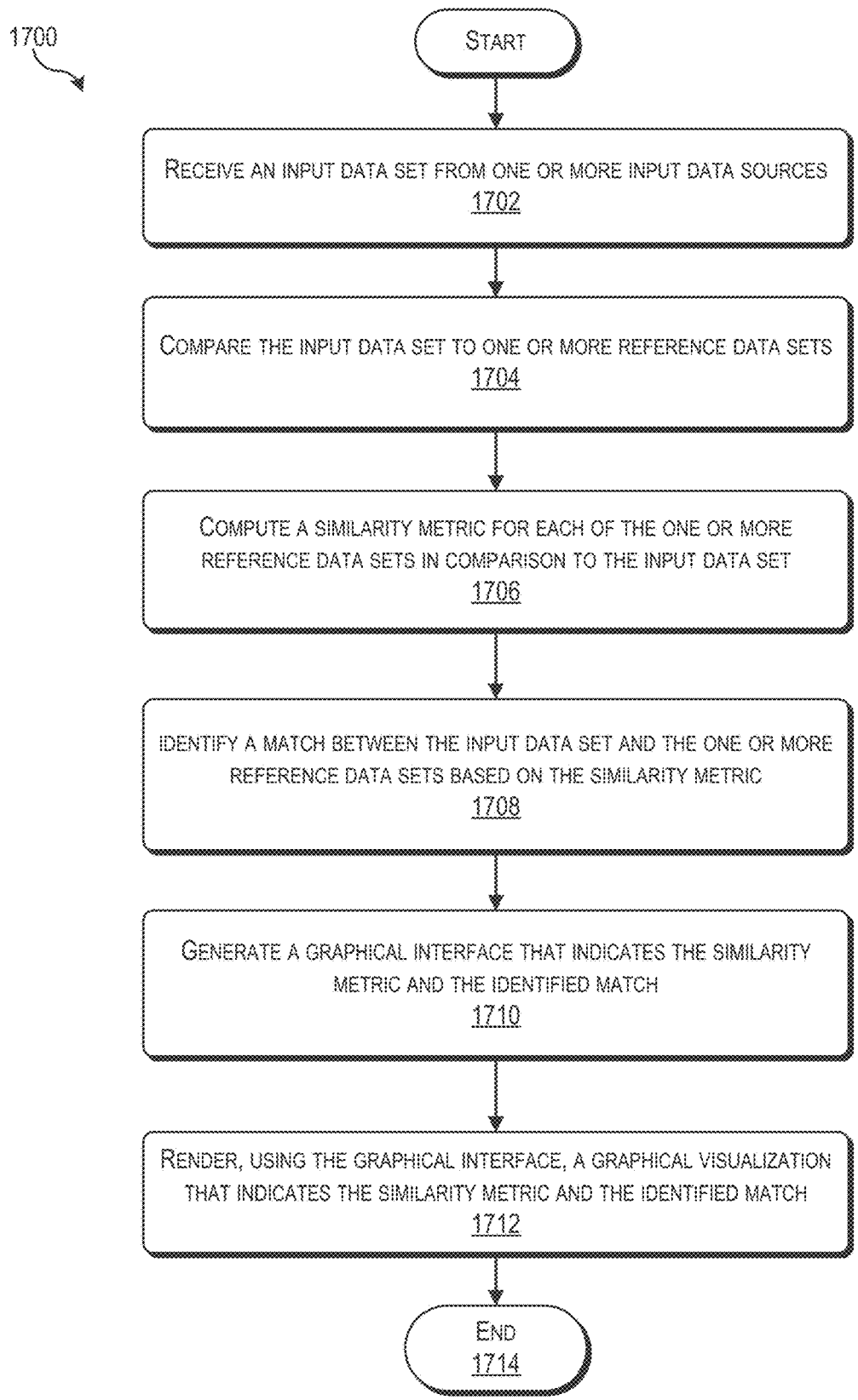
FIGS. 17 and 18 depict flowcharts of processes of similarity analysis, in accordance with some embodiments of the present invention.
Figure 18:
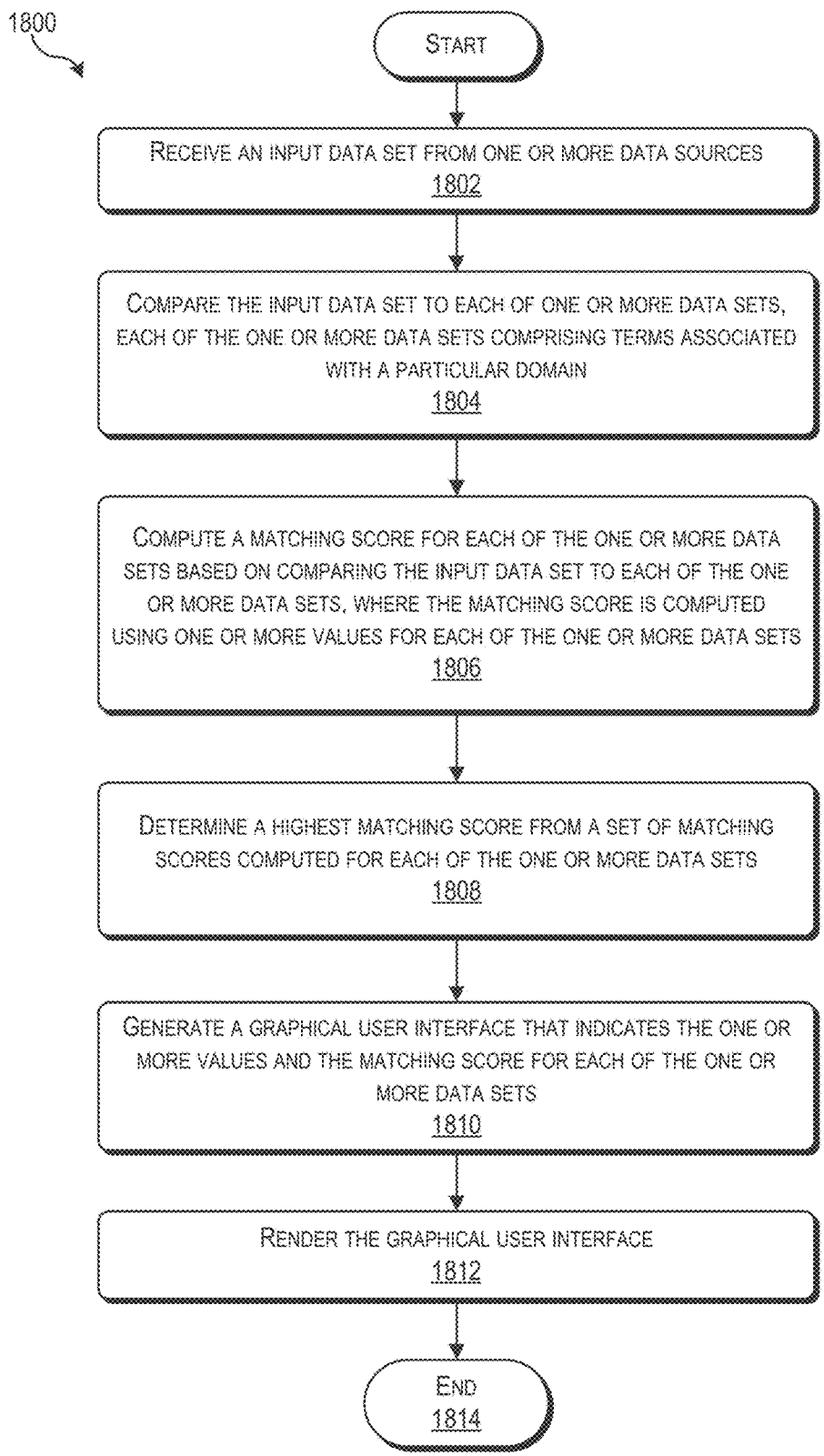

FIGS. 17 and 18 depict flowcharts of processes of similarity analysis, in accordance with some embodiments of the present invention. In some embodiments, the processes depicted in flowcharts herein, such as FIGS. 17 and 18, can be implemented by a computing system of a data enrichment service 302. Flowchart 1700 depicts a process of similarity analysis, whereby input data is compared to one or more reference data sets to determine their similarity. The similarity may be indicated as a measure of similarity that enables a user of a data enrichment service to identify relevant data sets to enrich an input data set.

Flowchart 1700 begins at step 1702 by receiving an input data set from one or more input data sources (e.g., data sources 309 of FIG. 3). In some embodiments, the input data set is formatted into one or more columns of data.

The input data set may be compared to one or more reference data sets obtained from a reference source, at step 1704. For example, a resource source is a knowledge source, such as knowledge source 340. Comparing an input data set to a reference data set may include comparing each of the terms individually or collectively between the two data sets. An input data set may include one or more terms. A reference data may include one or more terms. For example, a reference data set includes terms associated with a category (e.g., a domain or a genus). The reference data set(s) may be curated by a knowledge service.

In some embodiments, the input data may be augmented with augmentation data obtained from a source different from the data source from which the input data was received. For example, an input data set may be augmented with data from a knowledge source, different from a source of the reference data set(s). For example, a data analysis tool such as Word2Vec can be used to identify semantically similar words to those included in the input data set from a knowledge source, such as a text corpus from a news aggregation service. The data obtained from a knowledge source can be preprocessed to generate a word augmentation list. An input data set may then be compared to the word augmentation list to identify similar words. For example, using Word2Vec, a vector can be identified for each string included in the input data set 602. Using a vector analysis method (e.g., K-means clustering), other words from the word augmentation list that are "close" to the words in the input data set can be identified. An augmented data set can be generated that includes similar words from the word augmentation list. The input data set can be augmented with the augmented data set. The input data set with having the augmented data may be used for the remainder of the process depicted in FIG. 17.

In some embodiments, a data structure may be generated that is used to compare the input data set to one or more reference data sets. The process may include generating a data structure that represents at least a portion of one or more reference data sets to be compared. Each node in the data structure may represent a different character in one or more strings extracted from the one or more reference datasets. The input data set may be compared to one or more reference data sets for which the data structure is generated.

At step 1706, a similarity metric may be computed for each of the one or more reference data sets. The similarity metric may indicated a measure of similarity of each of the one or more reference data sets in comparison to the input data set.

In some embodiments, the similarity metric is a matching score computed for each of the one or more reference data sets. For example, a matching score for a reference data set may be computed using one or more values, a first value indicating a metric about the reference data set and a second value indicating a metric based on comparing the input data set to the reference data set. The one or more values may include a frequency value of terms matching between the input data set and the data set, a population value of the data set, a unique matching value of the data set, a unique matching value that indicates the number of different terms matching between the input data set and the data set, a domain value indicating the number of terms in the data set, and a curation level indicating a degree of curation of the data set. The matching score may be computed by implementing a scoring function $(1+c/100)*(f/p)*(\log(u+1)/\log(n+1))$, using the one or more values. The variables of the scoring function may include "f" representing the frequency value, "c" representing a curation level, "p" representing a population value, "u" representing a unique matching value, and "n" representing a domain value.

In some embodiments, the similarity metric is computed as a value based on cardinality of the intersection of the one or more reference data sets in comparison to the input data set. The value may be normalized by the cardinality. The value may be reduced by a first factor based on a size of the one or more reference data sets. The value may be reduced by a second factor based on a type of the one or more reference data sets.

In some embodiments, the similarity metric is computed for each reference data set of the one or more reference data sets by determining a cosine similarity between the input data set and the reference data set. As explained above, a cosine metric (e.g., cosine similarity or distance) between an input data set and one or more terms of a reference data set may be computed as the cosine angle between the reference data set (e.g., a domain or genus) obtained from a knowledge source and an input data set of terms. By computing a similarity metric based on a cosine similarity, each term in the input data set may be considered as a faction of a whole-value integer, such as a value indicating a percentage of similarity between the term and candidate category.

At step 1708, a match between the input data set and the one or more reference data sets is identified based on the similarity metric. In some embodiments, identifying the match includes determining a reference data of the one or more reference data sets having a highest measure of similarity based on the similarity metric computed for each of the one or more reference data sets. The similarity metric computed for each of the one or more reference data sets may be compared to each other to identify the reference data set for which the similarity metric indicates the closest match. The closest match may be identified corresponding to the similarity metric with the highest value. The input data set may be modified to include data included in the reference data set having the highest measure of similarity.

The input data set may be associated with additional data, such as a term (e.g., a domain or category) that describes or labels the input data set. The additional data may be determined based on the reference data set, which may be curated. The additional data may be obtained from the source from which the reference data set was obtained.

At step 1710, a graphical interface may be generated that indicates the similarity metric computed for each of the one or more reference data sets and that indicates the match identified between the input data set and the one or more reference data sets. In some embodiments where the similarity metric is a matching score, the graphical interface indicates the value(s) used to compute the matching score.

At step 1712, a graphical visualization may be rendered using the graphical interface. For example, the graphical interface may be displayed, which causes the graphical visualization to be rendered. The graphical interface may contain data used to determine how to render the graphical visualization. In some embodiments the graphical interface may be sent to another device (e.g., a client device) for rendering. The graphical visualization may indicate the similarity metric computed for each of the one or more reference data sets and may indicate the match identified between the input data set and the one or more reference data sets. Examples of graphical visualizations are described with reference to FIGS. 5 and 10.

In some embodiments, the input data set may be stored with matching information that indicates the similarity metric computed for each of the one or more reference data sets and that indicates the match identified between the input data set and the one or more reference data sets.

Yet in some embodiments, the process depicted in flowchart 1700 may include one or more additional steps after the input data is augmented. The input data set, as augmented, may be used to identify the match to a reference data set. In such embodiments, the process may include generating an indexed trigram table based on the one or more reference data sets. For each word in the input data set that is augmented, create trigrams for the word, compare each of the trigrams to the indexed trigram table, identify a word in the indexed trigram table associated with a trigram that matches a first trigram in the trigrams, and store the word in a trigram augmented data set. The trigram augmented data set may be compared to the one or more reference data sets. A match may be determined between the trigram augmented data set and the one or more reference data sets based on the comparing. Identifying the match between the input data set and the one or more reference data sets, at step 1708, may include using the match between the trigram augmented data set and the one or more reference data sets based on the comparing.

Flowchart may begin at step 1802, by receiving an input data set from one or more data sources. The input data set may be compared to one or more data sets stored by a knowledge source, at step 1804. The input data set may include one or more terms. Each of the one or more data sets may include one or more terms.

At step 1806, a similarity metric may be computed for each of the one or more data sets compared to the input data set. In some embodiments, the similarity metric is computed for each data set of the one or more data sets by determining a cosine similarity between the input data set and the data set. The cosine similarity may be computed as a cosine angle between the input data set and a data set being compared to the input data set.

At step 1808, a match between one or more data sets and the input data set may be determined. The match may be determined based on the similarity metric computed for each of the one or more data sets. Determining the match may include identifying a similarity metric having a highest value in a set of similarity metrics. The set of similarity metrics may comprise the similarity metric computed for each of the one or more data sets.

At step 1810, a graphical user interface may be generated. The graphical user interface may indicate the similarity metric computed for each of the one or more data sets. The graphical user interface may indicate the match between the one or more data sets and the input data set. The match determined based on the similarity metric computed for each of the one or more data sets. At step 1812, the graphical user interface may be rendered to display the similarity metric computed for each of the one or more data sets. The graphical user interface may indicate the similarity metric having the highest value in a set of similarity metrics. The set of similarity metrics may comprise the similarity metric computed for each of the one or more data sets.

Figure 19:
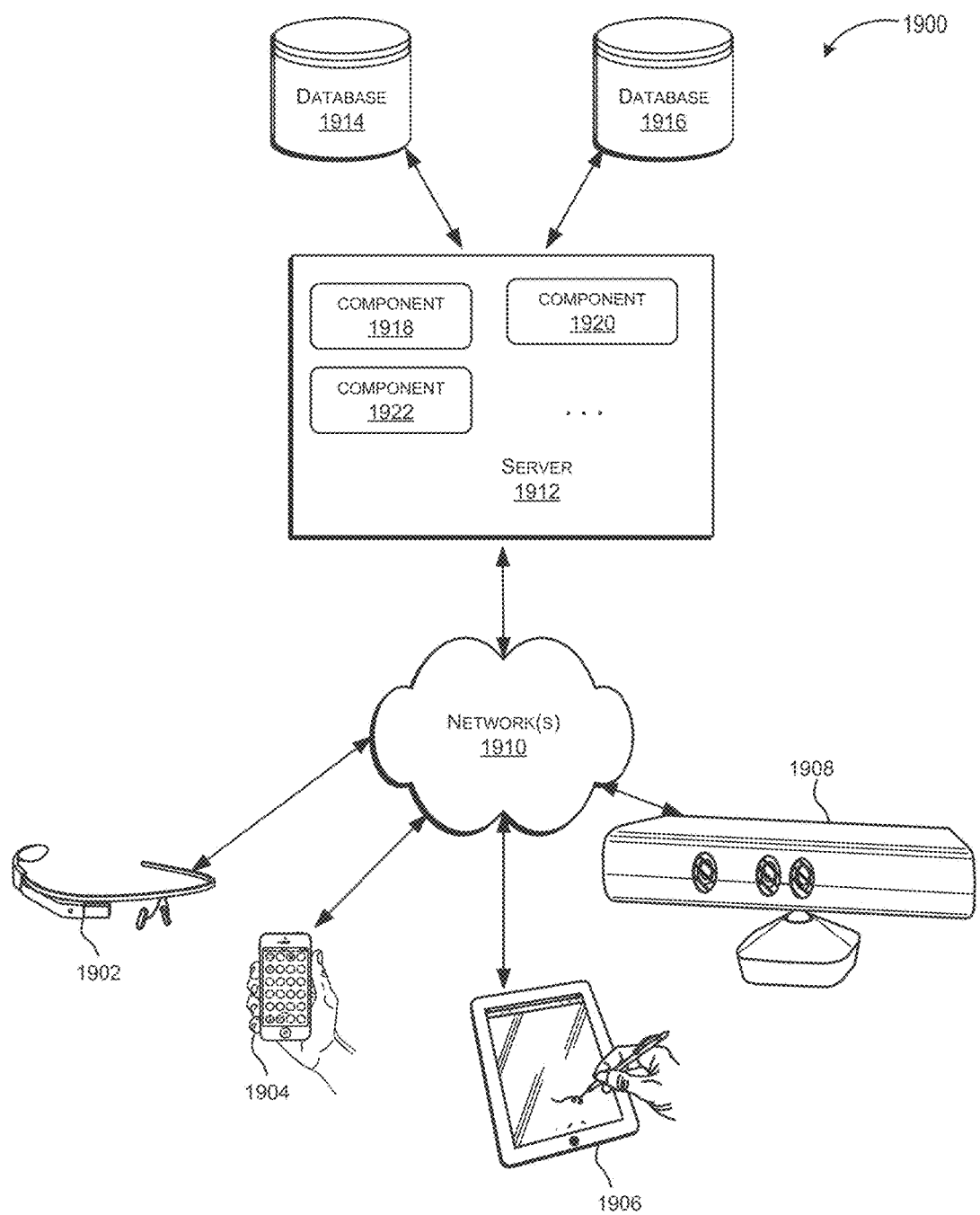
FIG. 19 depicts a simplified diagram of a distributed system for implementing an embodiment.

FIG. 19 depicts a simplified diagram of a distributed system 1900 for implementing an embodiment. In the illustrated embodiment, distributed system 1900 includes one or more client computing devices 1902, 1904, 1906, and 1908, which are configured to execute and operate a client application such as a web browser, proprietary client (e.g., Oracle Forms), or the like over one or more network(s) 1910. Server 1912 may be communicatively coupled with remote client computing devices 1902, 1904, 1906, and 1908 via network 1910.

In various embodiments, server 1912 may be adapted to run one or more services or software applications such as services and applications that provide the document (e.g., webpage) analysis and modification-related processing. In certain embodiments, server 1912 may also provide other services or software applications can include non-virtual and virtual environments. In some embodiments, these services may be offered as web-based or cloud services or under a Software as a Service (SaaS) model to the users of client computing devices 1902, 1904, 1906, and/or 1908. Users operating client computing devices 1902, 1904, 1906, and/or 1908 may in turn utilize one or more client applications to interact with server 1912 to utilize the services provided by these components.

In the configuration depicted in FIG. 19, software components 1918, 1920 and 1922 of system 1900 are shown as being implemented on server 1912. In other embodiments, one or more of the components of system 1900 and/or the services provided by these components may also be implemented by one or more of the client computing devices 1902, 1904, 1906, and/or 1908. Users operating the client computing devices may then utilize one or more client applications to use the services provided by these components. These components may be implemented in hardware, firmware, software, or combinations thereof. It should be appreciated that various different system configurations are possible, which may be different from distributed system 1900. The embodiment shown in FIG. 19 is thus one example of a distributed system for implementing an embodiment system and is not intended to be limiting.

Client computing devices 1902, 1904, 1906, and/or 1908 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1910.

Although distributed system 1900 in FIG. 19 is shown with four client computing devices, any number of client computing devices may be supported. Other devices, such as devices with sensors, etc., may interact with server 1912.

Network(s) 1910 in distributed system 1900 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 1910 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 1912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1912 can include one or more virtual machines running virtual operating systems, or other computing architectures involving virtualization. One or more flexible pools of logical storage devices can be virtualized to maintain virtual storage devices for the server. Virtual networks can be controlled by server 1912 using software defined networking. In various embodiments, server 1912 may be adapted to run one or more services or software applications described in the foregoing disclosure. For example, server 1912 may correspond to a server for performing processing as described above according to an embodiment of the present disclosure.

Server 1912 may run an operating system including any of those discussed above, as well as any commercially available server operating system. Server 1912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1912 may include one or more applications to analyze and consolidate data feeds and/or event updates received from users of client computing devices 1902, 1904, 1906, and 1908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1912 may also include one or more applications to display the data feeds and/or real-time events via one or more display devices of client computing devices 1902, 1904, 1906, and 1908.

Distributed system 1900 may also include one or more databases 1914 and 1916. These databases may provide a mechanism for storing information such as user interactions information, usage patterns information, adaptation rules information, and other information used by embodiments of the present invention. Databases 1914 and 1916 may reside in a variety of locations. By way of example, one or more of databases 1914 and 1916 may reside on a non-transitory storage medium local to (and/or resident in) server 1912. Alternatively, databases 1914 and 1916 may be remote from server 1912 and in communication with server 1912 via a network-based or dedicated connection. In one set of embodiments, databases 1914 and 1916 may reside in a storage-area network (SAN). Similarly, any necessary files for performing the functions attributed to server 1912 may be stored locally on server 1912 and/or remotely, as appropriate. In one set of embodiments, databases 1914 and 1916 may include relational databases, such as databases provided by Oracle, that are adapted to store, update, and retrieve data in response to SQL-formatted commands.

Figure 20:
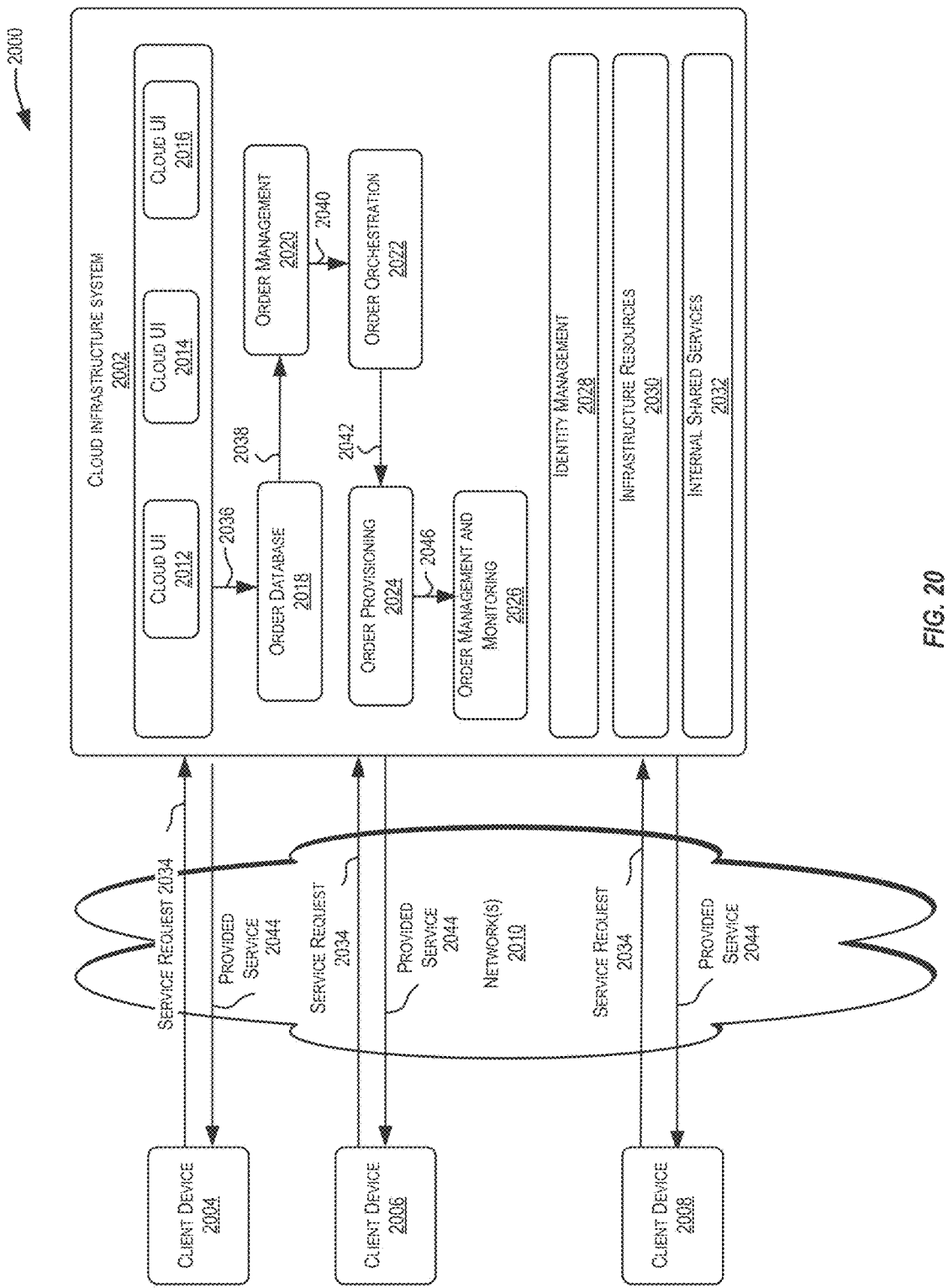
FIG. 20 is a simplified block diagram of one or more components of a system environment in which services may be offered as cloud services, in accordance with an embodiment of the present disclosure.

In some embodiments, the document analysis and modification services described above may be offered as services via a cloud environment. FIG. 20 is a simplified block diagram of one or more components of a system environment 2000 in which services may be offered as cloud services, in accordance with an embodiment of the present disclosure. In the illustrated embodiment in FIG. 20, system environment 2000 includes one or more client computing devices 2004, 2006, and 2008 that may be used by users to interact with a cloud infrastructure system 2002 that provides cloud services, including services for dynamically modifying documents (e.g., webpages) responsive to usage patterns. Cloud infrastructure system 2002 may comprise one or more computers and/or servers that may include those described above for server 2012.

It should be appreciated that cloud infrastructure system 2002 depicted in FIG. 20 may have other components than those depicted. Further, the embodiment shown in FIG. 20 is only one example of a cloud infrastructure system that may incorporate an embodiment of the invention. In some other embodiments, cloud infrastructure system 2002 may have more or fewer components than shown in the figure, may combine two or more components, or may have a different configuration or arrangement of components.

Client computing devices 2004, 2006, and 2008 may be devices similar to those described above for 1902, 1904, 1906, and 1908. Client computing devices 2004, 2006, and 2008 may be configured to operate a client application such as a web browser, a proprietary client application (e.g., Oracle Forms), or some other application, which may be used by a user of the client computing device to interact with cloud infrastructure system 2002 to use services provided by cloud infrastructure system 2002. Although exemplary system environment 2000 is shown with three client computing devices, any number of client computing devices may be supported. Other devices such as devices with sensors, etc. may interact with cloud infrastructure system 2002.

Network(s) 2010 may facilitate communications and exchange of data between clients 2004, 2006, and 2008 and cloud infrastructure system 2002. Each network may be any type of network familiar to those skilled in the art that can support data communications using any of a variety of commercially-available protocols, including those described above for network(s) 2010.

In certain embodiments, services provided by cloud infrastructure system 2002 may include a host of services that are made available to users of the cloud infrastructure system on demand. In addition to services related to dynamic document modification responsive usage patterns, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 2002 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 2002 may also provide "big data" related computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 2002 may be adapted to automatically provision, manage and track a customer's subscription to services offered by cloud infrastructure system 2002. Cloud infrastructure system 2002 may provide the cloud services via different deployment models. For example, services may be provided under a public cloud model in which cloud infrastructure system 2002 is owned by an organization selling cloud services (e.g., owned by Oracle Corporation) and the services are made available to the general public or different industry enterprises. As another example, services may be provided under a private cloud model in which cloud infrastructure system 2002 is operated solely for a single organization and may provide services for one or more entities within the organization. The cloud services may also be provided under a community cloud model in which cloud infrastructure system 2002 and the services provided by cloud infrastructure system 2002 are shared by several organizations in a related community. The cloud services may also be provided under a hybrid cloud model, which is a combination of two or more different models.

In some embodiments, the services provided by cloud infrastructure system 2002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2002. Cloud infrastructure system 2002 then performs processing to provide the services in the customer's subscription order.

In some embodiments, the services provided by cloud infrastructure system 2002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 2002 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 2002 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2002 may also include infrastructure resources 2030 for providing the resources used to provide various services to customers of the cloud infrastructure system. In one embodiment, infrastructure resources 2030 may include pre-integrated and optimized combinations of hardware, such as servers, storage, and networking resources to execute the services provided by the PaaS platform and the SaaS platform, and other resources.

In some embodiments, resources in cloud infrastructure system 2002 may be shared by multiple users and dynamically re-allocated per demand. Additionally, resources may be allocated to users in different time zones. For example, cloud infrastructure system 2002 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2032 may be provided that are shared by different components or modules of cloud infrastructure system 2002 to enable provision of services by cloud infrastructure system 2002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 2002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 2002, and the like.

In one embodiment, as depicted in FIG. 20, cloud management functionality may be provided by one or more modules, such as an order management module 2020, an order orchestration module 2022, an order provisioning module 2024, an order management and monitoring module 2026, and an identity management module 2028. These modules may include or be provided using one or more computers and/or servers, which may be general purpose computers, specialized server computers, server farms, server clusters, or any other appropriate arrangement and/or combination.

In an exemplary operation, at 2034, a customer using a client device, such as client device 2004, 2006 or 2008, may interact with cloud infrastructure system 2002 by requesting one or more services provided by cloud infrastructure system 2002 and placing an order for a subscription for one or more services offered by cloud infrastructure system 2002. In certain embodiments, the customer may access a cloud User Interface (UI) such as cloud UI 2012, cloud UI 2014 and/or cloud UI 2016 and place a subscription order via these UIs. The order information received by cloud infrastructure system 2002 in response to the customer placing an order may include information identifying the customer and one or more services offered by the cloud infrastructure system 2002 that the customer intends to subscribe to.

At 2036, the order information received from the customer may be stored in an order database 2018. If this is a new order, a new record may be created for the order. In one embodiment, order database 2018 can be one of several databases operated by cloud infrastructure system 2018 and operated in conjunction with other system elements.

At 2038, the order information may be forwarded to an order management module 2020 that may be configured to perform billing and accounting functions related to the order, such as verifying the order, and upon verification, booking the order.

At 2040, information regarding the order may be communicated to an order orchestration module 2022 that is configured to orchestrate the provisioning of services and resources for the order placed by the customer. In some instances, order orchestration module 2022 may use the services of order provisioning module 2024 for the provisioning. In certain embodiments, order orchestration module 2022 enables the management of business processes associated with each order and applies business logic to determine whether an order should proceed to provisioning.

As shown in the embodiment depicted in FIG. 20, at 2042, upon receiving an order for a new subscription, order orchestration module 2022 sends a request to order provisioning module 2024 to allocate resources and configure resources needed to fulfill the subscription order. Order provisioning module 2024 enables the allocation of resources for the services ordered by the customer. Order provisioning module 2024 provides a level of abstraction between the cloud services provided by cloud infrastructure system 2000 and the physical implementation layer that is used to provision the resources for providing the requested services. This enables order orchestration module 2022 to be isolated from implementation details, such as whether or not services and resources are actually provisioned on the fly or pre-provisioned and only allocated/assigned upon request.

At 2044, once the services and resources are provisioned, a notification may be sent to the subscribing customers indicating that the requested service is now ready for use. In some instance, information (e.g., a link) may be sent to the customer that enables the customer to start using the requested services.

At 2046, a customer's subscription order may be managed and tracked by an order management and monitoring module 2026. In some instances, order management and monitoring module 2026 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 2000 may include an identity management module 2028 that is configured to provide identity services, such as access management and authorization services in cloud infrastructure system 2000. In some embodiments, identity management module 2028 may control information about customers who wish to utilize the services provided by cloud infrastructure system 2002. Such information can include information that authenticates the identities of such customers and information that describes which actions those customers are authorized to perform relative to various system resources (e.g., files, directories, applications, communication ports, memory segments, etc.) Identity management module 2028 may also include the management of descriptive information about each customer and about how and by whom that descriptive information can be accessed and modified.

Figure 21:
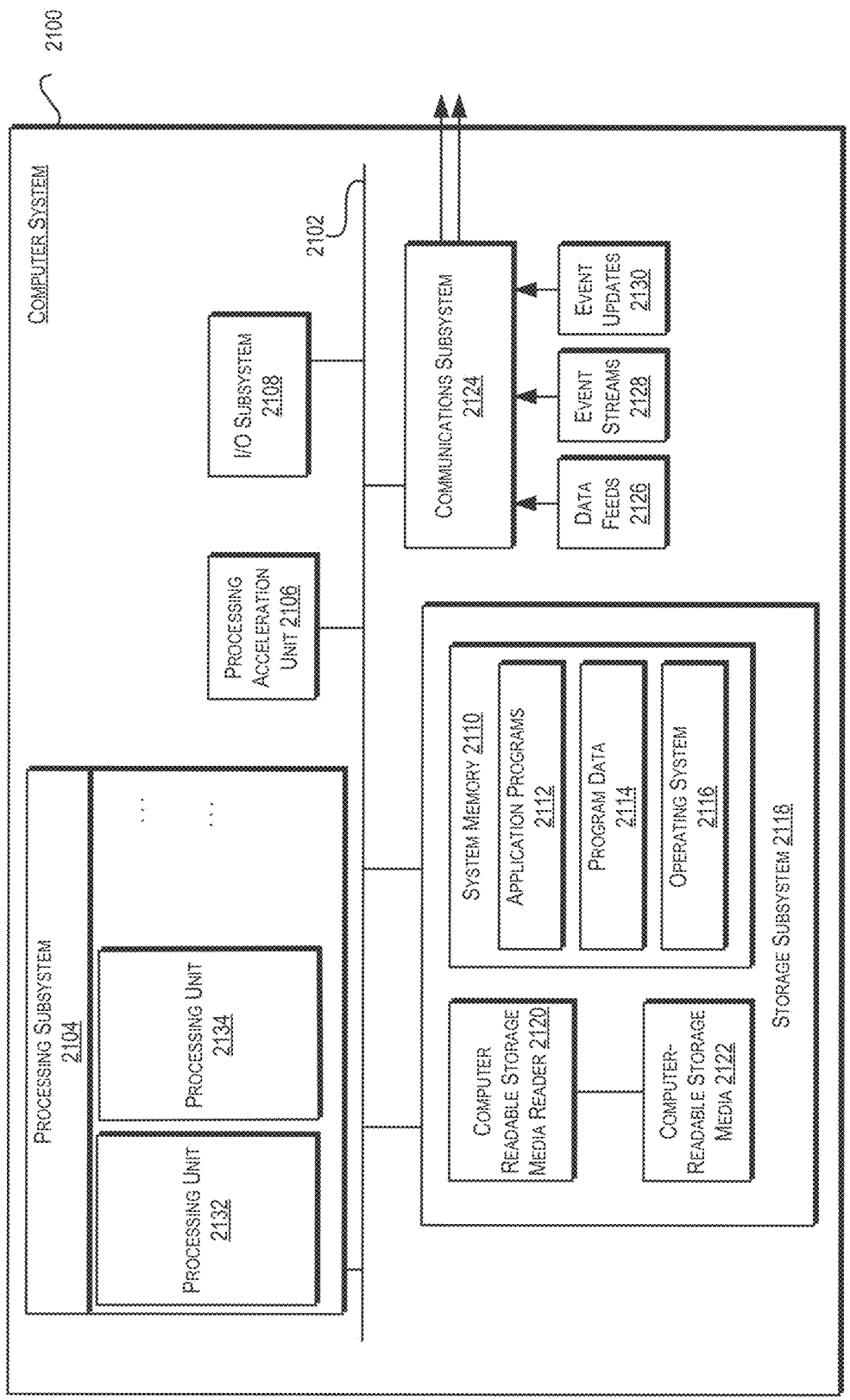
FIG. 21 illustrates an exemplary computer system that may be used to implement an embodiment of the present invention.

FIG. 21 illustrates an exemplary computer system 2100 that may be used to implement an embodiment of the present invention. In some embodiments, computer system 2100 may be used to implement any of the various servers and computer systems described above. As shown in FIG. 21, computer system 2100 includes various subsystems including a processing unit 2104 that communicates with a number of peripheral subsystems via a bus subsystem 2102. These peripheral subsystems may include a processing acceleration unit 2106, an I/O subsystem 2108, a storage subsystem 2118 and a communications subsystem 2124. Storage subsystem 2118 may include tangible computer-readable storage media 2122 and a system memory 2110.

Bus subsystem 2102 provides a mechanism for letting the various components and subsystems of computer system 2100 communicate with each other as intended. Although bus subsystem 2102 is shown schematically as a single bus, alternative embodiments of the bus subsystem may utilize multiple buses. Bus subsystem 2102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 2104 controls the operation of computer system 2100 and may comprise one or more processing units 2132, 2134, etc. A processing unit may include be one or more processors, including single core or multicore processors, one or more cores of processors, or combinations thereof. In some embodiments, processing subsystem 2104 can include one or more special purpose co-processors such as graphics processors, digital signal processors (DSPs), or the like. In some embodiments, some or all of the processing units of processing subsystem 2104 can be implemented using customized circuits, such as application specific integrated circuits (ASICs), or field programmable gate arrays (FPGAs).

In some embodiments, the processing units in processing subsystem 2104 can execute instructions stored in system memory 2110 or on computer readable storage media 2122. In various embodiments, the processing units can execute a variety of programs or code instructions and can maintain multiple concurrently executing programs or processes. At any given time, some or all of the program code to be executed can be resident in system memory 2110 and/or on computer-readable storage media 2122 including potentially on one or more storage devices. Through suitable programming, processing subsystem 2104 can provide various functionalities described above for dynamically modifying documents (e.g., webpages) responsive to usage patterns.

In certain embodiments, a processing acceleration unit 2106 may be provided for performing customized processing or for off-loading some of the processing performed by processing subsystem 2104 so as to accelerate the overall processing performed by computer system 2100.

I/O subsystem 2108 may include devices and mechanisms for inputting information to computer system 2100 and/or for outputting information from or via computer system 2100. In general, use of the term "input device" is intended to include all possible types of devices and mechanisms for inputting information to computer system 2100. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 2118 provides a repository or data store for storing information that is used by computer system 2100. Storage subsystem 2118 provides a tangible non-transitory computer-readable storage medium for storing the basic programming and data constructs that provide the functionality of some embodiments. Software (programs, code modules, instructions) that when executed by processing subsystem 2104 provide the functionality described above may be stored in storage subsystem 2118. The software may be executed by one or more processing units of processing subsystem 2104. Storage subsystem 2118 may also provide a repository for storing data used in accordance with the present invention.

Storage subsystem 2118 may include one or more non-transitory memory devices, including volatile and non-volatile memory devices. As shown in FIG. 21, storage subsystem 2118 includes a system memory 2110 and a computer-readable storage media 2122. System memory 2110 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 2100, such as during start-up, may typically be stored in the ROM. The RAM typically contains data and/or program modules that are presently being operated and executed by processing subsystem 2104. In some implementations, system memory 2110 may include multiple different types of memory, such as static random access memory (SRAM) or dynamic random access memory (DRAM).

By way of example, and not limitation, as depicted in FIG. 21, system memory 2110 may store application programs 2112, which may include client applications, Web browsers, mid-tier applications, relational database management systems (RDBMS), etc., program data 2114, and an operating system 2116. By way of example, operating system 2116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 2122 may store programming and data constructs that provide the functionality of some embodiments. Software (programs, code modules, instructions) that when executed by processing subsystem 2104 a processor provide the functionality described above may be stored in storage subsystem 2118. By way of example, computer-readable storage media 2122 may include non-volatile memory such as a hard disk drive, a magnetic disk drive, an optical disk drive such as a CD ROM, DVD, a Blu-Ray® disk, or other optical media. Computer-readable storage media 2122 may include, but is not limited to, Zip® drives, flash memory cards, universal serial bus (USB) flash drives, secure digital (SD) cards, DVD disks, digital video tape, and the like. Computer-readable storage media 2122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 2122 may provide storage of computer-readable instructions, data structures, program modules, and other data for computer system 2100.

In certain embodiments, storage subsystem 2100 may also include a computer-readable storage media reader 2120 that can further be connected to computer-readable storage media 2122. Together and, optionally, in combination with system memory 2110, computer-readable storage media 2122 may comprehensively represent remote, local, fixed, and/or removable storage devices plus storage media for storing computer-readable information.

In certain embodiments, computer system 2100 may provide support for executing one or more virtual machines. Computer system 2100 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 2100. Accordingly, multiple operating systems may potentially be run concurrently by computer system 2100. Each virtual machine generally runs independently of the other virtual machines.

Communications subsystem 2124 provides an interface to other computer systems and networks. Communications subsystem 2124 serves as an interface for receiving data from and transmitting data to other systems from computer system 2100. For example, communications subsystem 2124 may enable computer system 2100 to establish a communication channel to one or more client devices via the Internet for receiving and sending information from and to the client devices.

Communication subsystem 2124 may support both wired and/or wireless communication protocols. For example, in certain embodiments, communications subsystem 2124 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2124 can provide wired network connectivity (e.g., Ethernet) in addition to or instead of a wireless interface.

Communication subsystem 2124 can receive and transmit data in various forms. For example, in some embodiments, communications subsystem 2124 may receive input communication in the form of structured and/or unstructured data feeds 2126, event streams 2128, event updates 2130, and the like. For example, communications subsystem 2124 may be configured to receive (or send) data feeds 2126 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 2124 may be configured to receive data in the form of continuous data streams, which may include event streams 2128 of real-time events and/or event updates 2130, that may be continuous or unbounded in nature with no explicit end. Examples of applications that generate continuous data may include, for example, sensor data applications, financial tickers, network performance measuring tools (e.g., network monitoring and traffic management applications), click-stream analysis tools, automobile traffic monitoring, and the like.

Communications subsystem 2124 may also be configured to output the structured and/or unstructured data feeds 2126, event streams 2128, event updates 2130, and the like to one or more databases that may be in communication with one or more streaming data source computers coupled to computer system 2100.

Computer system 2100 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 2100 depicted in FIG. 21 is intended only as a specific example. Many other configurations having more or fewer components than the system depicted in FIG. 21 are possible. Based on the disclosure and teachings provided herein, a person of ordinary skill in the art will appreciate other ways and/or methods to implement the various embodiments.

In one embodiment of the present invention, a data enrichment system is provided. The data enrichment system is executable in a cloud computing environment including a computing system, wherein the data enrichment system is communicatively coupled to a plurality of input data sources (e.g., the data sources 104 as shown in FIG. 1) over at least one communication network.

The data enrichment system comprises a matching section, a similarity metric section, and a categorization section. The matching section, similarity metric section, and categorization section can be, for example, the matching module 312, similarity metric module 314, and categorization section 318 as shown in FIG. 3, respectively.

The matching section is configured to compare the input data set received from the plurality of input data sources to one or more reference data sets obtained from a reference source (e.g., knowledge source 340 shown in FIG. 3). The similarity metric section is configured to compute a similarity metric for each of the one or more reference data sets, the similarity metric indicating a measure of similarity of each of the one or more reference data sets in comparison to the input data set, and is configured to identify a match between the input data set and the one or more reference data sets based on the similarity metric. The categorization section is configured to generate a graphical interface that indicates the similarity metric computed for each of the one or more reference data sets and that indicates the match identified between the input data set and the one or more reference data sets. In addition, a graphical visualization that indicates the similarity metric computed for each of the one or more reference data sets and that indicates the match identified between the input data set and the one or more reference data sets is rendered using a user interface.

In one embodiment of the invention, the data enrichment system further comprises a knowledge scoring section, which may, for example, correspond to the knowledge scoring module 316 as shown in FIG. 3.

In one embodiment of the invention, the one or more reference data sets includes terms associated with a domain, and the similarity metric is a matching score computed for each of the one or more reference data sets, the matching score is computed, by the knowledge scoring section, using one or more values including a first value indicating a metric about the reference data set and a second value indicating a metric based on comparing the input data set to the reference data set, and the graphical visualization is rendered to indicate the one or more values used to compute the matching score.

In one embodiment of the invention, the one or more values includes a frequency value of terms matching between the input data set and the data set, a population value of the data set, unique matching value that indicates the number of different terms matching between the input data set and the data set, a domain value indicating the number of terms in the data set, and a curation level indicating a degree of curation of the data set.

In one embodiment of the invention, the categorization section is further configured to generate an augmentation list based on augmentation data obtained from an aggregation service; augment the input data set based on the augmentation list; generate an indexed trigram table based on the one or more reference data sets; for each word in the input data set after augmentation: create trigrams for the word; compare each of the trigrams to the indexed trigram table; identify a word in the indexed trigram table associated with a trigram that matches a first trigram in the trigrams; and store the word in a trigram augmented data set; compare the trigram augmented data set to the one or more reference data sets; and determine a match between the trigram augmented data set and the one or more reference data sets based on the comparing. The input data compared to the one or more reference data sets is augmented based on the augmentation list, and identifying the match between the input data set and the one or more reference data sets is performed using the match between the trigram augmented data set and the one or more reference data sets based on the comparing.

In one embodiment of the invention, a further data enrichment system is provided. The data enrichment system is executable in a cloud computing environment including a computing system, wherein the data enrichment system is communicatively coupled to a plurality of input data sources (e.g., the data sources 104 as shown in FIG. 1) over at least one communication network.

The data enrichment system comprises a matching section and, a similarity metric section. The matching section and the similarity metric section can be, for example, the matching module 312 and the similarity metric module 314 as shown in FIG. 3, respectively.

The matching section is configured to compare the input data set received from the plurality of input data sources to one or more reference data sets obtained from a reference source (e.g., knowledge source 340 shown in FIG. 3). The similarity metric section is configured to compute a similarity metric for each of the one or more reference data sets, the similarity metric indicating a measure of similarity of each of the one or more reference data sets in comparison to the input data set, and is configured to identify a match between the input data set and the one or more reference data sets based on the similarity metric. The input data set is stored with matching information that indicates the similarity metric computed for each of the one or more reference data sets and that indicates the match identified between the input data set and the one or more reference data sets.

In one embodiment of the invention, the data enrichment system further comprises a categorization section, which may, for example, correspond to the categorization module 318 as shown in FIG. 3. The categorization section is configured to identify a category label for the input data set based on identifying the match between the input data set and the one or more reference data sets, and the input data set is stored in association with the category label.

In one embodiment of the invention, the similarity metric is computed using one or more of a Jaccard Index, a Tversky Index, or a Dice-Sorensen Index.

In one embodiment of the invention, the input data set is compared to the one or more reference data sets using one or more of graph matching or semantic similarity matching.

It is apparent for those skilled in the art that, for the particular operation processes of the units/modules (e.g., engines) described above, reference may be made to the corresponding steps/components in the related method/system embodiment sharing the same concept and the reference is regarded as the disclosure of the related units/modules also. And therefore some of the particular operation processes will not be described repeatedly or in detail for convenience and concision of description.

It is also apparent for those skilled in the art that the units/modules can be implemented in an electronic device in the manner of software, hardware and/or combination of software and hardware. Components described as separate components may or may not be physically separated. In particular, components according to each embodiment of the present invention may be integrated in one physical component or may exist in various separate physical components. The various implementations of units in the electronic device are all included within the scope of protection of the invention.

It should be understood that the unit, apparatus, and device may be implemented in form of software, hardware known or developed in the future and/or the combination of such software and hardware.

It is apparent for persons in the art that the operations described in FIG. 3 may be implemented in form of software, hardware and/or the combination of such software and hardware, depending on the particular application environment. It is apparent for persons in the art that at least some of the steps can be implemented by running instructions in general processor, with the instructions stored in memory. It is apparent for persons in the art that at least some of the steps can also be implemented by various hardware, including but not limited to DSP, FPGA, ASIC etc. For example, the "operations" in some of the embodiments may be implemented by instructions running in CPU or by special processor such as DSP, FPGA, ASIC implementing the functionality of "operations".

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims. The modifications include any relevant combination of the disclosed features.

The data enrichment service described herein may also be referred to as IMI, ODECS, and/or Big Data Prep.

What is claimed is:

1. A method comprising:
    receiving, by a cloud computing infrastructure system of a data enrichment system, an input data set from one or more input data sources, wherein the data enrichment system comprises a user experience layer configured to provide access to the data enrichment system and a scheduler service configured to manage requests and responses received through the user experience layer and configured to manage the cloud computing infrastructure system;
    comparing, by the cloud computing infrastructure system of the data enrichment system the input data set to one or more reference data sets obtained from a reference source;
    computing, by the cloud computing infrastructure system, a similarity metric for each of the one or more reference data sets, the similarity metric indicating a measure of similarity of each of the one or more reference data sets in comparison to the input data set, wherein the similarity metric is a matching score computed for each of the one or more reference data sets with respect to the input data set, and wherein the similarity metric is computed as a value based on cardinality of an intersection of the one or more reference data sets in comparison to the input data set wherein the value is normalized by the cardinality, and wherein the value is reduced by a first factor based on a size of the one or more reference data sets, and the value is reduced by a second factor based on a type of the one or more reference data sets;
    identifying, by the cloud computing infrastructure system, a match between the input data set and the one or more reference data sets based on the similarity metric;
    generating, by an interactive visualization system of the cloud computing infrastructure system, an interactive graphical interface that indicates the similarity metric computed for each of the one or more reference data sets and that indicates the match identified between the input data set and the one or more reference data sets in order to visually identify the one or more reference data sets having a highest similarity metric- with respect to the input data set; and
    rendering, using the interactive graphical interface, a graphical visualization that indicates the similarity metric computed for each of the one or more reference data sets and that indicates the match identified between the input data set and the one or more reference data sets in order to identify the matching one or more reference data sets in order to perform large scale data enrichment while reducing load on resources of the cloud computing infrastructure system.

2. The method of claim 1, wherein the one or more reference data sets includes terms associated with a domain, and wherein the matching score is computed using one or more values including a first value indicating a metric about the one or more reference data sets and a second value indicating a metric based un comparing the input data set to the one or more reference data sets.

3. The method of claim 2, wherein the graphical visualization is rendered to indicate the one or more values used to compute the matching score.

4. The method of claim 2, wherein the one or more values includes a frequency value of terms matching between the input data set and the reference data set, a population value of the reference data set, unique matching value that indicates a number of different terms matching between the input data set and the reference data set, a domain value indicating a number of terms in the reference data set, and a curation level indicating a degree of curation of the reference data set.

5. The method of claim 1, further comprising:
    generating, by the cloud computing infrastructure system, an augmentation list based on augmentation data obtained from an aggregation service; and
    augmenting the input data set based on the augmentation list,
    wherein the input data compared to the one or more reference data sets is augmented based on the augmentation list.

6. The method of claim 5, further comprising:
    generating, by the cloud computing infrastructure system, an indexed trigram table based on the one or more reference data sets;
    for each word in the input data set after augmentation:
        creating trigrams for the word;
        comparing each of the trigrams to the indexed trigram table;
        identifying a word in the indexed trigram table associated with a trigram that matches a first trigram in the trigrams; and
        storing the word in a trigram augmented data set;
    comparing the trigram augmented data set to the one or more reference data sets;
    determining a match between the trigram augmented data set and the one or more reference data sets based on the comparing; and
    wherein identifying the match between the input data set and the one or more reference data sets is performed using the match between the trigram augmented data set and the one or more reference data sets based on the comparing.

7. The method of claim 1, further comprising:
    generating a data structure that represents at least a portion of the one or more reference data sets, wherein each node in the data structure represents a different character in one or more strings extracted from the one or more reference data sets; and wherein the input data set is compared to the one or more reference data sets by traversing the data structure.

8. The method of claim 1, wherein the similarity metric is computed for each reference data set of the one or more reference data sets by determining a cosine similarity between the input data set and the reference data set.

9. The method of claim 1, wherein identifying the match includes determining a reference data of the one or more reference data sets having a highest measure of similarity based on the similarity metric computed for each of the one or more reference data sets.

10. The method of claim 1, wherein the input data set is formatted into one or more columns of data.

11. The method of claim 1, wherein the reference source is a knowledge source provided by a knowledge service.

12. A data enrichment system comprising:
a plurality of input data sources; and
a cloud computing infrastructure system comprising:
one or more processors communicatively coupled to the plurality of input data sources and communicatively coupled to a plurality of data targets, over at least one communication network; and
a memory coupled to the one or more processors, the memory storing instructions to provide a data enrichment system, wherein the instructions, when executed by the one or more processors, cause the one or more processors to:
receive an input data set from one or more of the plurality of input data sources;
compare the input data set to one or more reference data sets obtained from a reference source;
compute a similarity metric for each of the one or more reference data sets, the similarity metric indicating a measure of similarity of each of the one or more reference data sets in comparison to the input data set, wherein the similarity metric is a matching score computed for each of the one or more reference data sets with respect to the input data set, wherein the similarity metric is computed as a value based on cardinality of an intersection of the one or more reference data sets in comparison to the input data set, wherein the value is normalized by the cardinality, and wherein the value is reduced by a first factor based on a size of the one or more reference data sets, and the value is reduced by a second factor based on a type of the one or more reference data sets;
identify a match between the input data set and the one or more reference data sets based on the similarity metric;
generate, by an interactive visualization system of the cloud computing infrastructure system, an interactive graphical interface that indicates the similarity metric computed for each of the one or more reference data sets and that indicates the match identified between the input data set and the one or more reference data sets in order to visually identify the one or more reference data sets having a highest similarity metric with respect to the input data set; and
render, by the interactive visualization system, a graphical visualization that indicates the similarity metric computed for each of the one or more reference data sets and that indicates the match identified between the input data set and the one or more reference data sets in order to identify the matching one or more reference data sets in order to perform large scale data enrichment,
a user experience layer configured to provide access to the data enrichment system; and
a scheduler service configured to manage requests and responses received through the user experience layer and configured to manage the cloud computing infrastructure system while reducing load on resources of the cloud computing infrastructure system.

13. The data enrichment system of claim 12, wherein the one or more reference data sets includes terms associated with a domain, wherein the matching score is computed using one or more values including a first value indicating a metric about the one or more reference data sets and a second value indicating a metric based on comparing the input data set to the one or more reference data sets, and wherein the graphical visualization is rendered to indicate the one or more values used to compute the matching score.

14. The data enrichment system of claim 13, wherein the one or more values includes a frequency value of terms matching between the input data set and the reference data set, a population value of the reference data set, unique matching value that indicates a number of different terms matching between the input data set and the reference data set, a domain value indicating a number of terms in the reference data set, and a curation level indicating a degree of curation of the reference data set.

15. The data enrichment system of claim 12, wherein the instructions, when executed by the one or more processors, further cause the one or more processors to:
generate an augmentation list based on augmentation data obtained from an aggregation service;
augment the input data set based on the augmentation list;
generate an indexed trigram table based on the one or more reference data sets;
for each word in the input data set after augmentation:
create trigrams for the word;
compare each of the trigrams to the indexed trigram table;
identify a word in the indexed trigram table associated with a trigram that matches a first trigram in the trigrams; and
store the word in a trigram augmented data set;
compare the trigram augmented data set to the one or more reference data sets; and
determine a match between the trigram augmented data set and the one or more reference data sets based on the comparing; and
wherein the input data compared to the one or more reference data sets is augmented based on the augmentation list, and
wherein identifying the match between the input data set and the one or more reference data sets is performed using the match between the trigram augmented data set and the one or more reference data sets based on the comparing.

16. A method comprising:
receiving an input data set from one or more input data sources;
comparing, by a cloud computing infrastructure system of a data enrichment system, the input data set to one or more reference data sets obtained from a reference source, wherein the data enrichment system comprises a user experience layer configured to provide access to the data enrichment system and a scheduler service configured to manage requests and responses received through the user experience layer and configured to manage the cloud computing infrastructure system;

computing, by the cloud computing infrastructure system, a similarity metric for each of the one or more reference data sets, the similarity metric indicating a measure of similarity of each of the one or more reference data sets in comparison to the input data set, wherein the similarity metric is a matching score computed for each of the one or more reference data sets with respect to the input data set wherein the similarity metric is computed as a value based on cardinality of an intersection of the one or more reference data sets in comparison to the input data set, wherein the value is normalized by the cardinality, and wherein the value is reduced by a first factor based on a size of the one or more reference data sets and the value is reduced by a second factor based on a type of the one or more reference data sets;

identifying, by an interactive visualization system of the cloud computing infrastructure system, a match between the input data set and the one or more reference data sets based on the similarity metric in order to identify the one or more reference data sets having a highest similarity metric with respect to the input data set; and storing the input data set with matching information that indicates the similarity metric computed for each of the one or more reference data sets and that indicates the match identified between the input data set and the one or more reference data sets in order to perform large scale data enrichment while reducing load on resources of the cloud computing infrastructure system.

17. The method of claim 16, further comprising:

identifying a category label for the input data set based on identifying the match between the input data set and the one or more reference data sets; and storing the input data set in association with the category label.

18. The method of claim 16, wherein the similarity metric is computed using one or more of a Jaccard Index, a Tversky Index, or a Dice-Sorensen Index.

19. The method of claim 16, wherein the input data set is compared to the one or more reference data sets using one or more of graph matching or semantic similarity matching.

* * * * *

UNITED STATES PATENT AND TRADEMARK OFFICE
CERTIFICATE OF CORRECTION

PATENT NO. : 10,210,246 B2
APPLICATION NO. : 14/864485
DATED : February 19, 2019
INVENTOR(S) : Stojanovic et al.

It is certified that error appears in the above-identified patent and that said Letters Patent is hereby corrected as shown below:

On the Title Page

On page 2, Column 2, under Other Publications, Line 14, delete "1 926," and insert -- 1926, --, therefor.

On page 2, Column 2, under Other Publications, Line 23, delete "le" and insert -- la --, therefor.

On page 2, Column 2, under Other Publications, Line 25, delete "Malheinaticae," and insert -- Mathematicae, --, therefor.

On page 2, Column 2, under Other Publications, Line 53, delete "ved>," and insert -- vec/>, --, therefor.

In the Drawings

On sheet 22 of 27, in FIG. 16, under Reference Numeral 1608, Line 1, delete "Aristotel" and insert -- Aristotle --, therefor.

In the Specification

In Column 16, Lines 13-14, delete "hexidecimal" and insert -- hexadecimal --, therefor.

In Column 19, Line 44, after "identified)" insert -- . --.

In Column 23, Lines 44-45, delete "a the" and insert -- a --, therefor.

In Column 35, Line 57, delete "may be may be" and insert -- may be --, therefor.

In Column 36, Line 2, delete "Aristotel" and insert -- Aristotle --, therefor.

Signed and Sealed this
Twenty-eighth Day of January, 2020

Andrei Iancu
*Director of the United States Patent and Trademark Office*

CERTIFICATE OF CORRECTION (continued)
U.S. Pat. No. 10,210,246 B2

In Column 36, Line 2, delete "Aristotel" and insert -- Aristotle --, therefor.

In the Claims

In Column 53, Line 41, in Claim 1, delete "system" and insert -- system, --, therefor.

In Column 53, Line 54, in Claim 1, delete "set" and insert -- set, --, therefor.

In Column 54, Line 3, in Claim 1, delete "metric-" and insert -- metric --, therefor.

In Column 54, Line 19, in Claim 2, delete "un" and insert -- on --, therefor.

In Column 56, Line 52, in Claim 15, delete "list," and insert -- list; --, therefor.

In Column 57, Line 11, in Claim 16, delete "set" and insert -- set, --, therefor.

In Column 57, Line 17, in Claim 16, delete "sets" and insert -- sets, --, therefor.